United States Patent
Kelly et al.

(10) Patent No.: US 10,398,966 B2
(45) Date of Patent: *Sep. 3, 2019

(54) METHODS FOR AUTOMATICALLY GENERATING A CARD DECK LIBRARY AND MASTER IMAGES FOR A DECK OF CARDS, AND A RELATED CARD PROCESSING APPARATUS

(71) Applicant: Bally Gaming, Inc., Las Vegas, NV (US)

(72) Inventors: James V. Kelly, Las Vegas, NV (US); Vladislav Zvercov, Las Vegas, NV (US); Brian Miller, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,312

(22) Filed: Dec. 5, 2016

(65) Prior Publication Data

US 2017/0173449 A1    Jun. 22, 2017

Related U.S. Application Data

(63) Continuation of application No. 14/022,160, filed on Sep. 9, 2013, now Pat. No. 9,511,274, which is a
(Continued)

(51) Int. Cl.
*A63F 1/14* (2006.01)
*A63F 1/12* (2006.01)
(Continued)

(52) U.S. Cl.
CPC .............. *A63F 1/12* (2013.01); *G06K 9/2063* (2013.01); *G06K 9/4642* (2013.01);
(Continued)

(58) Field of Classification Search
CPC ........... A63F 13/01; A63F 13/12; A63F 13/14
(Continued)

(56) References Cited

U.S. PATENT DOCUMENTS 130,281 A    8/1872  Coughlin
205,030 A    6/1878  Ash
(Continued)

FOREIGN PATENT DOCUMENTS

AU    2383667 A    1/1969
AU    5025479 A1   3/1980
(Continued)

OTHER PUBLICATIONS

Australian Examination Report for Australian Application No. 2013324026, dated Oct. 20, 2016, 3 pages.
(Continued)

*Primary Examiner* — Omkar A Deodhar
*Assistant Examiner* — Ross Williams
(74) *Attorney, Agent, or Firm* — TraskBritt

(57) ABSTRACT

A method of automatically generating a calibration file for a card handling device comprises automatically generating a calibration file stored in memory of a main control system for a card handling device. Automatically generating the calibration file comprises identifying at least one parameter associated with a rank area around a rank of at least a portion of the card, identifying at least one parameter associated with a suit area around a suit of the at least a portion of the card, and storing the at least one parameter associated with the rank area and the at least one parameter associated with the suit area in the calibration file. Additionally, a method of automatically generating deck libraries for one or more decks of cards comprises automatically generating a plurality of master images for the cards of the first deck type using the parameters from the calibration file.

20 Claims, 15 Drawing Sheets

Related U.S. Application Data continuation-in-part of application No. 13/631,658, filed on Sep. 28, 2012, now Pat. No. 9,378,766.

(51) Int. Cl.
*G06K 9/66* (2006.01)
*G06K 9/20* (2006.01)
*G06K 9/46* (2006.01)
*G06K 9/62* (2006.01)
*A63F 9/24* (2006.01)

(52) U.S. Cl.
CPC ......... *G06K 9/4647* (2013.01); *G06K 9/6202* (2013.01); *G06K 9/6255* (2013.01); *G06K 9/66* (2013.01); *A63F 2009/2425* (2013.01)

(58) Field of Classification Search
USPC .................................. 463/46, 47; 273/149 R
See application file for complete search history.

(56) References Cited

U.S. PATENT DOCUMENTS

| | | |
|---|---|---|
| 609,730 A | 8/1898 | Booth |
| 673,154 A | 4/1901 | Bellows |
| 793,489 A | 6/1905 | Williams |
| 892,389 A | 7/1908 | Bellows |
| 1,014,219 A | 1/1912 | Hall |
| 1,043,109 A | 11/1912 | Hurm |
| 1,157,898 A | 10/1915 | Perret |
| 1,256,509 A | 2/1918 | Belknap |
| 1,992,085 A | 2/1925 | McKay |
| 1,556,856 A | 10/1925 | Lipps |
| 1,850,114 A | 6/1929 | McCaddin |
| 1,757,553 A | 5/1930 | Gustav |
| 1,885,276 A | 11/1932 | McKay |
| 1,889,729 A | 11/1932 | Hammond |
| 1,955,926 A | 4/1934 | Matthaey |
| 1,998,690 A | 4/1935 | Shepherd et al. |
| 2,001,220 A | 5/1935 | Smith |
| 2,001,918 A | 5/1935 | Nevius |
| 2,016,030 A | 10/1935 | Woodruff et al. |
| 2,043,343 A | 6/1936 | Warner |
| 2,060,096 A | 11/1936 | McCoy |
| 2,065,824 A | 12/1936 | Plass |
| 2,159,958 A | 5/1939 | Sachs |
| 2,185,474 A | 1/1940 | Nott |
| 2,254,484 A | 9/1941 | Hutchins |
| D132,360 S | 5/1942 | Gardner |
| 2,328,153 A | 8/1943 | Laing |
| 2,328,879 A | 9/1943 | Isaacson |
| D139,530 S | 11/1944 | Schindler |
| 2,364,413 A | 12/1944 | Wittel |
| 2,525,305 A | 10/1950 | Lombard |
| 2,543,522 A | 2/1951 | Cohen |
| 2,588,582 A | 3/1952 | Sivertson |
| 2,615,719 A | 10/1952 | Fonken |
| 2,659,607 A | 11/1953 | Skillman et al. |
| 2,661,215 A | 12/1953 | Stevens |
| 2,676,020 A | 4/1954 | Ogden |
| 2,692,777 A | 10/1954 | Miller |
| 2,701,720 A | 2/1955 | Ogden |
| 2,705,638 A | 4/1955 | Newcomb |
| 2,711,319 A | 6/1955 | Morgan et al. |
| 2,714,510 A | 8/1955 | Oppenlander et al. |
| 2,717,782 A | 9/1955 | Droll |
| 2,727,747 A | 12/1955 | Semisch, Jr. |
| 2,731,271 A | 1/1956 | Brown |
| 2,747,877 A | 5/1956 | Howard |
| 2,755,090 A | 7/1956 | Aldrich |
| 2,757,005 A | 7/1956 | Nothaft |
| 2,760,779 A | 8/1956 | Ogden et al. |
| 2,770,459 A | 11/1956 | Wilson et al. |
| 2,778,643 A | 1/1957 | Williams |
| 2,778,644 A | 1/1957 | Stephenson |
| 2,782,040 A | 2/1957 | Matter |
| 2,790,641 A | 4/1957 | Adams |
| 2,793,863 A | 5/1957 | Liebelt |
| 2,815,214 A | 12/1957 | Hall |
| 2,821,399 A | 1/1958 | Heinoo |
| 2,914,215 A | 11/1959 | Neidig |
| 2,937,739 A | 5/1960 | Levy |
| 2,950,005 A | 8/1960 | MacDonald |
| RE24,986 E | 5/1961 | Stephenson |
| 3,067,885 A | 12/1962 | Kohler |
| 3,107,096 A | 10/1963 | Osborn |
| 3,124,674 A | 3/1964 | Edwards et al. |
| 3,131,935 A | 5/1964 | Gronneberg |
| 3,147,978 A | 9/1964 | Sjostrand |
| D200,652 S | 3/1965 | Fisk |
| 3,222,071 A | 12/1965 | Lang |
| 3,235,741 A | 2/1966 | Plaisance |
| 3,288,308 A | 11/1966 | Gingher |
| 3,305,237 A | 2/1967 | Granius |
| 3,312,473 A | 4/1967 | Friedman et al. |
| 3,452,509 A | 7/1969 | Hauer |
| 3,530,968 A | 9/1970 | Palmer |
| 3,588,116 A | 6/1971 | Miura |
| 3,589,730 A | 6/1971 | Slay |
| 3,595,388 A | 7/1971 | Castaldi |
| 3,597,076 A | 8/1971 | Hubbard et al. |
| 3,618,933 A | 11/1971 | Roggenstein et al. |
| 3,627,331 A | 12/1971 | Erickson |
| 3,666,270 A | 5/1972 | Mazur |
| 3,680,853 A | 8/1972 | Houghton et al. |
| 3,690,670 A | 9/1972 | Cassady et al. |
| 3,704,938 A | 12/1972 | Fanselow |
| 3,716,238 A | 2/1973 | Porter |
| 3,751,041 A | 8/1973 | Seifert |
| 3,761,079 A | 9/1973 | Azure, Jr. |
| 3,810,627 A | 5/1974 | Levy |
| D232,953 S | 9/1974 | Oguchi |
| 3,861,261 A | 1/1975 | Maxey |
| 3,897,954 A | 8/1975 | Erickson et al. |
| 3,899,178 A | 8/1975 | Watanabe |
| 3,909,002 A | 9/1975 | Levy |
| 3,929,339 A | 12/1975 | Mattioli |
| 3,944,077 A | 3/1976 | Green |
| 3,944,230 A | 3/1976 | Fineman |
| 3,949,219 A | 4/1976 | Crouse |
| 3,968,364 A | 7/1976 | Miller |
| 4,023,705 A | 5/1977 | Reiner et al. |
| 4,033,590 A | 7/1977 | Pic |
| 4,072,930 A | 2/1978 | Lucero et al. |
| 4,088,265 A | 5/1978 | Garczynski |
| 4,151,410 A | 4/1979 | McMillan et al. |
| 4,159,581 A | 7/1979 | Lichtenberg |
| 4,162,649 A | 7/1979 | Thornton |
| 4,166,615 A | 9/1979 | Noguchi et al. |
| 4,232,861 A | 11/1980 | Maul |
| 4,280,690 A | 7/1981 | Hill |
| 4,283,709 A | 8/1981 | Lucero et al. |
| 4,310,160 A | 1/1982 | Willette et al. |
| 4,339,134 A | 7/1982 | Macheel |
| 4,339,798 A | 7/1982 | Hedges et al. |
| 4,361,393 A | 11/1982 | Nato |
| 4,368,972 A | 1/1983 | Naramore |
| 4,369,972 A | 1/1983 | Parker |
| 4,374,309 A | 2/1983 | Walton |
| 4,377,285 A | 3/1983 | Kadlic |
| 4,385,827 A | 5/1983 | Naramore |
| 4,388,994 A | 6/1983 | Suda et al. |
| 4,397,469 A | 8/1983 | Carter, III |
| 4,421,312 A | 12/1983 | Delgado et al. |
| 4,421,501 A | 12/1983 | Scheffer |
| D273,962 S | 5/1984 | Fromm |
| D274,069 S | 5/1984 | Fromm |
| 4,467,424 A | 8/1984 | Hedges et al. |
| 4,494,197 A | 1/1985 | Troy et al. |
| 4,497,488 A | 2/1985 | Plevyak et al. |
| 4,512,580 A | 4/1985 | Matviak |
| 4,513,969 A | 4/1985 | Samsel, Jr. |
| 4,515,367 A | 5/1985 | Howard |
| 4,531,187 A | 7/1985 | Uhland |

(56) References Cited

U.S. PATENT DOCUMENTS

| | | |
|---|---|---|
| 4,534,562 A | 8/1985 | Cuff et al. |
| 4,549,738 A | 10/1985 | Greitzer |
| 4,566,782 A | 1/1986 | Britt et al. |
| 4,575,367 A | 3/1986 | Karmel |
| 4,586,712 A | 5/1986 | Lorber et al. |
| 4,659,082 A | 4/1987 | Greenberg |
| 4,662,637 A | 5/1987 | Pfeiffer |
| 4,662,816 A | 5/1987 | Fabrig |
| 4,667,959 A | 5/1987 | Pfeiffer et al. |
| 4,741,524 A | 5/1988 | Bromage |
| 4,750,743 A | 6/1988 | Nicoletti |
| 4,755,941 A | 7/1988 | Bacchi |
| 4,759,448 A | 7/1988 | Kawabata |
| 4,770,412 A | 9/1988 | Wolfe |
| 4,770,421 A | 9/1988 | Hoffman |
| 4,807,884 A | 2/1989 | Breeding |
| 4,822,050 A | 4/1989 | Normand et al. |
| 4,832,342 A | 5/1989 | Plevyak et al. |
| 4,858,000 A | 8/1989 | Lu |
| 4,861,041 A | 8/1989 | Jones et al. |
| 4,876,000 A | 10/1989 | Mikhail |
| 4,900,009 A | 2/1990 | Kitahara et al. |
| 4,904,830 A | 2/1990 | Rizzuto |
| 4,921,109 A | 5/1990 | Hasuo et al. |
| 4,926,327 A | 5/1990 | Sidley |
| 4,948,134 A | 8/1990 | Suttle et al. |
| 4,951,950 A | 8/1990 | Normand et al. |
| 4,969,648 A | 11/1990 | Hollinger et al. |
| 4,993,587 A | 2/1991 | Abe |
| 4,995,615 A | 2/1991 | Cheng |
| 5,000,453 A | 3/1991 | Stevens et al. |
| 5,004,218 A | 4/1991 | Sardano et al. |
| 5,039,102 A | 8/1991 | Miller |
| 5,067,713 A | 11/1991 | Soules et al. |
| 5,078,405 A | 1/1992 | Jones et al. |
| 5,081,487 A | 1/1992 | Hoyer et al. |
| 5,096,197 A | 3/1992 | Embury |
| 5,102,293 A | 4/1992 | Schneider |
| 5,118,114 A | 6/1992 | Tucci |
| 5,121,192 A | 6/1992 | Kazui |
| 5,121,921 A | 6/1992 | Friedman et al. |
| 5,146,346 A | 9/1992 | Knoll |
| 5,154,429 A | 10/1992 | LeVasseur |
| 5,179,517 A | 1/1993 | Sarbin et al. |
| 5,197,094 A | 3/1993 | Tillery et al. |
| 5,199,710 A | 4/1993 | Lamle |
| 5,209,476 A | 5/1993 | Eiba |
| 5,224,712 A | 7/1993 | Laughlin et al. |
| 5,240,140 A | 8/1993 | Huen |
| 5,248,142 A | 9/1993 | Breeding |
| 5,257,179 A | 10/1993 | DeMar |
| 5,259,907 A | 11/1993 | Soules et al. |
| 5,261,667 A | 11/1993 | Breeding |
| 5,267,248 A | 11/1993 | Reyner |
| 5,275,411 A | 1/1994 | Breeding |
| 5,276,312 A | 1/1994 | McCarthy |
| 5,283,422 A | 2/1994 | Storch et al. |
| 5,288,081 A | 2/1994 | Breeding |
| 5,299,089 A | 3/1994 | Lwee |
| 5,303,921 A | 4/1994 | Breeding |
| 5,344,146 A | 9/1994 | Lee |
| 5,356,145 A | 10/1994 | Verschoor |
| 5,362,053 A | 11/1994 | Miller |
| 5,374,061 A | 12/1994 | Albrecht |
| 5,377,973 A | 1/1995 | Jones et al. |
| 5,382,024 A | 1/1995 | Blaha |
| 5,382,025 A | 1/1995 | Sklansky et al. |
| 5,390,910 A | 2/1995 | Mandel et al. |
| 5,397,128 A | 3/1995 | Hesse et al. |
| 5,397,133 A | 3/1995 | Penzias |
| 5,416,308 A | 5/1995 | Hood et al. |
| 5,431,399 A | 7/1995 | Kelley |
| 5,431,407 A | 7/1995 | Hofberg et al. |
| 5,437,462 A | 8/1995 | Breeding |
| 5,445,377 A | 8/1995 | Steinbach |
| 5,470,079 A | 11/1995 | LeStrange et al. |
| D365,853 S | 1/1996 | Zadro |
| 5,489,101 A | 2/1996 | Moody |
| 5,515,477 A | 5/1996 | Sutherland |
| 5,524,888 A | 6/1996 | Heidel |
| 5,531,448 A | 7/1996 | Moody |
| 5,544,892 A | 8/1996 | Breeding |
| 5,575,475 A | 11/1996 | Steinbach |
| 5,584,483 A | 12/1996 | Sines et al. |
| 5,586,766 A | 12/1996 | Forte et al. |
| 5,586,936 A | 12/1996 | Bennett et al. |
| 5,605,334 A | 2/1997 | McCrea, Jr. |
| 5,613,912 A | 3/1997 | Slater |
| 5,632,483 A | 5/1997 | Garczynski et al. |
| 5,636,843 A | 6/1997 | Roberts |
| 5,651,548 A | 7/1997 | French et al. |
| 5,655,961 A | 8/1997 | Acres et al. |
| 5,655,966 A | 8/1997 | Werdin, Jr. et al. |
| 5,669,816 A | 9/1997 | Garczynski et al. |
| 5,676,231 A | 10/1997 | Legras et al. |
| 5,676,372 A | 10/1997 | Sines et al. |
| 5,681,039 A | 10/1997 | Miller |
| 5,683,085 A | 11/1997 | Johnson et al. |
| 5,685,543 A | 11/1997 | Garner |
| 5,690,324 A | 11/1997 | Otomo et al. |
| 5,692,748 A | 12/1997 | Frisco et al. |
| 5,695,189 A | 12/1997 | Breeding et al. |
| 5,701,565 A | 12/1997 | Morgan |
| 5,707,286 A | 1/1998 | Carlson |
| 5,707,287 A | 1/1998 | McCrea, Jr. |
| 5,711,525 A | 1/1998 | Breeding |
| 5,718,427 A | 2/1998 | Cranford et al. |
| 5,719,288 A | 2/1998 | Sens et al. |
| 5,720,484 A | 2/1998 | Hsu |
| 5,722,893 A | 3/1998 | Hill et al. |
| 5,735,525 A | 4/1998 | McCrea, Jr. |
| 5,735,724 A | 4/1998 | Udagawa |
| 5,735,742 A | 4/1998 | French |
| 5,743,798 A | 4/1998 | Adams et al. |
| 5,768,382 A | 6/1998 | Schneier et al. |
| 5,770,533 A | 6/1998 | Franchi |
| 5,770,553 A | 6/1998 | Kroner et al. |
| 5,772,505 A | 6/1998 | Garczynski et al. |
| 5,779,546 A | 7/1998 | Meissner et al. |
| 5,781,647 A | 7/1998 | Fishbine et al. |
| 5,785,321 A | 7/1998 | van Putten et al. |
| 5,788,574 A | 8/1998 | Ornstein et al. |
| 5,791,988 A | 8/1998 | Nomi |
| 5,802,560 A | 9/1998 | Joseph et al. |
| 5,803,808 A | 9/1998 | Strisower |
| 5,810,355 A | 9/1998 | Trilli |
| 5,813,326 A | 9/1998 | Salomon |
| 5,813,912 A | 9/1998 | Shultz |
| 5,814,796 A | 9/1998 | Benson |
| 5,836,775 A | 11/1998 | Hiyama et al. |
| 5,839,730 A | 11/1998 | Pike |
| 5,845,906 A | 12/1998 | Wirth |
| 5,851,011 A | 12/1998 | Lott |
| 5,867,586 A | 2/1999 | Liang |
| 5,879,233 A | 3/1999 | Stupero |
| 5,883,804 A | 3/1999 | Christensen |
| 5,890,717 A | 4/1999 | Rosewarne et al. |
| 5,892,210 A | 4/1999 | Levasseur |
| 5,909,876 A | 6/1999 | Brown |
| 5,911,626 A | 6/1999 | McCrea, Jr. |
| 5,919,090 A | 7/1999 | Mothwurf |
| D412,723 S | 8/1999 | Hachuel et al. |
| 5,936,222 A | 8/1999 | Korsunsky |
| 5,941,769 A | 8/1999 | Order |
| 5,944,310 A | 8/1999 | Johnson et al. |
| D414,527 S | 9/1999 | Tedham |
| 5,957,776 A | 9/1999 | Hoehne |
| 5,974,150 A | 10/1999 | Kaish et al. |
| 5,989,122 A | 11/1999 | Roblejo |
| 5,991,308 A | 11/1999 | Fuhrmann et al. |
| 6,015,311 A | 1/2000 | Benjamin et al. |
| 6,019,368 A | 2/2000 | Sines et al. |
| 6,019,374 A | 2/2000 | Breeding |
| 6,039,650 A | 3/2000 | Hill |

(56) References Cited

U.S. PATENT DOCUMENTS

| | | |
|---|---|---|
| 6,050,569 A | 4/2000 | Taylor |
| 6,053,695 A | 4/2000 | Longoria et al. |
| 6,061,449 A | 5/2000 | Candelore et al. |
| 6,068,258 A | 5/2000 | Breeding et al. |
| 6,069,564 A | 5/2000 | Hatano et al. |
| 6,071,190 A | 6/2000 | Weiss et al. |
| 6,093,103 A | 7/2000 | McCrea, Jr. |
| 6,113,101 A | 9/2000 | Wirth |
| 6,117,012 A | 9/2000 | McCrea, Jr. |
| D432,588 S | 10/2000 | Tedham |
| 6,126,166 A | 10/2000 | Lorson et al. |
| 6,131,817 A | 10/2000 | Miller |
| 6,139,014 A | 10/2000 | Breeding et al. |
| 6,149,154 A | 11/2000 | Grauzer et al. |
| 6,154,131 A | 11/2000 | Jones, II et al. |
| 6,165,069 A | 12/2000 | Sines et al. |
| 6,165,072 A | 12/2000 | Davis et al. |
| 6,183,362 B1 | 2/2001 | Boushy |
| 6,186,895 B1 | 2/2001 | Oliver |
| 6,196,416 B1 | 3/2001 | Beagle |
| 6,200,218 B1 | 3/2001 | Lindsay |
| 6,210,274 B1 | 4/2001 | Carlson |
| 6,213,310 B1 | 4/2001 | Wennersten et al. |
| 6,217,447 B1 | 4/2001 | Lofink et al. |
| 6,234,900 B1 | 5/2001 | Cumbers |
| 6,236,223 B1 | 5/2001 | Brady et al. |
| 6,250,632 B1 | 6/2001 | Albrecht |
| 6,254,002 B1 | 7/2001 | Litman |
| 6,254,096 B1 | 7/2001 | Grauzer et al. |
| 6,254,484 B1 | 7/2001 | McCrea, Jr. |
| 6,257,981 B1 | 7/2001 | Acres et al. |
| 6,267,248 B1 | 7/2001 | Johnson et al. |
| 6,267,648 B1 | 7/2001 | Katayama et al. |
| 6,267,671 B1 | 7/2001 | Hogan |
| 6,270,404 B2 | 8/2001 | Sines |
| 6,272,223 B1 | 8/2001 | Carlson |
| 6,293,546 B1 | 9/2001 | Hessing et al. |
| 6,293,864 B1 | 9/2001 | Romero |
| 6,299,167 B1 | 10/2001 | Sines |
| 6,299,534 B1 | 10/2001 | Breeding et al. |
| 6,299,536 B1 | 10/2001 | Hill |
| 6,308,886 B1 | 10/2001 | Benson et al. |
| 6,313,871 B1 | 11/2001 | Schubert |
| 6,325,373 B1 | 12/2001 | Breeding et al. |
| 6,334,614 B1 | 1/2002 | Breeding |
| 6,341,778 B1 | 1/2002 | Lee |
| 6,342,830 B1 | 1/2002 | Want et al. |
| 6,346,044 B1 | 2/2002 | McCrea, Jr. |
| 6,361,044 B1 | 3/2002 | Block |
| 6,386,973 B1 | 5/2002 | Yoseloff |
| 6,402,142 B1 | 6/2002 | Warren et al. |
| 6,403,908 B2 | 6/2002 | Stardust et al. |
| 6,443,839 B2 | 9/2002 | Stockdale et al. |
| 6,446,864 B1 | 9/2002 | Kim et al. |
| 6,454,266 B1 | 9/2002 | Breeding et al. |
| 6,460,848 B1 | 10/2002 | Soltys et al. |
| 6,464,584 B2 | 10/2002 | Oliver |
| 6,490,277 B1 | 12/2002 | Tzotzkov |
| 6,508,709 B1 | 1/2003 | Karmarkar |
| 6,514,140 B1 | 2/2003 | Starch |
| 6,517,435 B2 | 2/2003 | Soltys et al. |
| 6,517,436 B2 | 2/2003 | Soltys et al. |
| 6,520,857 B2 | 2/2003 | Soltys et al. |
| 6,527,271 B2 | 3/2003 | Soltys et al. |
| 6,530,836 B2 | 3/2003 | Soltys et al. |
| 6,530,837 B2 | 3/2003 | Soltys et al. |
| 6,532,297 B1 | 3/2003 | Lindquist |
| 6,533,276 B2 | 3/2003 | Soltys et al. |
| 6,533,662 B2 | 3/2003 | Soltys et al. |
| 6,561,897 B1 | 5/2003 | Bourbour et al. |
| 6,568,678 B2 | 5/2003 | Breeding et al. |
| 6,579,180 B2 | 6/2003 | Soltys et al. |
| 6,579,181 B2 | 6/2003 | Soltys et al. |
| 6,581,747 B1 | 6/2003 | Charlier et al. |
| 6,582,301 B2 | 6/2003 | Hill |
| 6,582,302 B2 | 6/2003 | Romero |
| 6,585,586 B1 | 7/2003 | Romero |
| 6,585,588 B2 | 7/2003 | Hard |
| 6,585,856 B2 | 7/2003 | Zwick et al. |
| 6,588,750 B1 | 7/2003 | Grauzer et al. |
| 6,588,751 B1 | 7/2003 | Grauzer et al. |
| 6,595,857 B2 | 7/2003 | Soltys et al. |
| 6,609,710 B1 | 8/2003 | Order |
| 6,612,928 B1 | 9/2003 | Bradford et al. |
| 6,616,535 B1 | 9/2003 | Nishizaki et al. |
| 6,619,662 B2 | 9/2003 | Miller |
| 6,622,185 B1 | 9/2003 | Johnson et al. |
| 6,626,757 B2 | 9/2003 | Oliveras |
| 6,629,019 B2 | 9/2003 | Legge et al. |
| 6,629,591 B1 | 10/2003 | Griswold et al. |
| 6,629,889 B2 | 10/2003 | Mothwurf |
| 6,629,894 B1 | 10/2003 | Purton |
| 6,637,622 B1 | 10/2003 | Robinson |
| 6,638,161 B2 | 10/2003 | Soltys et al. |
| 6,645,068 B1 | 11/2003 | Kelly et al. |
| 6,645,077 B2 | 11/2003 | Rowe |
| 6,651,981 B2 | 11/2003 | Grauzer et al. |
| 6,651,982 B2 | 11/2003 | Grauzer et al. |
| 6,651,985 B2 | 11/2003 | Sines |
| 6,652,379 B2 | 11/2003 | Soltys et al. |
| 6,655,684 B2 | 12/2003 | Grauzer et al. |
| 6,655,690 B1 | 12/2003 | Osicwarek |
| 6,658,135 B1 | 12/2003 | Morito et al. |
| 6,659,460 B2 | 12/2003 | Blaha et al. |
| 6,659,461 B2 | 12/2003 | Yoseloff |
| 6,659,875 B2 | 12/2003 | Purton |
| 6,663,490 B2 | 12/2003 | Soltys et al. |
| 6,666,768 B1 | 12/2003 | Akers |
| 6,671,358 B1 | 12/2003 | Seidman et al. |
| 6,676,127 B2 | 1/2004 | Johnson et al. |
| 6,676,517 B2 | 1/2004 | Beavers |
| 6,680,843 B2 | 1/2004 | Farrow et al. |
| 6,685,564 B2 | 2/2004 | Oliver |
| 6,685,567 B2 | 2/2004 | Cockerille et al. |
| 6,685,568 B2 | 2/2004 | Soltys et al. |
| 6,688,597 B2 | 2/2004 | Jones |
| 6,688,979 B2 | 2/2004 | Soltys et al. |
| 6,690,673 B1 | 2/2004 | Jarvis |
| 6,698,756 B1 | 3/2004 | Baker et al. |
| 6,698,759 B2 | 3/2004 | Webb et al. |
| 6,702,289 B1 | 3/2004 | Feola |
| 6,702,290 B2 | 3/2004 | Buono-Correa et al. |
| 6,709,333 B1 | 3/2004 | Bradford et al. |
| 6,712,696 B2 | 3/2004 | Soltys et al. |
| 6,719,288 B2 | 4/2004 | Hessing et al. |
| 6,719,634 B2 | 4/2004 | Mishina et al. |
| 6,722,974 B2 | 4/2004 | Sines |
| 6,726,205 B2 | 4/2004 | Purton |
| 6,732,067 B1 | 5/2004 | Powderly |
| 6,733,012 B2 | 5/2004 | Bui et al. |
| 6,733,388 B2 | 5/2004 | Mothwurf |
| 6,746,333 B1 | 6/2004 | Onda et al. |
| 6,747,560 B2 | 6/2004 | Stevens, III |
| 6,749,510 B2 | 6/2004 | Giobbi |
| 6,758,751 B2 | 7/2004 | Soltys et al. |
| 6,758,757 B2 | 7/2004 | Luciano, Jr. et al. |
| 6,769,693 B2 | 8/2004 | Huard et al. |
| 6,774,782 B2 | 8/2004 | Runyon et al. |
| 6,789,801 B2 | 9/2004 | Snow |
| 6,802,510 B1 | 10/2004 | Haber |
| 6,804,763 B1 | 10/2004 | Stockdale et al. |
| 6,808,173 B2 | 10/2004 | Snow |
| 6,827,282 B2 | 12/2004 | Silverbrook |
| 6,834,251 B1 | 12/2004 | Fletcher |
| 6,840,517 B2 | 1/2005 | Snow |
| 6,842,263 B1 | 1/2005 | Saeki |
| 6,843,725 B2 | 1/2005 | Nelson |
| 6,848,616 B2 | 2/2005 | Tsirline et al. |
| 6,848,844 B2 | 2/2005 | McCue, Jr. et al. |
| 6,848,994 B1 | 2/2005 | Knust et al. |
| 6,857,961 B2 | 2/2005 | Soltys et al. |
| 6,874,784 B1 | 4/2005 | Promutico et al. |
| 6,874,786 B2 | 4/2005 | Bruno |
| 6,877,657 B2 | 4/2005 | Ranard et al. |

(56) References Cited

U.S. PATENT DOCUMENTS

| | | |
|---|---|---|
| 6,877,748 B1 | 4/2005 | Patroni et al. |
| 6,886,829 B2 | 5/2005 | Hessing et al. |
| 6,889,979 B2 | 5/2005 | Blaha et al. |
| 6,893,347 B1 | 5/2005 | Zilliacus et al. |
| 6,899,628 B2 | 5/2005 | Leen et al. |
| 6,902,167 B2 | 6/2005 | Webb |
| 6,905,121 B1 | 6/2005 | Timpano |
| 6,923,446 B2 | 8/2005 | Snow |
| 6,938,900 B2 | 9/2005 | Snow |
| 6,941,180 B1 | 9/2005 | Fisher et al. |
| 6,950,948 B2 | 9/2005 | Neff |
| 6,955,599 B2 | 10/2005 | Bourbour et al. |
| 6,957,746 B2 | 10/2005 | Martin et al. |
| 6,959,925 B1 | 11/2005 | Baker et al. |
| 6,960,134 B2 | 11/2005 | Hartl et al. |
| 6,964,612 B2 | 11/2005 | Soltys et al. |
| 6,986,514 B2 | 1/2006 | Snow |
| 6,988,516 B2 | 1/2006 | Debaes |
| 7,011,309 B2 | 3/2006 | Soltys et al. |
| 7,020,307 B2 | 3/2006 | Hinton et al. |
| 7,028,598 B2 | 4/2006 | Teshima |
| 7,029,009 B2 | 4/2006 | Grauzer et al. |
| 7,036,818 B2 | 5/2006 | Grauzer et al. |
| 7,046,458 B2 | 5/2006 | Nakayama |
| 7,046,764 B1 | 5/2006 | Kump |
| 7,048,629 B2 | 5/2006 | Sines |
| 7,059,602 B2 | 6/2006 | Grauzer et al. |
| 7,066,464 B2 | 6/2006 | Blad et al. |
| 7,068,822 B2 | 6/2006 | Scott |
| 7,073,791 B2 | 7/2006 | Grauzer et al. |
| 7,079,010 B2 | 7/2006 | Champlin |
| 7,084,769 B2 | 8/2006 | Bauer et al. |
| 7,089,420 B1 | 8/2006 | Durst et al. |
| D527,900 S | 9/2006 | Dewa |
| 7,106,201 B2 | 9/2006 | Tuttle |
| 7,113,094 B2 | 9/2006 | Garber et al. |
| 7,114,718 B2 | 10/2006 | Grauzer et al. |
| 7,124,947 B2 | 10/2006 | Starch |
| 7,128,652 B1 | 10/2006 | Lavoie et al. |
| 7,137,627 B2 | 11/2006 | Grauzer et al. |
| 7,139,108 B2 | 11/2006 | Andersen et al. |
| 7,140,614 B2 | 11/2006 | Snow |
| 7,162,035 B1 | 1/2007 | Durst et al. |
| 7,165,769 B2 | 1/2007 | Crenshaw et al. |
| 7,165,770 B2 | 1/2007 | Snow |
| 7,175,522 B2 | 2/2007 | Hartl |
| 7,186,181 B2 | 3/2007 | Rowe |
| 7,201,656 B2 | 4/2007 | Darder |
| 7,202,888 B2 | 4/2007 | Tecu et al. |
| 7,203,841 B2 | 4/2007 | Jackson et al. |
| 7,213,812 B2 | 5/2007 | Schubert |
| 7,222,852 B2 | 5/2007 | Soltys |
| 7,222,855 B2 | 5/2007 | Sorge |
| 7,231,812 B1 | 6/2007 | Lagare |
| 7,234,698 B2 | 6/2007 | Grauzer et al. |
| 7,237,969 B2 | 7/2007 | Bartman |
| 7,243,148 B2 | 7/2007 | Keir et al. |
| 7,243,698 B2 | 7/2007 | Siegel |
| 7,246,799 B2 | 7/2007 | Snow |
| 7,255,344 B2 | 8/2007 | Grauzer et al. |
| 7,255,351 B2 | 8/2007 | Yoseloff et al. |
| 7,255,642 B2 | 8/2007 | Sines et al. |
| 7,257,630 B2 | 8/2007 | Cole et al. |
| 7,261,294 B2 | 8/2007 | Grauzer et al. |
| 7,264,241 B2 | 9/2007 | Schubert et al. |
| 7,264,243 B2 | 9/2007 | Yoseloff et al. |
| 7,277,570 B2 | 10/2007 | Armstrong |
| 7,278,923 B2 | 10/2007 | Grauzer et al. |
| 7,294,056 B2 | 11/2007 | Lowell et al. |
| 7,297,062 B2 | 11/2007 | Gatto et al. |
| 7,300,056 B2 | 11/2007 | Gioia et al. |
| 7,303,473 B2 | 12/2007 | Rowe |
| 7,303,475 B2 | 12/2007 | Britt et al. |
| 7,309,065 B2 | 12/2007 | Yoseloff et al. |
| 7,316,609 B2 | 1/2008 | Dunn et al. |
| 7,316,615 B2 | 1/2008 | Soltys et al. |
| 7,322,576 B2 | 1/2008 | Grauzer et al. |
| 7,331,579 B2 | 2/2008 | Snow |
| 7,334,794 B2 | 2/2008 | Snow |
| 7,338,044 B2 | 3/2008 | Grauzer et al. |
| 7,338,362 B1 | 3/2008 | Gallagher |
| 7,341,510 B2 | 3/2008 | Bourbour et al. |
| D566,784 S | 4/2008 | Palmer |
| 7,357,321 B2 | 4/2008 | Yoshida |
| 7,360,094 B2 | 4/2008 | Neff |
| 7,367,561 B2 | 5/2008 | Blaha et al. |
| 7,367,563 B2 | 5/2008 | Yoseloff et al. |
| 7,367,565 B2 | 5/2008 | Chiu |
| 7,367,884 B2 | 5/2008 | Breeding et al. |
| 7,374,170 B2 | 5/2008 | Grauzer et al. |
| 7,384,044 B2 | 6/2008 | Grauzer et al. |
| 7,387,300 B2 | 6/2008 | Snow |
| 7,389,990 B2 | 6/2008 | Mourad |
| 7,390,256 B2 | 6/2008 | Soltys et al. |
| 7,399,226 B2 | 7/2008 | Mishra |
| 7,407,438 B2 | 8/2008 | Schubert et al. |
| 7,413,191 B2 | 8/2008 | Grauzer et al. |
| 7,434,805 B2 | 10/2008 | Grauzer et al. |
| 7,436,957 B1 | 10/2008 | Fisher et al. |
| 7,448,626 B2 | 11/2008 | Fleckenstein |
| 7,458,582 B2 | 12/2008 | Snow |
| 7,461,843 B1 | 12/2008 | Baker et al. |
| 7,464,932 B2 | 12/2008 | Darling |
| 7,464,934 B2 | 12/2008 | Schwartz |
| 7,472,906 B2 | 1/2009 | Shai |
| 7,478,813 B1 | 1/2009 | Hofferber et al. |
| 7,500,672 B2 | 3/2009 | Ho |
| 7,506,874 B2 | 3/2009 | Hall |
| 7,510,186 B2 | 3/2009 | Fleckenstein |
| 7,510,190 B2 | 3/2009 | Snow |
| 7,510,194 B2 | 3/2009 | Soltys et al. |
| 7,510,478 B2 | 3/2009 | Benbrahim et al. |
| 7,513,437 B2 | 4/2009 | Douglas |
| 7,515,718 B2 | 4/2009 | Nguyen et al. |
| 7,523,935 B2 | 4/2009 | Grauzer et al. |
| 7,523,936 B2 | 4/2009 | Grauzer et al. |
| 7,523,937 B2 | 4/2009 | Fleckenstein |
| 7,525,510 B2 | 4/2009 | Beland et al. |
| 7,537,216 B2 | 5/2009 | Soltys et al. |
| 7,540,497 B2 | 6/2009 | Tseng |
| 7,540,498 B2 | 6/2009 | Crenshaw et al. |
| 7,549,643 B2 | 6/2009 | Quach |
| 7,554,753 B2 | 6/2009 | Wakamiya |
| 7,556,197 B2 | 7/2009 | Yoshida |
| 7,556,266 B2 | 7/2009 | Blaha et al. |
| 7,575,237 B2 | 8/2009 | Snow |
| 7,578,506 B2 | 8/2009 | Lambert |
| 7,584,962 B2 | 9/2009 | Breeding et al. |
| 7,584,963 B2 | 9/2009 | Krenn et al. |
| 7,584,966 B2 | 9/2009 | Snow |
| 7,591,728 B2 | 9/2009 | Gioia et al. |
| 7,593,544 B2 | 9/2009 | Downs |
| 7,594,660 B2 | 9/2009 | Baker et al. |
| 7,597,623 B2 | 10/2009 | Grauzer et al. |
| 7,644,923 B1 | 1/2010 | Dickinson et al. |
| 7,661,676 B2 | 2/2010 | Smith et al. |
| 7,666,090 B2 | 2/2010 | Hettinger |
| 7,669,852 B2 | 3/2010 | Baker et al. |
| 7,669,853 B2 | 3/2010 | Jones |
| 7,677,565 B2 | 3/2010 | Grauzer et al. |
| 7,677,566 B2 | 3/2010 | Krenn et al. |
| 7,686,681 B2 | 3/2010 | Soltys et al. |
| 7,699,694 B2 | 4/2010 | Hill |
| 7,735,657 B2 | 6/2010 | Johnson |
| 7,740,244 B2 | 6/2010 | Ho |
| 7,744,452 B2 | 6/2010 | Cimring et al. |
| 7,753,373 B2 | 7/2010 | Grauzer et al. |
| 7,753,374 B2 | 7/2010 | Ho |
| 7,753,798 B2 | 7/2010 | Soltys |
| 7,758,425 B2 | 7/2010 | Poh et al. |
| 7,762,554 B2 | 7/2010 | Ho |
| 7,764,836 B2 | 7/2010 | Downs |
| 7,766,332 B2 | 8/2010 | Grauzer et al. |
| 7,766,333 B1 | 8/2010 | Stardust |

(56) References Cited

U.S. PATENT DOCUMENTS

| | | |
|---|---|---|
| 7,769,232 B2 | 8/2010 | Downs |
| 7,769,853 B2 | 8/2010 | Nezamzadeh |
| 7,773,749 B1 | 8/2010 | Durst et al. |
| 7,780,529 B2 | 8/2010 | Rowe et al. |
| 7,784,790 B2 | 8/2010 | Grauzer et al. |
| 7,804,982 B2 | 9/2010 | Howard et al. |
| 7,846,020 B2 | 12/2010 | Walker et al. |
| 7,867,080 B2 | 1/2011 | Nicely et al. |
| 7,890,365 B2 | 2/2011 | Hettinger |
| 7,900,923 B2 | 3/2011 | Toyama et al. |
| 7,901,285 B2 | 3/2011 | Tran et al. |
| 7,908,169 B2 | 3/2011 | Hettinger |
| 7,909,689 B2 | 3/2011 | Lardie |
| 7,931,533 B2 | 4/2011 | LeMay et al. |
| 7,933,448 B2 | 4/2011 | Downs, III |
| 7,946,586 B2 | 5/2011 | Krenn et al. |
| 7,967,294 B2 | 6/2011 | Blaha et al. |
| 7,976,023 B1 | 7/2011 | Hessing et al. |
| 7,988,152 B2 | 8/2011 | Sines |
| 7,988,554 B2 | 8/2011 | LeMay et al. |
| 7,995,196 B1 | 8/2011 | Fraser |
| 8,002,638 B2 | 8/2011 | Grauzer et al. |
| 8,011,661 B2 | 9/2011 | Stasson |
| 8,016,663 B2 | 9/2011 | Soltys et al. |
| 8,021,231 B2 | 9/2011 | Walker et al. |
| 8,025,294 B2 | 9/2011 | Grauzer et al. |
| 8,038,521 B2 | 10/2011 | Grauzer et al. |
| RE42,944 E | 11/2011 | Blaha et al. |
| 8,057,302 B2 | 11/2011 | Wells et al. |
| 8,062,134 B2 | 11/2011 | Kelly et al. |
| 8,070,574 B2 | 12/2011 | Grauzer et al. |
| 8,092,307 B2 | 1/2012 | Kelly |
| 8,092,309 B2 | 1/2012 | Bickley |
| 8,109,514 B2 | 2/2012 | Toyama |
| 8,141,875 B2 | 3/2012 | Grauzer et al. |
| 8,150,158 B2 | 4/2012 | Downs, III |
| 8,171,567 B1 | 5/2012 | Fraser et al. |
| 8,210,536 B2 | 7/2012 | Blaha et al. |
| 8,221,244 B2 | 7/2012 | French |
| 8,251,293 B2 | 8/2012 | Nagata et al. |
| 8,267,404 B2 | 9/2012 | Grauzer et al. |
| 8,270,603 B1 | 9/2012 | Durst et al. |
| 8,287,347 B2 | 10/2012 | Snow et al. |
| 8,287,386 B2 | 10/2012 | Miller et al. |
| 8,319,666 B2 | 11/2012 | Weinmann et al. |
| 8,337,296 B2 | 12/2012 | Grauzer et al. |
| 8,342,525 B2 | 1/2013 | Scheper et al. |
| 8,342,526 B1 | 1/2013 | Sampson |
| 8,342,529 B2 | 1/2013 | Snow |
| 8,353,513 B2 | 1/2013 | Swanson |
| 8,381,918 B2 | 2/2013 | Johnson |
| 8,419,521 B2 | 4/2013 | Grauzer et al. |
| 8,429,229 B2 | 4/2013 | Sepich et al. |
| 8,444,147 B2 | 5/2013 | Grauzer et al. |
| 8,444,489 B2 | 5/2013 | Lian et al. |
| 8,469,360 B2 | 6/2013 | Sines |
| 8,475,252 B2 | 7/2013 | Savage et al. |
| 8,480,088 B2 | 7/2013 | Toyama et al. |
| 8,485,527 B2 | 7/2013 | Sampson et al. |
| 8,490,973 B2 | 7/2013 | Yoseloff et al. |
| 8,498,444 B2 | 7/2013 | Sharma |
| 8,505,916 B2 | 8/2013 | Grauzer et al. |
| 8,511,684 B2 | 8/2013 | Grauzer et al. |
| 8,512,146 B2 | 8/2013 | Gururajan et al. |
| 8,548,327 B2 | 10/2013 | Hirth et al. |
| 8,556,263 B2 | 10/2013 | Grauzer et al. |
| 8,579,289 B2 | 11/2013 | Rynda et al. |
| 8,602,416 B2 | 12/2013 | Toyama |
| 8,616,552 B2 | 12/2013 | Czyzewski et al. |
| 8,628,086 B2 | 1/2014 | Krenn et al. |
| 8,651,485 B2 | 2/2014 | Stasson |
| 8,662,500 B2 | 3/2014 | Swanson |
| 8,695,978 B1 | 4/2014 | Ho |
| 8,702,100 B2 | 4/2014 | Snow et al. |
| 8,702,101 B2 | 4/2014 | Scheper et al. |
| 8,720,891 B2 | 5/2014 | Hessing et al. |
| 8,758,111 B2 | 6/2014 | Lutnick |
| 8,777,710 B2 | 7/2014 | Grauzer et al. |
| 8,820,745 B2 | 9/2014 | Grauzer et al. |
| 8,844,930 B2 | 9/2014 | Sampson |
| 8,899,587 B2 | 12/2014 | Grauzer et al. |
| 8,919,775 B2 | 12/2014 | Wadds et al. |
| 9,101,821 B2 | 8/2015 | Snow |
| 9,251,661 B2 | 2/2016 | Tammesoo |
| 9,266,012 B2 | 2/2016 | Grauzer |
| 9,280,866 B2 | 3/2016 | Nayak et al. |
| 9,474,957 B2 | 10/2016 | Haushalter et al. |
| 9,504,905 B2 | 11/2016 | Kelly et al. |
| 9,511,274 B2 * | 12/2016 | Kelly ............... A63F 1/12 |
| 9,566,501 B2 | 2/2017 | Stasson et al. |
| 9,731,190 B2 | 8/2017 | Sampson et al. |
| 2001/0036231 A1 | 11/2001 | Easwar et al. |
| 2001/0036866 A1 | 11/2001 | Stockdale et al. |
| 2001/0054576 A1 | 12/2001 | Stardust et al. |
| 2002/0017481 A1 | 2/2002 | Johnson et al. |
| 2002/0030425 A1 | 3/2002 | Tiramani et al. |
| 2002/0045478 A1 | 4/2002 | Soltys et al. |
| 2002/0045481 A1 | 4/2002 | Soltys et al. |
| 2002/0063389 A1 | 5/2002 | Breeding et al. |
| 2002/0068635 A1 | 6/2002 | Hill |
| 2002/0070499 A1 | 6/2002 | Breeding et al. |
| 2002/0094869 A1 | 7/2002 | Harkham |
| 2002/0107067 A1 | 8/2002 | McGlone et al. |
| 2002/0107072 A1 | 8/2002 | Giobbi |
| 2002/0113368 A1 | 8/2002 | Hessing et al. |
| 2002/0135692 A1 | 9/2002 | Fujinawa |
| 2002/0142820 A1 | 10/2002 | Bartlett |
| 2002/0155869 A1 | 10/2002 | Soltys et al. |
| 2002/0163122 A1 | 11/2002 | Vancura |
| 2002/0163125 A1 | 11/2002 | Grauzer et al. |
| 2002/0187821 A1 | 12/2002 | Soltys et al. |
| 2002/0187830 A1 | 12/2002 | Rockdale et al. |
| 2003/0003997 A1 | 1/2003 | Vuong et al. |
| 2003/0007143 A1 | 1/2003 | McArthur et al. |
| 2003/0042673 A1 | 3/2003 | Grauzer |
| 2003/0047870 A1 | 3/2003 | Blaha et al. |
| 2003/0048476 A1 | 3/2003 | Yamakawa |
| 2003/0052449 A1 | 3/2003 | Grauzer et al. |
| 2003/0052450 A1 | 3/2003 | Grauzer et al. |
| 2003/0064798 A1 | 4/2003 | Grauzer et al. |
| 2003/0067112 A1 | 4/2003 | Grauzer et al. |
| 2003/0071413 A1 | 4/2003 | Blaha et al. |
| 2003/0073498 A1 | 4/2003 | Grauzer et al. |
| 2003/0075865 A1 | 4/2003 | Grauzer et al. |
| 2003/0075866 A1 | 4/2003 | Blaha et al. |
| 2003/0087694 A1 | 5/2003 | Starch |
| 2003/0090059 A1 | 5/2003 | Grauzer et al. |
| 2003/0094756 A1 | 5/2003 | Grauzer et al. |
| 2003/0151194 A1 | 8/2003 | Hessing et al. |
| 2003/0195025 A1 | 10/2003 | Hill |
| 2004/0015423 A1 | 1/2004 | Walker et al. |
| 2004/0036214 A1 | 2/2004 | Baker et al. |
| 2004/0067789 A1 | 4/2004 | Grauzer et al. |
| 2004/0100026 A1 | 5/2004 | Haggard |
| 2004/0108654 A1 | 6/2004 | Grauzer et al. |
| 2004/0116179 A1 | 6/2004 | Nicely et al. |
| 2004/0169332 A1 | 9/2004 | Grauzer et al. |
| 2004/0180722 A1 | 9/2004 | Giobbi |
| 2004/0224777 A1 | 11/2004 | Smith et al. |
| 2004/0245720 A1 | 12/2004 | Grauzer et al. |
| 2004/0259618 A1 | 12/2004 | Soltys et al. |
| 2005/0012671 A1 | 1/2005 | Bisig |
| 2005/0012818 A1 | 1/2005 | Kiely et al. |
| 2005/0023752 A1 | 2/2005 | Grauzer et al. |
| 2005/0026680 A1 | 2/2005 | Gururajan |
| 2005/0035548 A1 | 2/2005 | Yoseloff |
| 2005/0037843 A1 | 2/2005 | Wells et al. |
| 2005/0040594 A1 | 2/2005 | Krenn et al. |
| 2005/0051955 A1 | 3/2005 | Schubert et al. |
| 2005/0051956 A1 | 3/2005 | Grauzer et al. |
| 2005/0062227 A1 | 3/2005 | Grauzer et al. |
| 2005/0062228 A1 | 3/2005 | Grauzer et al. |
| 2005/0062229 A1 | 3/2005 | Grauzer et al. |
| 2005/0082750 A1 | 4/2005 | Grauzer et al. |

(56) References Cited

U.S. PATENT DOCUMENTS

| | | |
|---|---|---|
| 2005/0093231 A1 | 5/2005 | Grauzer et al. |
| 2005/0104289 A1 | 5/2005 | Grauzer et al. |
| 2005/0104290 A1 | 5/2005 | Grauzer et al. |
| 2005/0110210 A1 | 5/2005 | Soltys et al. |
| 2005/0113166 A1 | 5/2005 | Grauzer et al. |
| 2005/0113171 A1 | 5/2005 | Hodgson |
| 2005/0119048 A1 | 6/2005 | Soltys |
| 2005/0121852 A1 | 6/2005 | Soltys et al. |
| 2005/0137005 A1 | 6/2005 | Soltys et al. |
| 2005/0140090 A1 | 6/2005 | Breeding et al. |
| 2005/0146093 A1 | 7/2005 | Grauzer et al. |
| 2005/0148391 A1 | 7/2005 | Tain |
| 2005/0164759 A1 | 7/2005 | Smith et al. |
| 2005/0164761 A1 | 7/2005 | Tain |
| 2005/0192092 A1 | 9/2005 | Breckner et al. |
| 2005/0206077 A1 | 9/2005 | Grauzer et al. |
| 2005/0242500 A1 | 11/2005 | Downs |
| 2005/0272501 A1 | 12/2005 | Tran et al. |
| 2005/0277463 A1 | 12/2005 | Knust et al. |
| 2005/0288083 A1 | 12/2005 | Downs |
| 2005/0288086 A1 | 12/2005 | Schubert et al. |
| 2006/0027970 A1 | 2/2006 | Kyrychenko |
| 2006/0033269 A1 | 2/2006 | Grauzer et al. |
| 2006/0033270 A1 | 2/2006 | Grauzer et al. |
| 2006/0046853 A1 | 3/2006 | Black |
| 2006/0063577 A1 | 3/2006 | Downs, III et al. |
| 2006/0066048 A1 | 3/2006 | Krenn et al. |
| 2006/0151946 A1 | 7/2006 | Ngai |
| 2006/0181022 A1 | 8/2006 | Grauzer et al. |
| 2006/0183540 A1 | 8/2006 | Grauzer et al. |
| 2006/0189381 A1 | 8/2006 | Daniel et al. |
| 2006/0199649 A1 | 9/2006 | Soltys et al. |
| 2006/0205508 A1 | 9/2006 | Green |
| 2006/0220312 A1 | 10/2006 | Baker et al. |
| 2006/0220313 A1 | 10/2006 | Baker et al. |
| 2006/0252521 A1 | 11/2006 | Gururajan et al. |
| 2006/0252554 A1 | 11/2006 | Gururajan et al. |
| 2006/0279040 A1 | 12/2006 | Downs et al. |
| 2006/0281534 A1 | 12/2006 | Grauzer et al. |
| 2007/0001395 A1 | 1/2007 | Gioia et al. |
| 2007/0006708 A1 | 1/2007 | Laakso |
| 2007/0015583 A1 | 1/2007 | Tran |
| 2007/0018389 A1 | 1/2007 | Downs, III |
| 2007/0045959 A1 | 3/2007 | Soltys |
| 2007/0049368 A1 | 3/2007 | Kuhn et al. |
| 2007/0057469 A1 | 3/2007 | Grauzer et al. |
| 2007/0066387 A1 | 3/2007 | Matsuno et al. |
| 2007/0069462 A1 | 3/2007 | Downs, III et al. |
| 2007/0072677 A1 | 3/2007 | Lavoie et al. |
| 2007/0102879 A1 | 5/2007 | Stasson |
| 2007/0111773 A1 | 5/2007 | Gururajan et al. |
| 2007/0148283 A1 | 6/2007 | Harvey et al. |
| 2007/0184905 A1 | 8/2007 | Gatto et al. |
| 2007/0197294 A1 | 8/2007 | Gong |
| 2007/0197298 A1 | 8/2007 | Rowe |
| 2007/0202941 A1 | 8/2007 | Miltenberger et al. |
| 2007/0222147 A1 | 9/2007 | Blaha et al. |
| 2007/0225055 A1 | 9/2007 | Weisman |
| 2007/0233567 A1 | 10/2007 | Daly |
| 2007/0238506 A1 | 10/2007 | Ruckle |
| 2007/0259709 A1 | 11/2007 | Kelly et al. |
| 2007/0267812 A1 | 11/2007 | Grauzer et al. |
| 2007/0272600 A1 | 11/2007 | Johnson |
| 2007/0278739 A1 | 12/2007 | Swanson |
| 2007/0287534 A1 | 12/2007 | Fleckenstein |
| 2007/0290438 A1 | 12/2007 | Grauzer et al. |
| 2008/0004107 A1 | 1/2008 | Nguyen et al. |
| 2008/0006997 A1 | 1/2008 | Scheper et al. |
| 2008/0006998 A1 | 1/2008 | Grauzer et al. |
| 2008/0022415 A1 | 1/2008 | Kuo et al. |
| 2008/0032763 A1 | 2/2008 | Giobbi |
| 2008/0039192 A1 | 2/2008 | Laut |
| 2008/0039208 A1 | 2/2008 | Abrink et al. |
| 2008/0096656 A1 | 4/2008 | LeMay et al. |
| 2008/0111300 A1 | 5/2008 | Czyzewski et al. |
| 2008/0113700 A1 | 5/2008 | Czyzewski et al. |
| 2008/0136108 A1 | 6/2008 | Polay |
| 2008/0143048 A1 | 6/2008 | Shigeta |
| 2008/0176627 A1 | 7/2008 | Lardie |
| 2008/0217218 A1 | 9/2008 | Johnson |
| 2008/0234046 A1 | 9/2008 | Kinsley |
| 2008/0234047 A1 | 9/2008 | Nguyen |
| 2008/0248875 A1 | 10/2008 | Beatty |
| 2008/0284096 A1 | 11/2008 | Toyama et al. |
| 2008/0303210 A1 | 12/2008 | Grauzer et al. |
| 2008/0315517 A1 | 12/2008 | Toyama et al. |
| 2009/0026700 A2 | 1/2009 | Shigeta |
| 2009/0048026 A1 | 2/2009 | French |
| 2009/0054161 A1 | 2/2009 | Schuber et al. |
| 2009/0072477 A1 | 3/2009 | Tseng et al. |
| 2009/0121429 A1 | 3/2009 | Walsh et al. |
| 2009/0091078 A1 | 4/2009 | Grauzer et al. |
| 2009/0100409 A1 | 4/2009 | Toneguzzo |
| 2009/0104963 A1 | 4/2009 | Burman |
| 2009/0134575 A1 | 5/2009 | Dickinson et al. |
| 2009/0140492 A1 | 6/2009 | Yoseloff et al. |
| 2009/0166970 A1 | 7/2009 | Rosh et al. |
| 2009/0176547 A1 | 7/2009 | Katz |
| 2009/0179378 A1 | 7/2009 | Amaitis et al. |
| 2009/0186676 A1 | 7/2009 | Amaitis et al. |
| 2009/0189346 A1 | 7/2009 | Krenn et al. |
| 2009/0191933 A1 | 7/2009 | French |
| 2009/0194988 A1 | 8/2009 | Wright et al. |
| 2009/0197662 A1 | 8/2009 | Wright et al. |
| 2009/0224476 A1 | 9/2009 | Grauzer et al. |
| 2009/0227318 A1 | 9/2009 | Wright et al. |
| 2009/0227360 A1 | 9/2009 | Gioia et al. |
| 2009/0250873 A1 | 10/2009 | Jones |
| 2009/0253478 A1 | 10/2009 | Walker et al. |
| 2009/0253503 A1 | 10/2009 | Krise et al. |
| 2009/0267296 A1 | 10/2009 | Ho et al. |
| 2009/0267297 A1 | 10/2009 | Blaha et al. |
| 2009/0283969 A1 | 11/2009 | Tseng et al. |
| 2009/0298577 A1 | 12/2009 | Gagner et al. |
| 2009/0302535 A1 | 12/2009 | Ho et al. |
| 2009/0302537 A1 | 12/2009 | Ho et al. |
| 2009/0312093 A1 | 12/2009 | Walker et al. |
| 2009/0314188 A1 | 12/2009 | Toyama et al. |
| 2010/0013152 A1 | 1/2010 | Grauzer |
| 2010/0038849 A1 | 2/2010 | Scheper et al. |
| 2010/0048304 A1 | 2/2010 | Boesen |
| 2010/0069155 A1 | 3/2010 | Schwartz et al. |
| 2010/0178987 A1 | 7/2010 | Pacey |
| 2010/0197410 A1 | 8/2010 | Leen et al. |
| 2010/0234110 A1 | 9/2010 | Clarkson |
| 2010/0240440 A1 | 9/2010 | Szrek et al. |
| 2010/0244376 A1 | 9/2010 | Johnson |
| 2010/0244382 A1 | 9/2010 | Snow |
| 2010/0252992 A1 | 10/2010 | Sines |
| 2010/0255899 A1 | 10/2010 | Paulsen |
| 2010/0276880 A1 | 11/2010 | Grauzer et al. |
| 2010/0311493 A1 | 12/2010 | Miller et al. |
| 2010/0311494 A1 | 12/2010 | Miller et al. |
| 2010/0314830 A1 | 12/2010 | Grauzer et al. |
| 2010/0320685 A1 | 12/2010 | Grauzer |
| 2011/0006480 A1 | 1/2011 | Grauzer |
| 2011/0012303 A1 | 1/2011 | Kourgiantakis et al. |
| 2011/0024981 A1 | 2/2011 | Tseng |
| 2011/0052049 A1 | 3/2011 | Rajaraman et al. |
| 2011/0062662 A1 | 3/2011 | Ohta |
| 2011/0078096 A1 | 3/2011 | Bounds |
| 2011/0079959 A1 | 4/2011 | Hartley |
| 2011/0105208 A1 | 5/2011 | Bickley |
| 2011/0109042 A1 | 5/2011 | Rynda |
| 2011/0130185 A1 | 6/2011 | Walker |
| 2011/0130190 A1 | 6/2011 | Hamman et al. |
| 2011/0159952 A1 | 6/2011 | Kerr |
| 2011/0159953 A1 | 6/2011 | Kerr |
| 2011/0165936 A1 | 7/2011 | Kerr |
| 2011/0172008 A1 | 7/2011 | Alderucci |
| 2011/0183748 A1 | 7/2011 | Wilson et al. |
| 2011/0230268 A1 | 9/2011 | Williams |
| 2011/0269529 A1 | 11/2011 | Baerlocher |
| 2011/0272881 A1 | 11/2011 | Sines |

(56) References Cited

U.S. PATENT DOCUMENTS

| | | |
|---|---|---|
| 2011/0285081 A1 | 11/2011 | Stasson |
| 2011/0287829 A1 | 11/2011 | Clarkson et al. |
| 2012/0015724 A1 | 1/2012 | Ocko et al. |
| 2012/0015725 A1 | 1/2012 | Ocko et al. |
| 2012/0015743 A1 | 1/2012 | Lam et al. |
| 2012/0015747 A1 | 1/2012 | Ocko et al. |
| 2012/0021835 A1 | 1/2012 | Keller et al. |
| 2012/0034977 A1 | 2/2012 | Kammler |
| 2012/0062745 A1 | 3/2012 | Han et al. |
| 2012/0074646 A1 | 3/2012 | Grauzer et al. |
| 2012/0091656 A1 | 4/2012 | Blaha et al. |
| 2012/0095982 A1 | 4/2012 | Lennington et al. |
| 2012/0161393 A1 | 6/2012 | Krenn et al. |
| 2012/0175841 A1 | 7/2012 | Grauzer |
| 2012/0181747 A1 | 7/2012 | Grauzer et al. |
| 2012/0187625 A1 | 7/2012 | Downs, III et al. |
| 2012/0242782 A1 | 9/2012 | Huang |
| 2012/0286471 A1 | 11/2012 | Grauzer et al. |
| 2012/0306152 A1 | 12/2012 | Krishnamurty et al. |
| 2013/0020761 A1 | 1/2013 | Sines |
| 2013/0023318 A1 | 1/2013 | Abrahamson |
| 2013/0085638 A1 | 4/2013 | Weinmann et al. |
| 2013/0099448 A1 | 4/2013 | Scheper et al. |
| 2013/0109455 A1 | 5/2013 | Grauzer et al. |
| 2013/0132306 A1 | 5/2013 | Kami et al. |
| 2013/0147116 A1 | 6/2013 | Stasson |
| 2013/0161905 A1 | 6/2013 | Grauzer et al. |
| 2013/0228972 A1 | 9/2013 | Grauzer et al. |
| 2013/0241147 A1 | 9/2013 | McGrath |
| 2013/0300059 A1 | 11/2013 | Sampson et al. |
| 2013/0337922 A1 | 12/2013 | Kuhn |
| 2014/0027979 A1 | 1/2014 | Stasson et al. |
| 2014/0094239 A1 | 4/2014 | Grauzer et al. |
| 2014/0103606 A1 | 4/2014 | Grauzer et al. |
| 2014/0138907 A1 | 5/2014 | Rynda et al. |
| 2014/0145399 A1 | 5/2014 | Krenn et al. |
| 2014/0171170 A1 | 6/2014 | Krishnamurty et al. |
| 2014/0175724 A1 | 6/2014 | Huhtala et al. |
| 2014/0183818 A1 | 7/2014 | Czyzewski et al. |
| 2015/0021242 A1 | 1/2015 | Johnson |
| 2015/0069699 A1 | 3/2015 | Blazevic |
| 2015/0196834 A1 | 7/2015 | Snow |
| 2015/0238848 A1 | 8/2015 | Kuhn et al. |
| 2017/0157499 A1 | 6/2017 | Krenn et al. |

FOREIGN PATENT DOCUMENTS

| | | |
|---|---|---|
| AU | 697805 B2 | 10/1998 |
| AU | 757636 B2 | 2/2003 |
| CA | 2266555 A1 | 9/1996 |
| CA | 2284017 A1 | 9/1998 |
| CA | 2612138 A1 | 12/2006 |
| CN | 2051521 U | 1/1990 |
| CN | 1824356 A | 8/2006 |
| CN | 2848303 Y | 12/2006 |
| CN | 2855481 Y | 1/2007 |
| CN | 101025603 A | 8/2007 |
| CN | 200954370 Y | 10/2007 |
| CN | 200987893 Y | 12/2007 |
| CN | 101099896 A | 1/2008 |
| CN | 101127131 A | 2/2008 |
| CN | 101134141 A | 3/2008 |
| CN | 201085907 Y | 7/2008 |
| CN | 201139926 Y | 10/2008 |
| CN | 100571826 C | 12/2009 |
| CN | 1771077 B | 6/2010 |
| CN | 102125756 A | 7/2011 |
| CN | 102170944 A | 8/2011 |
| CN | 101783011 B | 12/2011 |
| CN | 102847311 A | 1/2013 |
| CN | 202983149 U | 6/2013 |
| CZ | 24952 U1 | 2/2013 |
| DE | 3807127 A1 | 9/1989 |
| DE | 2757341 A1 | 9/1998 |
| EP | 177514 B1 | 2/2000 |
| EP | 1502631 A1 | 2/2005 |
| EP | 1713026 A1 | 10/2006 |
| EP | 1194888 A1 | 8/2009 |
| EP | 2228106 A1 | 9/2010 |
| EP | 1575261 B1 | 8/2012 |
| FR | 2375918 A1 | 7/1978 |
| GB | 337147 A | 9/1929 |
| GB | 414014 A | 7/1934 |
| GB | 672616 A | 5/1952 |
| JP | 10063933 A | 3/1998 |
| JP | 11045321 A | 2/1999 |
| JP | 2000251031 A | 9/2000 |
| JP | 2001327647 A | 11/2001 |
| JP | 2002165916 A | 6/2002 |
| JP | 2003-154320 A | 5/2003 |
| JP | 2003250950 A | 9/2003 |
| JP | 2005198668 A | 7/2005 |
| JP | 2008246061 A | 10/2008 |
| JP | 4586474 B2 | 11/2010 |
| TW | M359356 U | 6/2009 |
| TW | I345476 B | 7/2011 |
| WO | 8700764 A1 | 2/1987 |
| WO | 9221413 A1 | 12/1992 |
| WO | 9528210 A1 | 10/1995 |
| WO | 9607153 A1 | 3/1996 |
| WO | 9710577 A1 | 3/1997 |
| WO | 9814249 A1 | 4/1998 |
| WO | 9840136 A1 | 9/1998 |
| WO | 9943404 A1 | 9/1999 |
| WO | 9952610 A1 | 10/1999 |
| WO | 9952611 A1 | 10/1999 |
| WO | 200051076 A1 | 8/2000 |
| WO | 156670 A1 | 8/2001 |
| WO | 178854 A3 | 10/2001 |
| WO | 205914 A1 | 1/2002 |
| WO | 3026763 A1 | 4/2003 |
| WO | 2004067889 A1 | 12/2004 |
| WO | 2004112923 A1 | 12/2004 |
| WO | 2006031472 A2 | 3/2006 |
| WO | 2006039308 A2 | 4/2006 |
| WO | 2008005286 A2 | 1/2008 |
| WO | 2008006023 A2 | 1/2008 |
| WO | 2008091809 A2 | 7/2008 |
| WO | 2009067758 A1 | 6/2009 |
| WO | 2009137541 A2 | 11/2009 |
| WO | 2010001032 A2 | 1/2010 |
| WO | 2010052573 A2 | 5/2010 |
| WO | 2010055328 A2 | 5/2010 |
| WO | 2010117446 A2 | 10/2010 |
| WO | 2013019677 A2 | 2/2013 |

OTHER PUBLICATIONS

Shuffle Master, Inc. (1996). Let It Ride, the Tournament, User Guide, 72 pages.
Chinese Office Action from Chinese Application No. 201380060943.7, dated May 18, 2015, 25 pages with English translation.
Chinese Office Action from Chinese Application No. 201380060943.7, dated Feb. 2, 2018, 18 pages with English translation.
U.S. Appl. No. 15/276,476, filed Sep. 26, 2016, titled "Devices, Systems, and Related Methods for Real-Time Monitoring and Display of Related Data for Casino Gaming Devices", to Nagaragatta et al., 36 pages.
U.S. Appl. No. 15/365,610, filed Nov. 30, 2016, titled "Card Handling Devices and Related Assemblies and Components", to Helsen et al., 62 pages.
Genevieve Orr, CS-449: Neural Networks Willamette University, http://www.willamette.edu/~gorr/classes/cs449/intro.html (4 pages), Fall 1999.
http://www.google.com/search?tbm=pts&q=Card+handling+devicve+with+input+and+outpu . . . Jun. 8, 2012.
http://www.ildado.com/casino_glossary.html, Feb. 1, 2001, p. 1-8.
https://web.archive.org/web/19991004000323/http://travelwizardtravel.com/majon.htm, Oct. 4, 1999, 2 pages.
http://www.google.com/search?tbm=pts&q=shuffling+zone+onOopposite+site+of+input+. . . Jul. 18, 2012.

(56) References Cited

OTHER PUBLICATIONS

Litwiller, Dave, CCD vs. CMOS: Facts and Fiction reprinted from Jan. 2001 Issue of Photonics Spectra, Laurin Publishing Co. Inc. (4 pages).
Malaysian Patent Application Substantive Examination Adverse Report—Malaysian Patent Application Serial No. PI 20062710, dated May 9, 2009, 4 pages.
PCT International Preliminary Examination Report for International Patent Application No. PCT/US02/31105 dated Jul. 28, 2004, 9 pages.
PCT International Search Report for International Application No. PCT/US2003/015393, dated Oct. 6, 2003, 2 pages.
PCT International Search Report for PCT/US2005/034737 dated Apr. 7, 2006, 1 page. (WO06/039308).
PCT International Search Report for PCT/US2007/022894, dated 11 Jun. 2008, 3 pages.
PCT International Search Report and Written Opinion, PCT/US2012/48706, dated Oct. 16, 2012, 12 pages.
PCT International Search Report and Written Opinion of the International Searching Authority for PCT/US2010/001032, dated Jun. 16, 2010, 11 pages.
PCT International Search Report and Written Opinion for PCT/US07/15035, dated Sep. 29, 2008, 6 pages.
PCT International Search Report and Written Opinion for PCT/US07/15036, dated Sep. 23, 2008, 6 pages.
PCT International Search Report and Written Opinion, PCT Application No. PCT/US2015/051038, dated Jan. 22, 2016, 11 pages.
PCT International Search Report and Written Opinion of the International Searching Authority for PCT/US2008/007069, dated Sep. 8, 2008, 10 pages.
PCT International Search Report and Written Opinion, PCT Application No. PCT/US2015/022158, dated Jun. 17, 2015, 13 pages.
PCT International Search Report and Written Opinion for International Application No. PCT/US2007/023168, dated Sep. 12, 2008, 8 pages.
PCT International Search Report and Written Opinion, PCT Application No. PCT/US2015/040196, dated Jan. 15, 2016, 20 pages.
PCT International Search Report and Written Opinion, PCT Application No. PCT/US2013/062391, dated Dec. 17, 2013, 13 pages.
PCT International Search Report and Written Opinion of the International Searching Authority for PCT/US05/31400, dated Sep. 25, 2007, 12 pages.
PCT International Search Report and Written Opinion, PCT Application No. PCT/US2015/025420, dated Oct. 2, 2015, 15 pages.
PCT International Search Report and Written Opinion of the International Searching Authority for PCT/US13/59665, dated Apr. 25, 2014, 21 pages.
PCT International Search Report and Written Opinion of the International Searching Authority for PCT/IB2013/001756, dated Jan. 10, 2014, 7 pages.
PCT International Search Report and Written Opinion of the International Searching Authority for PCT/US11/59797, dated Mar. 27, 2012, 14 pages.
PCT International Search Report and Written Opinion for International Application No. PCT/US20071022858, dated Mar. 7, 2008, 7 pages.
PCT International Search Report and Written Opinion for International Patent Application No. PCT/US2006/22911, dated Jun. 1, 2007, 6 pages.
PCT International Search Report and Written Opinion of the International Searching Authority for PCT/GB2011/051978, dated Jan. 17, 2012, 11 pages.
Philippines Patent Application Formality Examination Report—Philippines Patent Application No. 1-2006-000302, dated Jun. 13, 2006.
Press Release for Alliance Gaming Corp., Jul 26, 2004—Alliance Gaming Announces Control with Galaxy Macau for New MindPlay Baccarat Table Technology, 2 pages, http://biz.yahoo.com/prnews.
Scarne's Encyclopedia of Games by John Scarne, 1973, "Super Contract Bridge", p. 153.

Shuffle Master Gaming, Service Manual, ACETM Single Deck Card Shuffler, (1998), 63 pages.
Shuffle Master Gaming, Service Manual, Let It Ride Bonus® With Universal Keypad, 112 pages, © 2000 Shuffle Master, Inc.
Service Manual/User Manual for Single Deck Shufflers: BG1, BG2 and BG3 by Shuffle Master ©1997, 151 page.
Singapore Patent Application Examination Report—Singapore Patent Application No. SE 2008 01914 A, dated Jun. 18, 2008, 9 pages.
SHFL Entertainment, Inc., Opening Claim Construction Brief, filed in Nevada District Court Case No. 2:12-cv-01782 with exhibits, Aug. 8, 2013, p. 1-125.
Shuffle Master's Reply Memorandum in Support of Shuffle Master's Motion for Preliminary Injunction for *Shuffle Master, Inc.* vs. *VendingData Corporation*, in the U.S. District Court, District of Nevada, No. CV-S-04-1373-JCM-LRL, Nov. 29, 2004.
Statement of Relevance of Cited References, Submitted as Part of a Third-Party Submission Under 37 CFR 1.290 on Dec. 7, 2012 (12 pages).
tbm=pts&hl=en Google Search for card handling device with storage area, card removing system pivoting arm and processor ; http://www.google.com/?tbrn=pts&hl=en; Jul. 28, 2012, 2 pages.
Tracking the Tables, by Jack Bularsky, Casino Journal, May 2004, vol. 17, No. 5, pp. 44-47.
United States Court of Appeals for the Federal Circuit Decision Decided Dec. 27, 2005 for Preliminary Injuction for *Shuffle Master, Inc.* vs. *VendingData Corporation*, In the U.S. District Court, District of Nevada, No. CV-S-04-1373-JCM-LRL.
VendingData Corporation's Answer and Counterclaim Jury Trial Demanded for *Shuffle Master, Inc.* vs. *VendingData Corporation*, In the U.S. District Court, District of Nevada, No. CV-S-04-1373-JCM-LRL, Oct. 25, 2004.
VendingData Corporation's Opposition to Shuffle Master Inc.'s Motion for Preliminary Injection for *Shuffle Master, Inc.* vs. *VendingData Corporation*, In the U.S. District Court, District of Nevada, No. CV-S-04-1373-JCM-LRL, Nov. 12, 2004.
VendingData Corporation's Responses to Shuffle Master, Inc.'s First set of interrogatories for *Shuffler Master, Inc.* vs. *VendingData Corporation*, In the U.S. District Court, District of Nevada, No. CV-S-04-1373-JCM-LRL, Mar. 14, 2005.
1/3" B/W CCD Camera Module EB100 by EverFocus Electronics Corp., Jul. 31, 2001, 3 pgs.
"ACE, Single Deck Shuffler," Shuffle Master, Inc., (2005), 2 pages.
ADVANSYS, "Player Tracking" http://advansys.si/products/tablescanner/player-tracking/[Sep. 23, 2016 1:41:34 PM], 4 pages.
Australian Examination Report for Australian Application No. 2008202752, dated Sep. 25, 2009, 2 pages.
Australian Examination Report for Australian Application No. 2010202856, dated Aug. 11, 2011, 2 pages.
Australian Provisional Patent Application for Australian Patent Application No. PM7441, filed Aug. 15, 1994, Applicants: Rodney G. Johnson et al., Title: Card Handling Apparatus, 13 pages.
"Automatic casino card shuffle," Alibaba.com, (last visited Jul. 22, 2014), 2 pages.
Bally Systems Catalogue, Ballytech.com/systems, 2012, 13 pages.
Canadian Office Action for CA 2,580,309 dated Mar. 20, 2012 (6 pages).
Canadian Office Action for Canadian Application No. 2,461,726, dated Jul. 19, 2010, 3 pages.
Canadian Office Action for Canadian Application No. 2,461,726, dated Dec. 11, 2013, 3 pages.
Christos Stergiou and Dimitrios Siganos, "Neural Networks," http://www.doc.ic.ac.uk/~nd/surprise_96/journal/vol4/cs11/report.html (13 pages), Dec. 15, 2011.
Complaint filed in the matter of *SHFL entertainment, In.* v. *DigiDeal Corporation*, U.S. District Court, District of Nevada, Civil Action No. CV 2:12-cv-01782-GMC-VCF, Oct. 10, 2012, 62 pages.
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 18 of 23 (color copies from Binder 1).
Documents submitted in the case of *Shuffle Master, Inc.* v. *Card Austria, et al.*, Case No. CV-N-0508-HDM-(VPC) (Consolidated

(56) References Cited

OTHER PUBLICATIONS with Case No. CV-N-02-0244-ERC-(RAM)), May 6, 2003, Part 1 of 23 (Master Index and Binder 1, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 2 of 23 (Master Index and Binder 1, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 3 of 23 (Binder 2, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 4 of 23 (Binder 2, 2 of 2).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 19 of 23 (color copies from Binder 3).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 5 of 23 (Binder 3, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 6 of 23 (Binder 3, 2 of 2).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pp., for clarity, Part 20 of 23 (color copies from Binder 4).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 7 of 23 (Binder 4, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 8 of 23 (Binder 4, 2 of 2).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 21 of 23 (color copies from Binder 6).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 10 of 23 (Binder 6, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 9 of 23 (Binder 5 having no contents; Binder 6, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 11 of 23 (Binder 7, 1 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 12 of 23 (Binder 7, 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 13 of 23 (Binder 8, 1 of 5).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 22 of 23 (color copies from Binder 8, part 1 of 2).
Documents submitted in case of *Shuffle Master, Inc.* v. *Card Aurstia, et al.*, Case No. CV-N-0508-HDM-(VPC) Consolidated with Case No. CV-N-02-0244-ERC-(RAM)), May 6, 2003, scan of color pages, for clarity, Part 23 of 23 (color copies from Binder 8, part 2 of 2).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 14 of 23 (Binder 8, 2 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 15 of 23 (Binder 8, 3 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 16 of 23 (Binder 8, 4 of 5).
Documents submitted in the case of *Shuffle Master, Inc.* v. *Card Austria, et al.*, Case No. CV-N-0508-HDM-(VPC) (Consolidated with Case No. CV-N-02-0244-ERC-(RAM)), May 6, 2003, Part 17 of 23 (Binder 8, 5 of 5).
DVD labeled Exhibit 1. This is a DVD taken by Shuffle Master personnel of the live operation of a CARD One2Si| Shuffler (Oct. 7, 2003). DVD sent to Examiner by US Postal Service.
DVD labeled Morrill Decl. Ex. A is (see Binder 4-1, p. 149/206, Morrill Decl., para. 2.): A video (16 minutes) that the attorney for CARD, Robert Morrill, made to describe the Roblejo prototype card shuffler. DVD sent to Examiner by US Postal Service.
DVD labeled Solberg Decl.Ex.C, which is not a video at all, is (see Binder 4-1, p. 34/206, Solberg Decl., para.8): Computer source code for operating a computer-controlled card shuffler (an early Roblejo prototype card shuffler) and descriptive comments of how the code works. DVD sent to Examiner by US Postal Service.
DVD labeled Luciano Decl. Ex. K is (see Binder 2-1, p. 215/237, Luciano Decl., para.14): A video demonstration (11minutes) of a Luciano Packaging prototype shuffler. DVD sent to Examiner by US Postal Service.
European Search Report for European Application No. 12 152 303, dated Apr. 16, 2012, 3 pages.
European Patent Application Search Report—European Patent Application No. 06772987.1, dated Dec. 10, 2009, 5 pages.
European Examination Report for European Application No. 02 780 410, dated Jan. 25, 2010, 5 pages.
European Examination Report for European Application No. 02 780 410, dated Aug. 9, 2011, 4 pages.
"Error Back propagation," http://willamette.edu~gorr/classes/cs449/backprop.html (4 pages), Nov. 13, 2008.
"i-Deal," Bally Technologies, Inc., (2014), 2 pages.
"shufflers—SHFL entertainment," Gaming Concepts Group, (2012), 6 pages.
"TAG Archives: Shuffle Machine," Gee Wiz Online, (Mar. 25, 2013), 4 pages.
Weisenfeld, Bernie; Inventor betting on shuffler; Courier-Post; Sep. 11, 1990; 1 page.
Solberg, Halvard; Deposition; *Shuffle Tech International* v. *Scientific Games Corp.*, et al. 1:15-cv-3702 (N.D. Ill.); Oct. 18, 2016; pp. 187, 224-246, 326-330, 338-339, 396; Baytowne Reporting; Panama City, FL.
Prototype Glossary and Timelines; *Shuffle Tech International* v. *Scientific Games Corp.*, et al. 1:15-cv-3702 (N.D. Ill.); undated; pp. 1-4.
Olsen, Eddie; Automatic Shuffler 'ready' for Atlantic City experiment; Blackjack Confidential; Jul./Aug. 1989; pp. 6-7.
Gros, Roger; New Card Management System to Be Tested at Bally's Park Place; Casino Journal; Apr. 1989; 5 pages.
Gola, Steve; Deposition; *Shuffle Tech International* v. *Scientific Games Corp.*, et al. 1:15-cv-3702 (N.D. Ill.); Oct. 13, 2016; pp. 1, 9-21, 30-69, 150-167, 186-188, 228-231, 290-315, 411; Henderson Legal Services, Inc.; Washington, DC.

\* cited by examiner

METHODS FOR AUTOMATICALLY GENERATING A CARD DECK LIBRARY AND MASTER IMAGES FOR A DECK OF CARDS, AND A RELATED CARD PROCESSING APPARATUS

CROSS-REFERENCE TO RELATED APPLICATIONS

This application is a continuation of U.S. patent application Ser. No. 14/022,160, filed Sep. 9, 2013, now U.S. Pat. No. 9,511,274, issued Dec. 6, 2016, which is a continuation-in-part of U.S. patent application Ser. No. 13/631,658, filed Sep. 28, 2012, now U.S. Pat. No. 9,378,766, issued Jun. 28, 2016, and entitled "Card Recognition System, Card Handling Device, and Method for Tuning a Card Handling Device," the disclosure of which is hereby incorporated herein by this reference in its entirety.

FIELD

The disclosure relates generally to card recognition in card handling devices. More specifically, disclosed embodiments relate to automatic generation of calibration files and other improvements to card recognition systems of card handling devices.

BACKGROUND

Card handling devices (e.g., card shufflers) are used in the gaming industry for increasing the efficiency, security, and game speed in live table games, such as blackjack, baccarat, and various forms of poker. Card handling devices may perform a variety of functions including randomly shuffling one or more decks of cards in an efficient and thorough manner. In a live table game, shuffling the cards in an efficient and thorough manner may assist in preventing players from having an advantage by knowing the position of specific cards or groups of cards in the final arrangement of cards delivered in the play of the game. Additionally, it may be desirable to shuffle the cards in a very short period of time in order to reduce delay in the play of the game.

Card shufflers may include a card recognition system, which may be used to verify the contents of the card set, such as one or more decks and ensure that the card set contains all the appropriate cards, and also to detect any cards that do not belong therein. The card recognition system may also enable a card shuffler to verify the contents of the deck throughout the game play. Some known card shufflers may comprise a card recognition system that employs sensors and a hardware component that may sense the rank (2-10, Jack-Ace) and suit (Spade, Club, Heart, Diamond) from the face of a card and thereafter convert signals from the sensed data into data array sets. The data array sets may be compared to known data array sets of a verified deck of cards. Other known card shufflers may comprise a camera that captures an unknown image of each card entered into the card shuffler and then extracts the card rank and suit from the unknown image. The unknown image may be compared to master images of a verified deck of cards to identify the cards.

There are several different playing card manufacturers (e.g., Angel, Gemaco, U.S. Playing Card Company, Cartamundi, Ace, Copag, etc.), each having different types of card designs. For example, the card images (e.g., graphics) printed on the card faces may vary from one deck to the next. In addition, the size and location of the rank and suit may also vary from one deck design to the next.

In order to support each of the various possible card images, the card recognition system of the card shuffler may be loaded with a set of master images containing the rank and suit symbols of a particular deck design. The master images may be stored in memory within the card shuffler in a particular sub-directory for that particular deck design. For example, a sub-directory may exist for each deck type supported by the card shuffler. The process of creating these master images conventionally requires a substantial amount of manual measurement and analysis by a technician to create and load the master images for each deck type. For example, the technician may manually enter parameters into a calibration file listing different measurements and locations related to the rank and suit symbols. This process involves trial and error, and is time consuming as the technician attempts to find the right combination of parameters to use in generating the master images.

Another obstacle associated with conventional card detection devices is that card manufacturers may create new deck designs or make changes to existing deck designs. The conventional method of manually creating deck libraries becomes burdensome to technicians who not only have to create the deck libraries, but also need to update the deck libraries of card shufflers in use in the field. In addition, each individual card shuffler may be configured differently, which may require the technician to create a new calibration file for a particular machine. As a result, when the same deck library is created for one card shuffler and then simply reproduced and stored on each additional card shuffler, there may be variations during card recognition from one card shuffler to the next, even within the same model of shuffler.

Once loaded onto a card shuffler, the dealer may select the specific deck design that will be used during game play. Selecting the deck in the card shuffler determines which deck library (e.g., master images and other related files) is used for comparison with the card images captured during use. The dealer may select the incorrect deck type, often for reasons such as a lack of training or, simply, input error. As a result, the deck library from one deck type may be used for comparison with images from another deck type. Using the wrong deck library may result in errors in card identification.

SUMMARY

In an embodiment, a method of automatically generating a calibration file for a card handling device is disclosed. The method comprises capturing a raw image from at least a portion of a card passing through a card handling device, and using a processor, automatically generating a calibration file stored in memory of a main control system of the card handling device. Automatically generating the calibration file comprises identifying at least one parameter associated with a rank area around a rank of the at least a portion of the card, identifying at least one parameter associated with a suit area around a suit of the at least a portion of the card, and storing the at least one parameter associated with the rank area and the at least one parameter associated with the suit area in the calibration file.

In another embodiment, a method of automatically generating one or more deck libraries for one or more decks of cards is disclosed, The method comprises using a processor to automatically generate a first calibration file without user input in identifying at least one parameter associated with a rank area and at least one parameter associated with a suit area for a first deck type of cards, the calibration file including the parameters associated with the rank area and the suit area, storing the first calibration file in a first deck library for the first deck type, using the processor to automatically generate a plurality of master images for the cards of the first deck type using the parameters from the calibration file, and storing the plurality of master images for the cards of the first deck type in the first deck library.

In another embodiment, a card processing apparatus is disclosed. The card processing apparatus comprises a memory device, an imaging device operably coupled with the memory device such that raw images from the imaging device are stored in the memory device, and a main control system coupled with the imaging device. The main control system is configured to run an operating system having a file directory system configured to store a plurality of deck libraries for a plurality of different deck types. The main control system is configured to receive the raw images from the memory device, automatically generate a calibration file having parameters related to a rank area and a suit area for a deck type.

DETAILED DESCRIPTION

Figure 1:
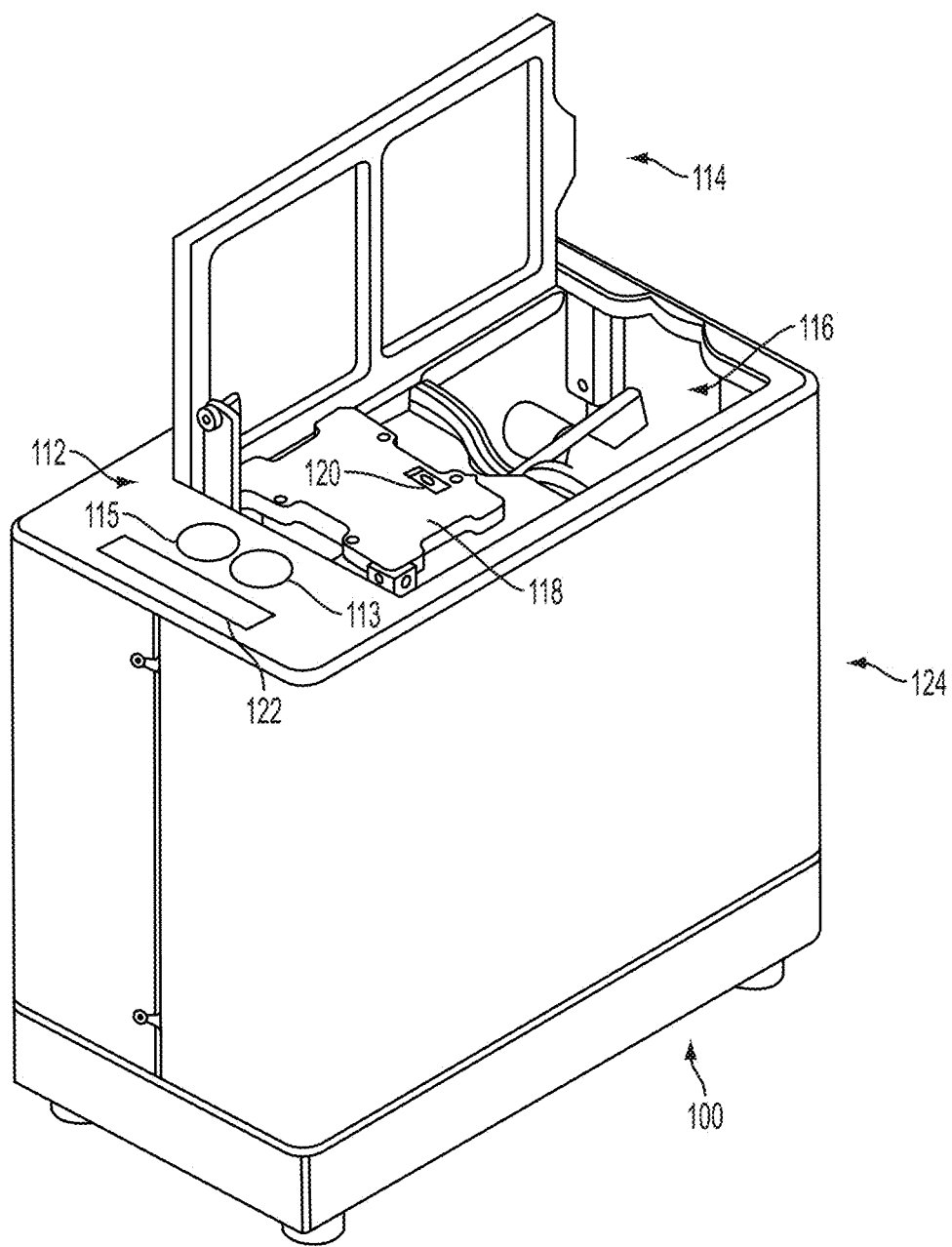
FIG. 1 is a perspective view of a card handling device according to an embodiment of the present disclosure.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the claimed invention is defined only by the appended claims and their legal equivalents. Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

As used herein, the term "master image" is an image generated by a card recognition system during calibration mode that may be stored for future comparison with unknown images to identify a card during card recognition mode. The master images may include separate master images for each rank and suit of a deck. There may also be master images for other symbols, such as a joker, Wagner symbols, deck set symbols, casino symbols and other known symbols. In some embodiments, a master image may include both the rank and the suit of an individual card, such that each individual card has its own master image. A "raw image" is an image generated by a card recognition system during calibration mode and may be used to generate the master image. An example of a "raw image" is an image generated by a two-dimensional (2D) CMOS image sensor. As discussed below, the master images may be generated according to parameters stored in an automatically generated calibration file. In the context of card recognition, a "raw image" may be generated and used to generate an unknown image. The term "unknown image" is an image that is generated by the card recognition system for comparison with a master image to identify a card rank and suit during card recognition mode.

Figure 2:
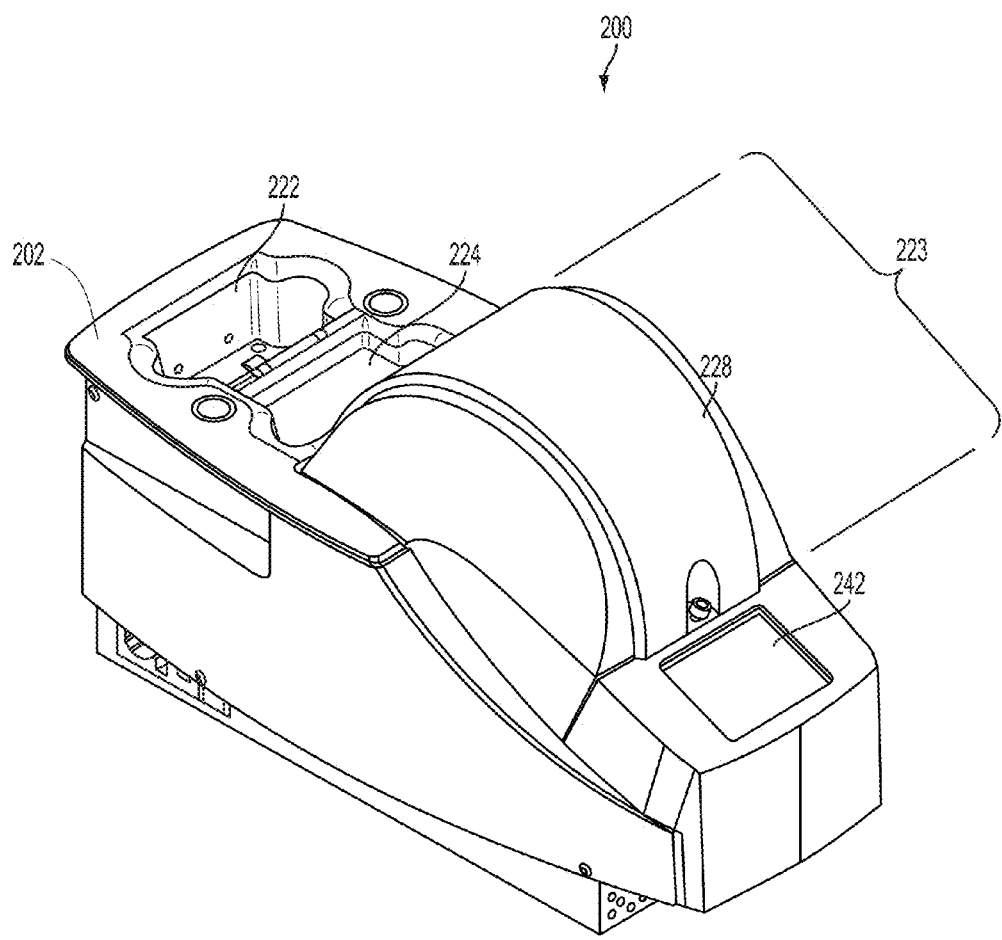
FIG. 2 is a perspective view of a card handling device according to another embodiment of the present disclosure.
Figure 3:
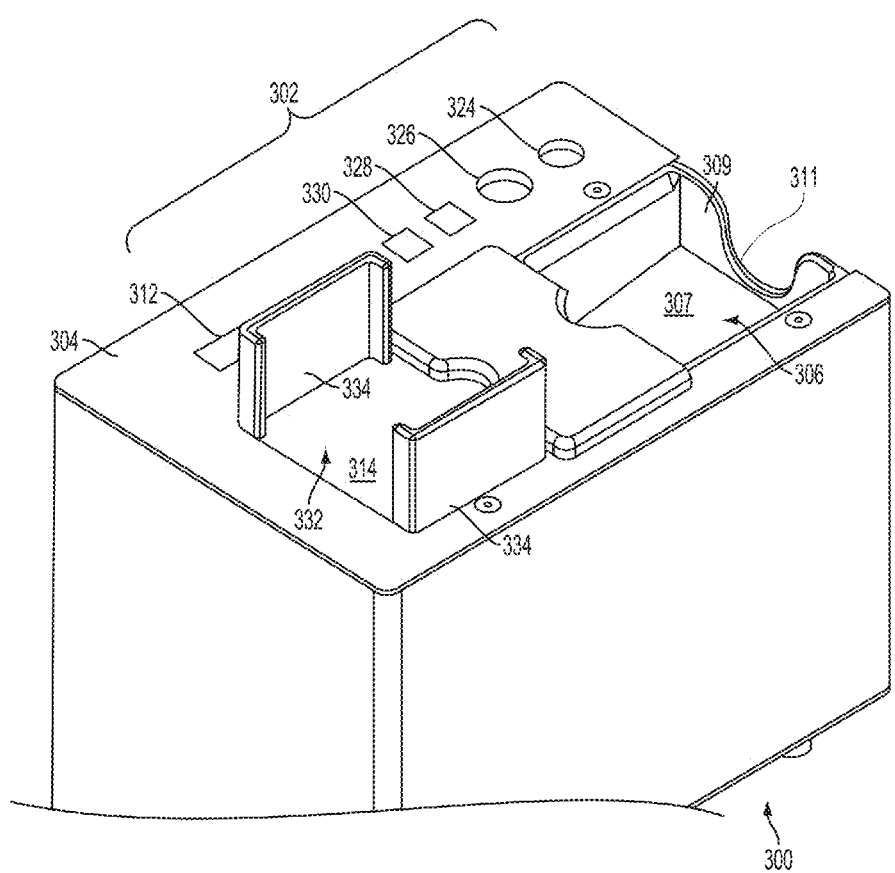
FIG. 3 is a partial perspective view of a card handling device according to another embodiment of the present disclosure.

Embodiments of the present disclosure include card handling devices, card recognition systems, and related methods. It is contemplated that there are various configurations of card handling devices that may include a card recognition system according to an embodiment of the present disclosure. FIGS. 1 through 3, described below, are non-limiting examples of such card handling devices that may employ card recognition systems and methods of the present disclosure. Of course, other configurations of card handling devices are also contemplated.

FIG. 1 is a perspective view of a card handling device 100 according to an embodiment of the present disclosure. The card handling device 100 may be configured to randomize sets of cards, such as decks and sets of multiple decks of cards. The card handling device 100 may include a top surface 112 that comprises a flip-up cover 114 that, when opened, may expose a card insertion area 116 and an elevator platform 118. The card insertion area 116 may be configured to receive an input set of cards to be shuffled, counted, and/or sorted. The card handling device 100 may be configured to receive, read rank and suit, sort, and/or shuffle one or more decks of cards (e.g., standard deck of 52 cards each, 52 cards plus one or two jokers, etc.). The card handling device 100 may be particularly well suited for providing randomized decks of cards for card games, such as blackjack, poker, etc. In some embodiments, the card handling device 100 may be located adjacent to, or flush mounted into, a gaming table surface in a casino where a live card game may be played. In some embodiments, the card handling device 100 may be located at a remote location off the casino floor, which may be inaccessible to the public.

The elevator platform 118 may be configured to raise a set of shuffled cards to a level where the cards may be removed by an operator after the shuffling, reading, and/or sorting processes are completed. Within a protective exterior 124 of the card handling device 100 is a card processing system 400 (FIG. 4) therein. The card processing system 400 may be configured to recognize the identity of the cards as the cards pass through the card handling device 100. The elevator platform 118 may include a card present sensor 120 configured to detect the presence of a card located on the elevator platform 118. Other card present sensors 420 (FIG. 4) in the card processing system 400 may trigger the card recognition system to capture the image of the card or data from the card image.

The card handling device 100 may also be configured to display operational data relating to the device to a display panel 122 located on the top surface 112. An operator using the card handling device 100 may monitor the display panel 122 and view the displayed information in order to know the status of operation of the card handling device 100. Such information displayed on display panel 122 may include the number of cards present in the card handling device 100, the status of any shuffling, reading, or sorting operations, security information relating to the card handling device 100, status relating to a card verification process, or any other information about errors, or the operation of card handling device 100 that would be useful to the operator. In one embodiment, the display panel 122 is an LED display. In another embodiment, the display is an LCD display or other electronic display capable of at least displaying alpha-numeric information. The display panel 122 may include a user interface for the user to interact with the card handling device 100. For example, buttons 113, 115 may control operations, such as power on/off, special functions (e.g., raise elevator to the card delivery position, reshuffle command, security check, card count command, etc.), and the like. In other embodiments, touchscreen controls are provided on a surface of the display panel 122.

Additional details regarding such a card handling device are described in U.S. Pat. No. 7,764,836, issued Jul. 27, 2010, and entitled "Card Shuffler with Card Rank and Value Reading Capability Using CMOS Sensor," and U.S. Patent Application Publication No. 2008/0113700, filed Nov. 10, 2006, now U.S. Pat. No. 8,616,552, issued Dec. 31, 2013, and entitled "Methods and Apparatuses for an Automatic Card Handling Device and Communication Networks Including Same," the disclosure of each of which is incorporated herein in its entirety by this reference.

FIG. 2 is a perspective view of another card handling device 200 according to another embodiment of the present disclosure. The card handling device 200 may include a recessed card infeed tray 222, adjacent recessed card output tray 224, and a plurality of card shuffling compartments (not shown) arranged into a carousel structure 223 that are configured to shuffle a deck of cards inserted into the card infeed tray 222 and outputted in smaller groups, such as hands and/or partial hands to the card output tray 224 during use. The shuffling compartments of the carousel structure 223 may be enclosed within a cover 228. A card present sensor (not shown) in the card output tray 224 may generate a signal that causes the processor to instruct mechanical elements to dispense another group of cards after the last group of cards is removed. The card handling device 200 includes a flange member 202 that may further include a dealer display 242 that may include touch screen controls for the dealer to input commands for the card handling device 200. The card handling device 200 may be flush-mounted on a gaming table. Additional details regarding such a card handling device are described in U.S. Pat. No. 8,342,525, issued Jan. 1, 2013, and entitled "Card Shuffler with Adjacent Card Infeed and Card Output Compartments," the disclosure of which is incorporated herein in its entirety by this reference. The card handling device 200 may further include a card recognition system (FIG. 4) that may be housed within the cover 228, and which will be described in further detail below.

FIG. 3 is a partial perspective view of a card handling device 300 according to yet another embodiment of the present disclosure. The card handling device 300 includes a card receiving area 306 that may be provided with a stationary lower support surface 307 that slopes downwardly from an outer side 309 of the card handling device 300. The outer side 309 may include a depression 311 configured to facilitate an operator's ability to place or remove cards into the card receiving area 306. A top surface 304 of the card handling device 300 may include a user interface 302 that may include a visual display 312 (e.g., LED, liquid crystal, micro monitor, semiconductor display, etc.), and one or more user inputs 324, 326. The user inputs 324, 326 may include one or more buttons, touch screens, etc. The user interface 302 may further include additional lights and/or displays 328, 330, which may be configured to indicate power availability (on/off), a shuffler state (e.g., active shuffling, completed shuffling cycle, insufficient numbers of cards, missing cards, sufficient numbers of cards, complete deck(s), damaged or marked cards, entry functions for the dealer to identify the number of players, the number of cards per hand, access to fixed programming for various games, the number of decks being shuffled, card calibration information, etc.), or other information useful to the operator.

The card handling device 300 may further include a shuffled card return area 332. The shuffled card return area 332 may include an elevator surface 314 and card supporting sides 334 that surround at least a portion of the elevator surface 314. In some embodiments, the card supporting sides 334 remain fixed to the elevator surface 314 during operation. In other embodiments, the card supporting sides 334 may be fixed to the frame and do not move. In some embodiments, the card supporting sides 334 may be removable. Removal of the card supporting sides 334 may enable the operator to lift shuffled groups of cards onto a gaming table surface for use in a card game. Additional details regarding such a card handling device are described in U.S. Pat. No. 7,764,836, issued Jul. 27, 2010, and entitled "Card Shuffler with Card Rank and Value Reading Capability Using CMOS Sensor," the disclosure of which is incorporated herein in its entirety by this reference. The card handling device 300 may further include a card recognition system (not shown), which will be described in further detail below.

Depending on the configuration of the card handling device employed, the physical configuration of the card recognition system may also vary from one card handling device to the next. For example, the placement of the imaging device may be different (e.g., different angles) from one card handling device to the next, which may result in the need to generate and maintain different deck libraries for the various types of card handling devices. According to conventional methods for generating deck libraries and master images where each step is performed manually, the need to maintain deck libraries for various types of card handling devices is increased with the different shuffler structures, which may further add to the benefits and advantages of embodiments of the present disclosure.

Embodiments of the present disclosure include apparatuses and related methods for automatically generating a calibration file for a card handling device. Thus, rather than using substantial human interaction and trial and error to arrive at certain parameters used in the identification of an unknown card, embodiments of the present disclosure use a processor programmed to identify the location and dimensions on a card for a rank, suit, region of interest, and/or other measurements regardless of the deck type and without user interaction, and to generate a calibration file that is later used during a card recognition mode of the processor.

Figure 4:
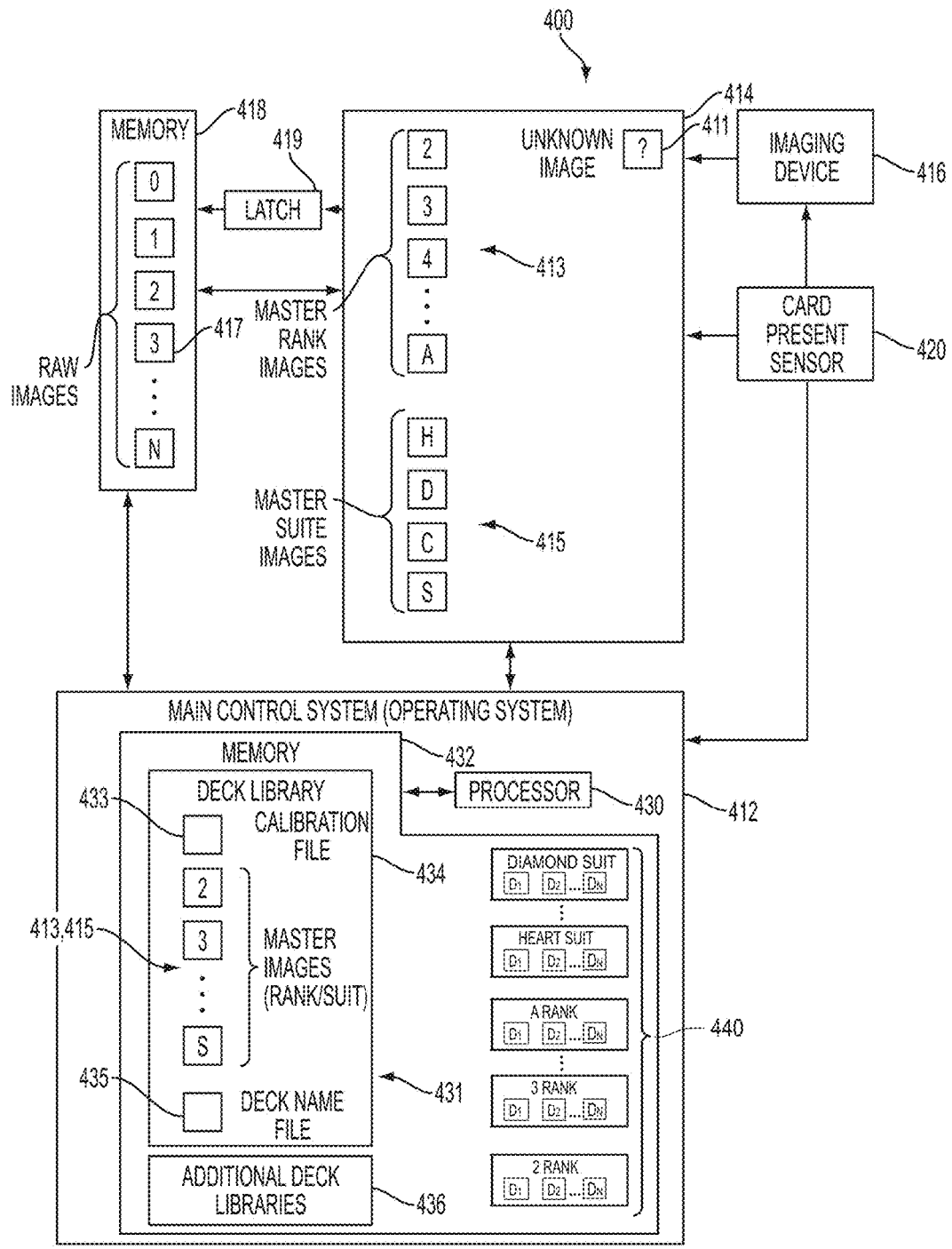
FIG. 4 is a schematic block diagram of a card processing system for a card handling device according to an embodiment of the present disclosure.

FIG. 4 is a schematic block diagram of a card processing system 400 for a card handling device according to an embodiment of the present disclosure. Examples of card handling devices 100, 200, 300 that may include the card processing system 400 include those described above with respect to FIGS. 1 through 3. Of course, it is contemplated that the card processing system 400 may be adapted for use within any card handling device that is configured to shuffle, sort, deal, process or otherwise handle a deck of cards.

The card processing system 400 may be configured to be automatically tuned to obtain card rank and suit information from one or more decks of cards of different designs and manufacturers, after which the card processing system 400 may be used to determine the identity (i.e., rank and suit) of an unknown card passing through the card handling device. The ability to determine the identity of an unknown card may be desirable for fraud detection, verifying that the proper cards are in a deck, or for other reasons. In some embodiments, the card processing system 400 may also be configured to control the shuffling of the cards, as well as the motors, rollers, etc., that move the cards through the card handling device. In some embodiments, a separate shuffler processor (not shown) may be configured to control the mechanical operation of the card handling device.

The card processing system 400 may include a main control system 412, a card recognition processor 414, an imaging device 416, a memory device 418, a latch 419, and a card present sensor 420. Each of the main control system 412, card recognition processor 414, imaging device 416, the memory device 418, and the card present sensor 420 may be coupled with each other for communication therebetween. The latch 419 may be coupled between the card recognition processor 414 and the memory device 418.

Figure 5:
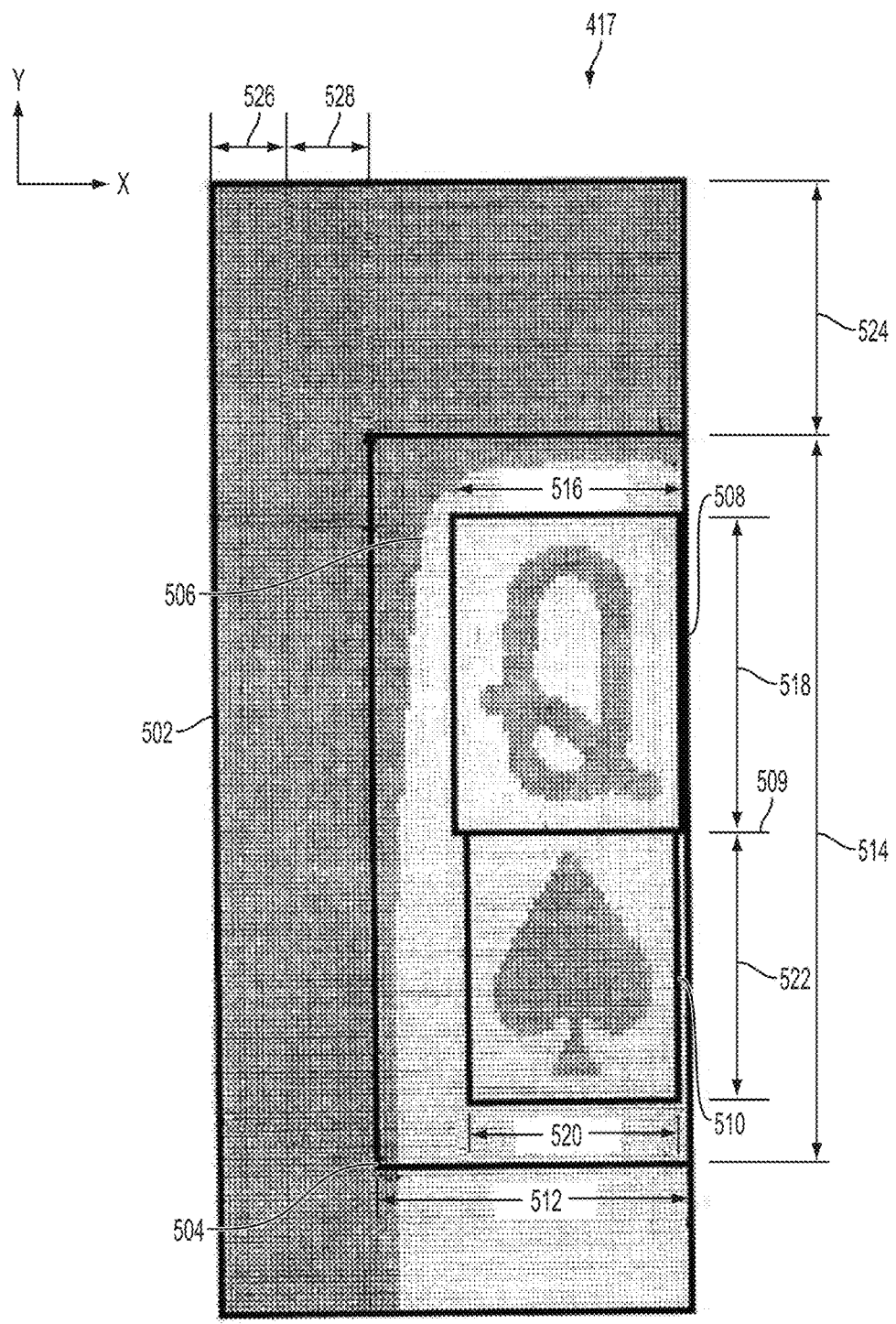
FIG. 5 is an illustration of an image captured by an imaging device of a card handling device, according to an embodiment of the present disclosure.

The card recognition processor 414 may be coupled with the imaging device 416 to receive captured images. Capturing an image of all or a portion of the card is also referred to herein as "reading the card." Cards may be read when stationary or in motion within the card handling device. The imaging device 416 may be positioned and oriented within the card handling device, such that at least a portion of the card may be placed within a field of view of the imaging device 416 when capturing an image of the card. As shown in FIG. 5, a portion of card 506 for a resulting raw image 417 that is within the field of view 502 of the imaging device 416 may be the upper-left hand corner of the card 506. (When the card is face-up, long side along the x axis). Additional detail regarding analysis of the raw image 417, and the related information derived therefrom, will be discussed with more detail below with respect to FIG. 5.

Referring again specifically to FIG. 4, the main control system 412 may include a processor 430 and memory 432. The processor 430 may be configured to perform operations, such as executing instructions (e.g., software code) that perform methods described herein. The instructions may include a program that will run on the main control system 412 at the time the card handing device is tuned (i.e., calibrated) for a specific deck of cards of a specific design. The memory 432 may be configured to store information therein. For example, the memory 432 may store the executables and other files that enable the processor 430 to run the operating system on the main control system 412. The memory 432 may include volatile and/or non-volatile memory. The main control system 412 may run an operating system (e.g., Linux, WINDOWS®, etc.). The main control system 412 may be configured to instruct the imaging device 416 to capture the image (e.g., responsive to a trigger signal from the card present sensor 420) or to extract data from a symbol printed in the field of view 502. The main control system 412 may also be configured to communicate information to input and output devices (not shown), such as a display, operator inputs, etc.

The operating system may enable a data organization structure that includes a file system 431 for storing files (e.g., image files, calibration files, etc.) within the memory 432 that may be used to determine the identity of unknown cards during card recognition mode. The main control system 412 may be configured to organize the file system 431 into sub-directories 434, 436. Each sub-directory 434, 436 may be for a deck type or design to which the card processing system 400 has been tuned. Thus, a sub-directory may also be referred to as a "deck library." A first deck library 434 may include files stored therein that are for a first particular deck type. For example, files stored within the first deck library 434 may include a calibration file 433, a deck name file 435, and a plurality of master images 413, 415. The calibration file 433 may include parameters that identify certain measurements (e.g., rank and suit areas, region of interest, etc.) that may be used by the main control system 412 and/or the card recognition processor 414 to generate the master images 413, 415 and/or process other images to be compared with the master images 413, 415.

The processor 430 of the main control system 412 may be configured (e.g., programmed) to control the card processing system 400 for operation in one of a plurality of modes. For example, the card processing system 400 may be capable of operating in a calibration mode (e.g., automatically generating a calibration file, master images, and other files of a deck library) and a card recognition mode (e.g., determining the identity of an unknown card passing through the card handling device).

During the calibration mode, the card processing system 400 may be "tuned" to recognize a particular deck of cards or deck type. Therefore, the calibration mode may also be referred to herein as the "tuning mode." During calibration mode, the main control system 412 may be configured to automatically generate the calibration file 433 and the master images 413, 415 that may be employed by the card processing system 400 when subsequently operated in the card recognition mode. The master images 413, 415 include master rank images 413 and master suit images 415 for the specific card deck type or deck design to which the card processing system 400 is being tuned. Thus, for example, the master rank images 413 may include thirteen images, one for each rank (2, 3, . . . 10, Jack (J), Queen (Q), King (K), and Ace (A)), and the master suit images 415 may include four images, one for each suit (Diamonds (D), Hearts (H), Spades (S), and Clubs (C)). The result from calibration mode includes the calibration file 433, the master images 413, 415, and the deck name file 435 being stored in a deck library 434 for the specific deck type.

The master images 413, 415 may be generated by the card processing system 400 by reading a pre-sorted deck into the card processing system 400. As used herein, "pre-sorted" means that cards of the deck to be tuned are placed and read into the card processing system 400 in an order that is known or expected by the main control system 412 during calibration mode. The term "pre-sorted" is not intended to require any particular order of cards, but rather an order that is expected by the main control system 412. In other words, the card processing system 400 knows the rank and suit of each respective card as it is read into the card processing system 400 and used to generate the master images 413, 415. In some embodiments, the master images 413, 415 may be generated by the card processing system 400 by reading an unsorted (e.g., randomly ordered) deck of cards into the card processing system 400. "Unsorted," therefore, means that the cards of a deck to be tuned are placed in an order that is unknown or unexpected by the main control system 412. From the perspective of the main control system 412, an unsorted deck is a randomly ordered deck. Additional details regarding the generation of master images 413, 415 of a pre-sorted and an unsorted deck are described below with reference to FIGS. 7 and 8A-8C.

As discussed above, the file system 431 may include additional deck libraries 436 that are unique to additional deck types to which the card processing system 400 has been tuned. For example, a deck library may be stored for each style or brand of cards used by a casino. As a result, each time the card processing system 400 is tuned for a new deck type, the card processing system 400 may automatically generate a new deck library having a calibration file 433, a deck name file 435, and plurality of master images 413, 415 for the new deck type stored therein. Any number of deck libraries may be generated and included within the file system 431, according to the number of desired deck types to which the card processing system 400 is tuned. Because card styles sometimes change over time, it may be desirable to generate a new deck library 434 each time a casino receives a new shipment of cards.

The card processing system 400 may also operate in a card recognition mode. During the card recognition mode, an unknown image 411 may be compared with one or more master images 413, 415 to determine the identity (e.g., the rank and suit) of the unknown card passing through the card handling device. The card recognition mode may occur during real-time play of a wagering game, with the processing being primarily performed by the card recognition processor 414 rather than the main control system 412. Additional details regarding the recognition of an unknown card passing through the card handling device during the card recognition mode are described below with reference to FIG. 12.

The card recognition processor 414 may configured as an FPGA or comparable hardware component having control logic configured to process one or more images according to embodiments described herein. During the calibration mode, the card recognition processor 414 may be configured to process a raw image data captured by the imaging device 416 data and transmit the processed raw image data to the memory device 418 as raw images 417. During the calibration mode, and after the calibration file 433 is automatically generated, the card recognition processor 414 may also configured to generate the master images 413, 415 according to the parameters stored in the calibration file 433. During card recognition mode, the card recognition processor 414 may be configured to determine the identity of an unknown card. For example, the card recognition processor 414 may be configured to generate the unknown images 411 from the raw captured image data so that the unknown images 411 may be compared with one or more of the master images 413, 415 to determine the identity of the unknown card. In other words, during the card recognition mode, the card recognition processor 414 may be configured to compare the generated unknown rank and suit images (i.e., the unknown image 411) with master rank images 413 and master suit images 415 to determine the identity of the card. The card recognition processor 414 may also include memory that may store master images 413, 415 (as is shown in FIG. 4), which may be used to compare with the unknown image 411 during the card recognition mode. Memory of the card recognition processor 414 may also store raw images 417 in some embodiments.

The imaging device 416 may include a camera (e.g., 2D CMOS imager) configured to acquire a two-dimensional image of its field of view. The imaging device 416 may include an analog camera or a digital camera with a decoder or receiver that converts received radiation into signals that can be analyzed with respect to image content. The signals may reflect either color or black-and-white information, or merely measure shifts in color density and pattern. The imaging device 416 may include one or more lenses to focus light, mirrors to direct light, and radiation emitters to assure sufficient radiation intensity for imaging by the imaging device 416. For example, the radiation emitters may include LED light sources (not shown) to illuminate areas of the card being imaged. Although a white light source may sometimes be adequate to capture grayscale data from red and black print on cards, a green light source may be an efficient source of illumination for capturing black and white data from both red and black print on cards.

The card present sensor 420 may be configured to generate a signal when a card is present for the imaging device 416 to read. In some embodiments, the card present sensor 420 may be coupled to the imaging device 416 directly for sending a trigger signal to the imaging device 416 indicating that the card is present. In response to the trigger signal, the imaging device 416 may capture the image of the card. In some embodiments, the card present sensor 420 may be coupled to the imaging device 416 indirectly such that the trigger signal is sent to the imaging device 416 through other components, such as the main control system 412 or the card recognition processor 414. Although the card present sensor 420 is shown in FIG. 4 as being directly coupled with each of the main control system 412, the card recognition processor 414 and the imaging device 416, this is done to show various optional configurations for the card present sensor 420.

The memory device 418 may be configured to store the captured raw images 417 for each of the cards of the deck. The raw images 417 may be read in by the imaging device 416 to be used by the main control system 412 during calibration mode, which may be used to generate the calibration file 433. The raw images 417 may further be provided to the main control system 412 during calibration mode to generate a set of master images 413, 415, which master images 413, 415 may ultimately be stored in the corresponding deck library 434, 436 for that respective deck type. The memory device 418 may have N locations available for storing the raw images for each card, wherein N is any positive integer. For most standard decks, N may be equal to 52 or, maybe, each rank of each suit 13 rank images and 4 suit images. In some embodiments, N locations may include additional locations for jokers, special cards, blank cards, or other symbols. Decks of cards having more or fewer than 52 cards (e.g., cards with certain cards added or removed) are also contemplated. In addition, the calibration file 433 and master images 413, 415 may be generated using a sub-set of all cards of the deck. In other words, a raw image 417 may not be captured for each and every card in the deck so long as at least one raw image 417 is available for each rank and each suit in the deck. As a result, N may be fewer than the total number of cards in the deck. Although the memory device 418 is shown in FIG. 4 as a discrete memory device, it is contemplated that the memory device 418 may be integrated with the card recognition processor 414 or the memory 432 of the main control system 412, such that the raw images 417 may be stored in the card recognition processor 414 or the main control system 412.

In some embodiments, the memory 432 may also include one or more combined deck sub-directories 440. Each combined deck sub-subdirectory 440 may include normalized images for a corresponding rank and suit from a plurality of different deck types. For example, a first combined deck sub-directory 440 may have normalized images $D_1, D_2, \ldots D_N$ previously taken from a plurality different deck types for the "2 rank," a second combined deck sub-directory 440 may have normalized "3 rank" images $D_1, D_2, \ldots D_N$ previously taken from a plurality of different deck types for the "3 rank," and so on. Thus, there may be thirteen different combined deck rank sub-directories, each having a relatively large number of normalized rank images $D_1, D_2, \ldots D_N$ from different deck types. Likewise, four different combined deck suit sub-directories 440 may be created that have a relatively large number of normalized suit images $D_1, D_2, \ldots D_N$ from different deck types stored therein.

Each of the normalized images $D_1, D_2, \ldots D_N$ may be a common size. In addition, the normalized images may be stretched so that a pixel from each of the rank and suit is located on an edge of the normalized image. The normalized images may be used in comparison with the master rank and suit images 413, 415 for linking to the master images 413, 415 to the appropriate ranks and suits for the particular deck being tuned. Thus, the master rank and suit images 413, 415 (or copies thereof) may also be normalized while tuning the deck by having a common size with the normalized images and stretching the master rank and suit images 413, 415 so that a pixel from each of the rank and suit is located on an edge of the normalized image.

The latch 419 may be configured to select a location in the memory device 418 in which a particular raw image 417 should be stored. For example, as the raw image 417 for a card is successfully stored, the latch 419 may include a flip flop and/or a counter that increments as each raw image 417 is stored so that the raw image 417 for the next card may be stored in the next location in memory device 418. If the raw image for a card is not successfully stored, the latch 419 may not increment.

Raw Image Analysis and Parameters of the Calibration File

FIG. 5 is an illustration of a raw image 417 acquired by the imaging device 416 (FIG. 4) of a card handling device, according to an embodiment of the present disclosure. The discussion related to the parameters in FIG. 5 also refers to the hardware environment for acquiring the raw image 417 that described with respect to FIG. 4. The lines and measurements shown in FIG. 5 illustrate certain parameters that may be determined and included within the calibration file 433 for future use. Future use of the calibration file 433 may include when generating the master images 413, 415 during the calibration mode, as well as when generating the unknown image 411 used to compare with the master images 413, 415 during the card recognition mode.

The raw image 417 may be acquired from the imaging device 416. Thus, the raw image 417 of FIG. 5 may be one of the raw images 417 that may be stored in the memory device 418 as the cards are read by the card handling device. The raw image 417 may be a grayscale image having a resolution determined by the imaging device 416 (e.g., 320 pixel×240 pixel resolution). A grayscale pixel may have relatively large number of different values, whereas a black and white pixel may have the value of either a 1 (black) or a 0 (white). When processing the raw image 417, the raw image 417 may be converted from a grayscale image to a black and white image. For example, the card recognition processor 414 (FIG. 4) may employ a method to assign grayscale pixels below a certain threshold value to a 0 (white) and grayscale pixels above a certain value to a 1 (black). Of course, different resolutions and color schemes may be employed, as desired. For example, a full color image may be captured by the imaging device 416; however, it should be appreciated that lower resolution and black and white conversion may result in smaller file sizes and reduced processing time. It is contemplated, however, that the color (e.g., red or black) of the rank or suit may be one more distinguishing factor to assist in card recognition even though the color is treated as irrelevant in many of the examples described herein. Adding color analysis may increase the accuracy of identifying ranks and suits; however, it may come at the expense of additional complexity and/or processing time.

The field of view 502 of the imaging device 416 defines what data is able to be captured by the imaging device 416 for the raw image 417. For example, the imaging device 416 may be located within the card handling device to capture at least a portion of a card 506 passing through the card handling device. As discussed above, a portion of the card 506 may be positioned within the field of view 502 such that the raw image 417 may include the rank and the suit of the card 506. In the example shown in FIG. 5, the rank is a Queen (Q) and the suit is a spade located in the upper left-hand corner of the card 506. Of course, the rank and suit may be located in other positions on the face of the card 506.

A rank area 508 and a suit area 510 may define an area around the rank and suit, respectively. The rank area 508 and the suit area 510 may completely encompass the rank and the suit of the card 506. Having a good fit for the rank and suit may reduce the amount of white space in the rank area 508 and the suit area 510, which may provide a better separation and a more accurate match when comparing master images and unknown images. The rank area 508 and/or the suit area 510 may be a box, a rectangle, or other shape. The rank area 508 has a rank width 516 and a rank depth 518, which may be measured in pixels. The suit area 510 has a suit width 520 and a suit depth 522, which may be measured in pixels. The rank area 508 and the suit area 510 may be separated at a split region 509. The split region 509 is a region (e.g., point, line, etc.) that is between the rank and the suit of the card 506, which may be used to be a starting point for measuring the rank area 508 and the suit area 510. In some embodiments, the split region 509 may be ignored by finding the rank and suit symbols, such as by blob analysis (described below), and then applying the parameters from the calibration file 433 if the calibration file 433 exists.

Within the field of view 502, the main control system 412 may also define a region of interest 504 to be stored in the calibration file 433 so that subsequent analysis may focus on a smaller portion (the region of interest 504) of an image rather than a full image (the field of view 502). The region of interest 504 is a portion of the field of view 502 that includes the rank area 508 and the suit area 510 of the card 506. Focusing the analysis of the card to the region of interest 504 may reduce the processing needed for generating master images 413, 415.

As discussed above, various parameters may be stored in the calibration file 433 in order to assist the generation of the master images 413, 415 during calibration mode and the generation of the unknown images 411 during card recognition mode. These parameters may be determined by the main control system 412 and stored in the calibration file 433. The calibration file 433 may include the parameters for the specific deck type. Such parameters may include V_lines 512, H_lines 514, rank width 516, rank depth 518, suit width 520, suit depth 522, H_start 524, V_start 526, and V_offset 528. These parameters may include various locations and measurements within the raw image 417.

V_start 526 is the shift in the X-axis for the finding the region of interest 504. V_start 526 may be based on the changes in the camera mount position relative to the calibration target. V_start 526 may be set internally by the card recognition processor 414 or the main control system 412. V_start 526 may be approximately the same for all shufflers of the same model, but may account for small changes in camera mount position between devices.

V_offset 528 is the pixel offset that is added along the X-axis to V_start 526 to find the edge of the region of interest 504. The region of interest 504 may be defined just beyond the edge of the card 506 (e.g., by a few pixels) into the dark background. The V_offset 528, which is a relative offset used to shift the card image further leftward into the region of interest 504. The V_offset 528 may be determined by checking across all card images that the region of interest 504 edge is just a few pixels away from the card next to each rank/suit image, as the main control system 412 uses a black-to-white transition algorithm to find the edge of the card. In order to compensate for some rotation-caused shifting of the cards, the V_offset 528 may be reduced by a number (e.g., 4 pixels) from the minimal value found across all cards.

H_start 524 is a relative offset along the Y-axis that is used to shift the card image to define the upper portion of the region of interest 504. The higher the value of H_start 524, the greater the shift. H_start 524 corresponds to a shift of the region of interest 504 downward from the top of the card 506. H_start 524 may be determined by finding the distance to the black-to-white transition at the top edge of the card 506 and reducing by a number (e.g., 4 pixels) to compensate for some shifting in the cards.

V_lines 512 is the number of pixels in the region of interest 504 along the X-axis. In other words, the V_lines 512 is the width of the region of interest 504. V_lines 512 may be determined by taking the maximum of the centermost edge coordinate for the rank and suit across all cards, and then subtracting V_start 526 and V_offset 528.

H_lines 514 is the number of pixels in the region of interest 504 along the Y-axis. In other words, the H_lines is the depth of the region of interest 504. H_lines 514 may be calculated by determining the maximum coordinate across all card images for the edge closest to the bottom of the suit.

The point having the coordinates (V_start+V_offset, H_start) may be used to define the upper left-hand corner of the region of interest 504. The size of the region of interest 504 may be defined by the V_lines 512 and H_lines 514. As a result, a smaller window (i.e., the region of interest 504) may be output in order to look at a selected region within the field of view 502 during operation.

Additional parameters may be stored in the calibration file 433 that relate to the operation of the imaging device. Such additional parameters may include exposure, camera gain, brightness, camera speed, camera resolution, etc., which may be read from registers of the imaging device 416.

Additional parameters may be stored in the calibration file 433 that relate to the deck or the operation of the card recognition mode. Such additional parameters may include preload sets, split_algorithm_select, err_min_rank, err_min_suit, a deck number, and a library number.

Split_algorithm_select may be used to indicate the direction that the card recognition processor 414 begins its scan for finding the split region 509 in the unknown image. For example, if there is a non-rank blob (e.g., Wagner symbol or artwork) between the rank and the top edge of the card 506, the split_algorithm_select may be set to 1 to instruct the card recognition processor 414 to scan the region of interest 504 from bottom to top when finding the split region 509. The split_algorithm_select may be set to 0 to instruct the card recognition processor 414 to scan the region of interest 504 from top to bottom when finding the split region 509.

Err_min_rank is a parameter used to identify unknown rank images. The number of black pixels in the unknown image is compared to the number of black pixels in reference images and the reference image with the highest number of pixel matches is determined to be the match. For example, if the score is less than the err_min_rank, the master rank image is reported as being a non-match to the unknown rank image. Err_min_suit is a parameter used to identify unknown suit images. For example, if the score is less than the err_min_suit, the suit image is reported as being a non-match. During a summing determination, a perfect match would have a 100% match rate between the unknown image and a master image. Because of some variations, this may not be the case. The err_min_rank and err_min_suit are may be set to have values equating to a desired error threshold (e.g., 75%) of the potential total matches in the summing determination. For example, if a rank area 508 or a suit area 510 has 32 pixels, the err_min_rank and the err_min_suit may be set to 24 (e.g., 24/32=0.75). As a result, if the percentage of pixel matches falls below this percentage (e.g., 75%), the rank and/or suit may be considered a non-match against the master image. If more than one master image provides a score that exceeds the match threshold (75%) when compared to the unknown image, then the master image having the highest score may be considered the matching symbol. If none of the master images provide a score that exceeds the match threshold (75%) when compared to the unknown image, then the unknown image may remain unknown and an error alert may be provided to the dealer. Situations in which the score may be below the match threshold may include an error in the tuning process, an error in the image capture of the unknown image, a card being turned over, a card being from another deck, a damaged or dirty card, the card handling device being dirty, etc.

The deck number may be a unique number for a particular calibration file 433 in order for the dealer to select to be used in the future. The library number may represent the number of times that the calibration file 433 has been updated. The preload sets parameter may represent a number of image shifts that are done during correlation for an image pair (e.g., an unknown image and a master image). In some embodiments, the deck number and library number may be stored in a separate deck name file that is different than the calibration file 433.

Calibration Mode Operation: Automatic Generation of Calibration File

Figure 6:
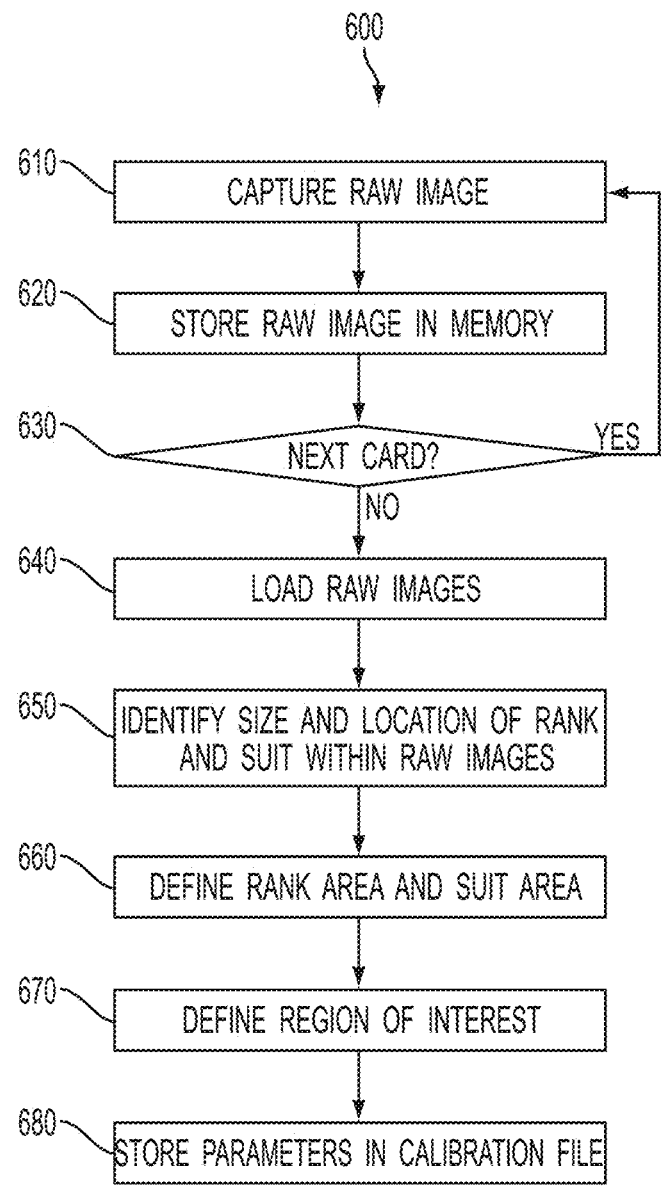
FIG. 6 is a flowchart illustrating a method for automatically generating a calibration file for a card detection system according to an embodiment of the present disclosure.

FIG. 6 is a flowchart 600 illustrating a method for automatically generating a calibration file for a card detection system according to an embodiment of the present disclosure. The method of FIG. 6 is described with reference to the card processing system 400 of FIG. 4 and the raw image 417 of FIG. 5. The main control system 412 may operate in the calibration mode to tune the card processing system 400 to a particular deck of cards such that the card recognition processor 414 may subsequently identify unknown cards of that particular deck type while operating in card recognition mode.

At operation 610, the raw image 417 for the cards in the deck may be captured. For example, the deck of cards may be inserted into the card handling device and read into the card processing system 400. At operation 620, the raw image 417 may be stored in the memory device 418 in the order that they are received. At operation 630, it is determined if there is another card to be read and stored. If so, the next card is read, and the next raw image 417 is stored in the memory device 418. In other words, cards may be sequentially passed through the field of view 502 of the imaging device 416, and the raw image 417 of at least an area the rank and suit symbols of each card is captured by the imaging device 416, and moved by the card processing system 400 into the memory device 418 to be used for tuning the card processing system 400. In some embodiments, the cards may be read in a predetermined order (i.e., pre-sorted), while in other embodiments, the cards may be read in any order (i.e., unsorted).

In some embodiments, the upper left-hand corner of the card may be captured by the imaging device 416, whereas in other embodiments the imaging device 416 may capture a larger portion of the card face (e.g., the entire card face). At the close of reading all or a portion of each card in the deck, a raw image 417 may be stored in the memory device 418 for each card of the deck. At this point, the raw images 417 stored in the memory device 418 may not be processed (e.g., cropped or otherwise altered), but represent full images for the entire field of view 502 of the imaging device 416, including each rank and suit symbol.

At operation 640, one or more raw images 417 may be loaded from the memory device 418 to the main control system 412 for image processing and for automatically generating the calibration file 433. In some embodiments all raw images 417 captured for the card deck may be loaded from the memory device 418 to the main control system 412 for subsequent image processing. In other embodiments, each raw image 417 may be loaded to the main control system 412 and subsequently processed one at a time.

At operation 650, the location of the rank and suit symbols may be identified within the raw images 417 along with parameters associated with their areas. For example, the main control system 412 may be configured to perform an image processing analysis of each raw image 417. The image processing analysis may include identification of measurement data (e.g., parameters representative of length, width, areas, coordinates, dimensions, etc.) relating to at least one of a rank area 508 around a rank of the card, and a suit area 510 around a suit of the card.

As an example of a method that may be used by the main control system 412 to identify the areas within the raw images 417 that include the rank and suit symbols of a card, the main control system 412 may perform a "blob" analysis or other similar analysis on one or more of the raw images 417 stored in the memory device 418. A blob is a connected region in a binary digital image. In other words, a blob may include a point and/or a region in the raw image 417 in which the pixel data differs in some property from the pixel data in surrounding areas. For example, the blob analysis may locate black regions of a black-white image or may analyze intensity of a grayscale image.

The blob analysis may result in extracting features from an identified blob, such as the orientation of a blob, the centroid of the blob, the height and width of the blob, and other similar features. An example of such an image processing program capable of being programmed to perform the analysis described herein includes OpenCV (Open Source Computer Vision Library) developed by Intel Corporation of Santa Clara, Calif. OpenCV is an open source library that includes a plurality of additional algorithms and sub-features for algorithms that may be used in image analysis. Descriptions regarding the function and usage of the algorithms that may be performed using OpenCV are described in one or more of the following text books: "OpenCV 2 Computer Vision Application Programming Cookbook, published May 23, 2011, author Robert Laganiere; "Learning OpenCV: Computer Vision in C++ with the Open CV Library," published Dec. 25, 2012, authors Gary Bradski et al.; and "Mastering OpenCV with Practical Computer Vision Projects," published Dec. 3, 2012, authors Baggio et al., the disclosure of each of which is hereby incorporated herein by this reference in its entirety. For example, libraries from OpenCV may be employed to perform conversion of images from a grayscale image into a black and white image, finding contours on an image, and filling a contour to isolate a rank and suit within the images. In addition, libraries from OpenCV may be employed to perform a blob analysis, optical character recognition (OCR), or other methods that may be used to link the appropriate rank and suit images with the card images, which may enable tuning a deck of cards out of order (as discussed in further detail below). Other software that may be capable of blob analysis and other image processing features may also be employed, such as MATLAB® developed by Mathworks of Natick, Mass.

The blob analysis may be configured to locate blobs within a selected raw image 417. Although the term "raw image" is used during the description of the blob analysis, the image that is analyzed may be processed. For example, the main control system 412 may convert the raw image 417 to black and white, may crop (or ignore) the raw image 417 to the region of interest 504 around the card 506 that is of a smaller size than the field of view 502 of the imaging device 416, etc., prior to performing the blob analysis to identify the areas of interest that include the rank and suit of the card 506. In this context, the term "raw image" is intended to mean that the image is not a master image 413, 415, and not necessarily that no processing or alteration of the raw image 417 has been performed.

In particular, the blob analysis may be employed to locate rank and suit symbols, and distinguish between ranks, suits, and other markings on the card. As an example, the blob analysis may determine an initial number of blobs within the raw image 417. The initial number of blobs may be relatively large (e.g., 3000 blobs) based on the artwork on the card that is present within the field of view of the imaging device 416. The blob analysis may also return a location (e.g., centroid) of each blob within the raw image, as well as the measurements (e.g., height, width, etc.) of each blob.

The blob analysis may ignore other blobs based on size, shape, or location in order to arrive at the rank and suit symbols. For example, because the rank and suit of most cards may be expected to have at least a minimum size, blobs smaller than the minimum size may be ignored by the main control system 412 for purposes of finding the areas of interest in the raw image 417 that include the rank and suit. In addition, because the rank and suit of most cards may be expected to be located near the corners of the cards, blobs that are outside of that expected region may also be ignored. As a result, the remaining blobs left to be analyzed should include the one or more blobs corresponding to the rank symbol and the one or more blobs corresponding to the suit symbol on the card.

In some embodiments, the main control system 412 may identify the "10" rank symbol first (i.e., excluding other cards, such as Jack, King, etc.). Unique characteristics of the 10 rank symbol may be particularly helpful for the main control system 412 to identify the location and dimensions of the 10 rank and also distinguish the 10 rank from the other ranks. For example, the 10 rank may be recognizable because the 10 rank has two relatively large blobs that are side by side. Each of the two blobs may have approximately the same location on the Y-axis for the centroid, along with approximately the same height. In addition, the blob analysis may recognize that one blob (the "1") is narrow whereas the other blob (the "0") is wide. The 10 rank may also be useful as a basis in defining the measurements for the rank area 508 because the 10 rank symbol is usually the largest of the various rank symbols for many deck types.

Identifying a blob as the suit may be determined by locating the relatively large blob near the 10 rank as the suit. In other words, once the blob's location and measurements have been determined for the rank, the location and measurements of the suit may be based on the blob identified as the rank. For example, the suit may also be expected to be the blob located below the rank (in the Y direction), which is the case for most deck types.

In some embodiments, the main control system 412 may determine the location and measurements of the suit symbol prior to the rank symbol. As a result, once the blob's location and measurements have been determined for the suit, the location and measurements of the rank may be based on the blob identified as the suit. For example, the rank may also be expected to be the blob located above the suit (in the Y direction), which is the case for most deck types.

As another example, the rank and/or suit symbol may be identified by comparing portions of the raw image 417 against a generic file describing rank and/or suit curvatures, being immune to scale or rotation, for portions of the raw image 417 that are closest to the corner of the card 506.

At operation 660, the rank area 508 and the suit area 510 may be defined. For example, once the blobs are identified for the rank and suit of the card in the raw images 417, the results from the blob analysis, the locations and measurements (e.g., in pixels) may be further analyzed to define the rank area 508 and the suit area 510 as well as other related parameters that will be part of the calibration file 433. The rank area 508 and the suit area 510 are areas that are defined based on the location and measurements of the respective ranks and suits for the specific deck type. In other words, there may be one rank area 508 that is defined to be large enough that all ranks from all raw images 417 fit within the rank area 508. Similarly, there may be one suit area 510 that is defined to be large enough that all suits from all raw images 417 of the deck type fit within the suit area 510.

In some embodiments, the main control system 412 may define the rank area 508 to be based on the measurements and location of the 10 rank because the 10 rank is often the largest rank symbol for most decks. In some embodiments, the main control system 412 may analyze the measurements for the ranks from all raw images 417. In other words, the largest blob identified as a rank may be used as the basis of the rank area 508. Similarly, in some embodiments, the main control system 412 may analyze the measurements for the suits from all raw images 417. The largest blob identified as a suit may be used as the basis of the suit area 510. In other words, the final parameters for the rank area 508 and the suit area 510 that are stored in the calibration file 433 may be determined by taking the maximum measurements of the rank symbol and suit symbol, and then expanding the values slightly to allow for some white space around the ranks and suits. Expanding the maximum value of the ranks and suits in this manner may allow for slight variations in print size, as well as for rotation of cards that may exist when reading in the cards.

At operation 670, a region of interest 504 may be defined. The region of interest 504 should be large enough to completely contain each rank and suit symbol of each card of the specific deck type with some additional area added to account for variability in the acquired signal and variability in card position. Thus, the region of interest 504 may be defined by measuring a size (e.g., in pixels) and location of each rank area 508 and suit area 510 defined by the system, and identifying an area in which every rank area 508 and suit area 510 appears during the training and calibration phase. Because there may exist some variation in the location of the rank and suit symbols throughout the deck, the rank area 508 and suit area 510 for the entire deck may be analyzed to determine a minimum number of pixels (in both X and Y directions) to consider to ensure that the rank and suit symbols fall within the region of interest 504. In some embodiments, the minimum number of pixels may be used, whereas in other embodiments the region of interest 504 may include excess pixels to allow for variations (e.g., card orientation) during actual use.

In some embodiments, the region of interest 504 may be defined by adding a fixed dimension in the X-direction from the right side of the image, while the dimension in the Y-direction may be determined by defining the furthest location from the top of the card 506 in the Y-direction to the bottom of the suit symbol. Because the rank and suit symbols may vary in location, the furthest location may be determined after analyzing the locations of all suits from the image processing analysis. The final dimensions of the region of interest 504 may include some padding on these measurements in each direction to compensate for slight variations in card orientation during use. Other methods for defining the boundaries for the region of interest 504 are also contemplated such that the region of interest 504 has a suitable size and location to ensure that rank and suit symbols within the deck will be within the defined region of interest 504 even if the locations of the rank and suit symbols may vary somewhat.

At operation 680, the calibration file 433 may be automatically generated and the parameters may be stored therein. The calibration file 433 may include, among other information, this measurement data, which can be subsequently used by the card processing system 400 in the calibration mode to generate master images 413, 415, or during the card recognition mode to identify unknown cards of that particular deck type, as discussed in more detail below.

The parameters stored in the automatically generated calibration file 433 may include measurements for the rank area 508 (rank height and rank width) and the suit area 510 (suit height and suit width), and the measurements and coordinates for the region of interest 504, as well as additional parameters previously discussed with respect to FIG. 5. The calibration file 433 may be stored in memory 432 within the main control system 412. Storing the calibration file 433 in memory 432 of the main control system 412 may include storing the calibration file 433 in a subdirectory for the particular deck or deck type that is used to tune the card processing system 400. The calibration file 433 may further include other parameters that may be used by the card recognition processor 414 in generating master images, cropping unknown images, or for other reasons as discussed above.

Calibration Mode in Operation: Automatic Generation of Master Images

Figure 7:
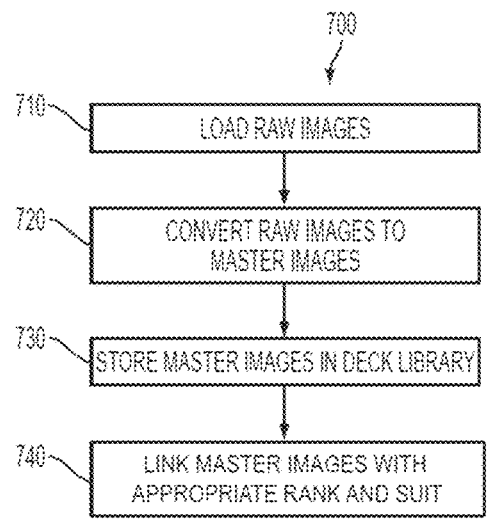
FIG. 7 is a flowchart illustrating a method for generating master images according to an embodiment of the present disclosure.

FIG. 7 is a flowchart 700 illustrating a method for generating master images according to an embodiment of the present disclosure. The method of FIG. 7 is described with reference to the card processing system 400 of FIG. 4 and the raw image 417 of FIG. 5. The calibration mode may be employed to tune the card processing system 400 for use with a particular deck of cards. Using the calibration file 433, the card recognition processor 414 (or, alternatively, the processor 430 of the main control system 412) may process the raw images 417 stored in the memory device 418 to generate the master images 413, 415 for that specific deck type to be used in the card recognition mode of the card processing system 400.

For the flowchart 700, it is presumed that a calibration file 433 has already been created, such as by the method of FIG. 6, or other methods described herein. For example, the calibration file 433 may be automatically created using image processing methods to locate rank and suit symbols in the raw images 417 and determine parameters (e.g., rank area 508, suit area 510, region of interest 504, etc.) regarding measurements of the rank and suit symbols. These parameters, along with other parameters discussed above, may be included with the calibration file 433 that may be stored in the deck library 434 of the file system 431 maintained by the main control system 412.

At operation 710, the raw images 417 may be loaded into the main control system 412 and/or the card recognition processor 414. If the raw images 417 are already stored in the memory device 418, the raw images 417 may be retrieved from the memory device 418. Thus, the raw images 417 used to generate the master images 413, 415 may be the same raw images 417 that were used in the analysis for automatically generating the calibration file 433. If the raw images 417 are not stored in the memory device 418, a deck of the same deck type may be read by the card processing system 400 so that new raw images 417 may be generated and loaded.

At operation 720, the raw images 417 may be converted to the master images 413, 415. For example, the card recognition processor 414 may convert the raw images 417 to the master images 413, 415. In particular, the card recognition processor 414 may receive and crop the raw images 417 according to the parameters previously stored in the calibration file 433 to automatically generate a master rank image 413 and the master suit image 415 for the card 506.

Figure 8A:
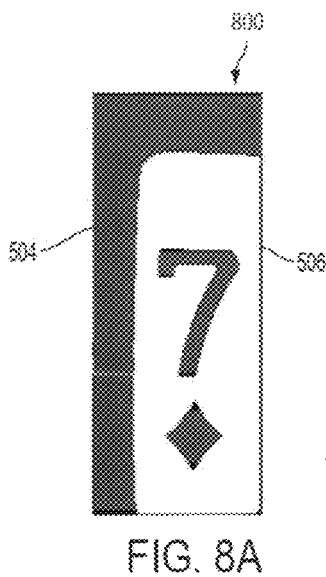
FIGS. 8A through 8C illustrate a process of generating a master rank image and a master suit image from a raw image according to the parameters stored in the calibration file.
Figure 8B:
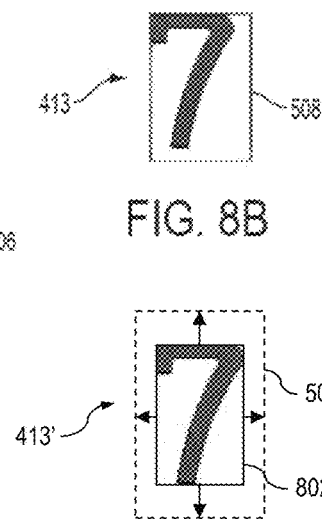
Figure 8C:
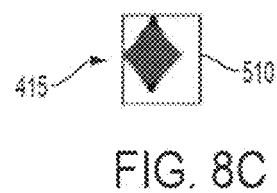

For example, FIGS. 8A through 8C illustrate a process of generating the master rank image 413 and the master suit image 415 from the raw image 417 according to the parameters stored in the calibration file 433. As shown in FIG. 8A, the first cropping of the raw image 417 may be to limit a processed image 800 of the card 506 (seven of diamonds shown in FIG. 8A) to have an area that is determined by the region of interest 704 stored in the calibration file 433. The processed image 800 shown in FIG. 8A may have been generated from the raw image 417. For example, the processed image 800 may be a black and white image, whereas the original raw image 417 may have been a grayscale image or a color image.

As shown in FIGS. 8B and 8C, the secondary cropping includes cropping the processed image 800 of FIG. 8A to generate the master images 413, 415. For example, the master rank image 413 may be the result of cropping the processed image 800 according to the parameters of the calibration file 433 that correspond to the rank area 508. The master suit image 415 may be the result of cropping the processed image 800 according to the parameters of the calibration file 433 that correspond to the suit area 510. In other words, the card recognition processor 414 may crop the raw images 417 according to stored region of interest 504, rank area 508, suit area 510 to generate separate master images 413, 415 for the rank and the suit of the card. The other parameters (e.g., offset values) stored in the calibration file 433 may assist in locating the rank and suits so that the application of the rank area 508 and suit area 510 parameters may result in master images 413, 415 that contain the entirety of the rank and suit, along with the desired alignment. Although FIGS. 8B and 8C show the rank and suit to be shifted to the left and upper edges of the rank area 508 and the suit area 510, there may be some padding (i.e., white space) on each edge. In order to maintain a consistent location of the rank and suit in the master images 413, 415, the rank and suit may be shifted toward one of the corners as shown.

In some embodiments, a single master image may be generated for each card that includes both the rank and the suit (essentially the region of interest 504). Doing so, however, may require 52 master images (one for each card) rather than having as few as 17 master images (one for each rank and one for each suit), which may change the processing time during the card recognition mode.

Referring again to FIG. 7, at operation 730, the master images 413, 415 may be stored in the appropriate deck library 434 together with the corresponding calibration file 433, deck name file 435, and other related files. The master images 413, 415 may be stored as image files (e.g., bitmap files) in the deck library 434 of the file system 431 of the main control system 412. The master images 413, 415 may further be loaded into the memory of the card recognition processor 414 for comparison with the unknown images 411 during card recognition mode. The master images 413, 415 may be separate files stored in the same subdirectory of the file system as the calibration file 433 (e.g., a text file). In some embodiments, the calibration file 433 may be combined in a file with the master images 413, 415 such that a single file may include image data and the calibration parameters.

In a standard deck of cards, 18 master images 413, 415 may be stored: one master rank image 413 for each rank (2-10, J, Q, K, A) and one master suit image 415 for each suit (Heart, Diamond, Club, Spade), as well as a master image for a joker. The master image for a joker may be stored as a rank. Other symbols may also be printed on the face of some of the cards. For example, a "Wagner" symbol is a special symbol printed on some of the cards for a deck that is used in certain card games in order to assist in game play. For example, a Wagner symbol is typically useful during blackjack by being printed on the face of each card having a value of ten (i.e., each 10 rank, Jack rank, Queen rank, King rank) and eleven (i.e., each Ace rank) to assist with the determination that the dealer has a "21." The Wagner symbol is often a polygon shape that is located between the rank and the top of the card. A master image for a Wagner symbol may be created and stored, while in some embodiments the Wagner symbol may simply be ignored by the main control system 412. Other special symbols may also be treated similarly.

At operation 740, the master images 413, 415 may be linked with the correct rank and suit such that the card processing system 400 may know which master image 413, 415 corresponds to the correct rank and suit. When the link between the master images 413, 415 and the correct rank and suit are established, the link may be known by the card processing system 400, such as by creating a list in the calibration file 433, by storing the information in another file in the deck library 434, or by some other suitable method. The files for the master images 413, 415 may be named (or re-named) to have an identifier (e.g., name, number, etc.) that indicates what the rank or suit is for each master image 413, 415.

In some embodiments, the order of each card in the deck may be known when master images 413, 415 are generated because the deck may be pre-sorted when the raw images 417 are captured. As a result, each master image 413, 415 may be linked to the correct rank or suit based on the expected order of the pre-sorted deck as the raw images 417 were saved in the memory device 418. Such an embodiment, however, may rely on the card manufacturer or technician (or dealer, pit boss, etc.) who inserts the deck into the card handling device to insert a pre-sorted deck. Inserting an unsorted deck into such an embodiment may result in improper links being established between the master images 413, 415 and incorrect ranks and suits.

In other embodiments, the deck may not be required to be in any particular order when generating the master images 413, 415. The card processing system 400 may be configured to make the proper links between the master images 413, 415 and the correct ranks and suits even with an unsorted deck. The main control system 412 may perform additional image processing on the master images 413, 415 in order to determine which rank or suit should be linked to each master image 413, 415. Of course, at this point the master images 413, 415 are not linked to any particular rank or suit, and the actual identity of the master image 413, 415 may not yet be known to the main control system 412.

As discussed above, there may be a plurality of combined deck sub-directories 440 (FIG. 4) that include a plurality of normalized images for a corresponding rank and suit from a plurality of different deck types. While tuning the master images 413, 415 for a particular deck, the identity may be determined by comparing normalized versions of the master images 413', 415' with the normalized images $D_1, D_2, \ldots D_N$ stored in the combined deck sub-directories 440.

Figure 8D:
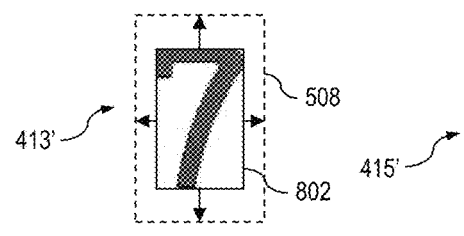
FIGS. 8D and 8E show an example of the master images being normalized to form normalized master images.
Figure 8E:
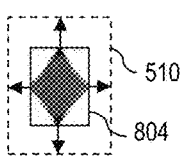

FIGS. 8D and 8E show an example of how the master images 413, 415 may be normalized to form normalized master images 413', 415'. Referring to FIG. 8D, the 7 rank may be normalized by cropping the master rank image 413 so that there is at least one black pixel from the 7 rank along the outer border of the cropped image (represented by box 802). The cropped rank image may be expanded to a common image size (e.g., rank area 508) as indicated by the arrows shown in FIG. 8D. The other master rank images 413 may be normalized in a similar manner. Referring to FIG. 8E, the diamond suit may be normalized by cropping the master suit image 415 so that there is at least one black pixel from the diamond suit along the outer border of the cropped image (represented by box 804). The cropped rank image may be expanded to a common image size (e.g., suit area 510) as indicated by the arrows shown in FIG. 8E. The other master suit images 415 may be normalized in a similar manner. The normalized master rank and suit images 413', 415' may appear to be somewhat "bloated" in comparison to the master rank and suit images 413, 415. It should be understood that the normalized images $D_1, D_2, \ldots D_N$ of the combined deck sub-directories 440 may be normalized in a similar manner having a common image size as the normalized master rank and suit images 413', 415'.

To link the master images 413, 415 to the appropriate rank and suit during tuning, the normalized master images 413', 415' may be compared with the normalized images $D_1, D_2, \ldots D_N$ of the combined deck sub-directories 440. The comparison of the normalized master images 413', 415' with the normalized images $D_1, D_2, \ldots D_N$ of the combined deck sub-directories 440 may be performed by a pixel to pixel comparison (e.g., X-OR comparison) to arrive at a score that is used to determine whether a match occurs. For example, referring again to FIG. 4, an unknown normalized master rank image 413' may be compared to the normalized images $D_1, D_2, \ldots D_N$ of a first combined deck sub-directory 440 (e.g., all 2 ranks stored therein) to produce a first score. The first score may be a combined score for all 2 ranks of the sub-directory 440 or a plurality of individual scores for each normalized images $D_1, D_2, \ldots D_N$. The unknown normalized master rank image 413' may then be compared with the normalized images $D_1, D_2, \ldots D_N$ for each of the remaining combined deck sub-directories 440 (e.g., as a loop) to produce the scores for each of them. The highest score produced may indicate the identity of the unknown normalized master rank image 413'. An unknown master suit image 415' may likewise be compared with the appropriate combined deck sub-directories 440 to produce a score that indicates the identity of the master suit image 415'.

The comparisons may include a pixel by pixel comparison (e.g., X-OR) for each of the normalized images. In some embodiments, the comparison may further include a comparison of a pixel as well as its neighboring pixels to count in the score. For example, pixels that are not located on the edges of the image have eight bordering pixels. A valid count may be added to the score if the bordering pixels are also the same as the middle pixel being used in the comparison.

In some embodiments using normalized images, the spades and clubs may appear somewhat similar such that false identifications may occur. In some embodiments, the normalized images $D_1, D_2, \ldots D_N$ of the combined deck sub-directories 440 may be altered somewhat to further distinguish the two types of suits. For example, the normalized images $D_1, D_2, \ldots D_N$ of the combined deck sub-directories 440 that correspond to the clubs may have a circle (or other shape) drawn within each of the leaves.

During tuning, the unknown master suit images 415 that correspond to clubs may be identified in an alternative method, such as counting pixels across a different path (e.g., a 45-degree line from the middle left side of the image to the middle top side of the image) that will identify the different shapes of the club versus the spade.

In some embodiments, the master images 413, 415 may be compared with each other to determine secondary relationships between master images 413, 415 and identify the correct rank and suit for each master image 413, 415. The method of comparison includes determining a score, which may be represented by a number (or percentage) of matched pixels or a number (or percentage) of unmatched pixels. In some embodiments, the method of comparing may include comparing a shape of an edge of a symbol, or other methods of comparison. By comparing master images 413, 415, the correct rank and suit for each master images 413, 415 determined indirectly from other its relationship with other master images 413, 415. For example, the master images 413, 415 may be compared with each other to obtain a score. The score may be an indication of how similar or dissimilar each master image 413, 415 is to each other.

As an example, a first master rank image 413 is compared with a second master rank image 413, the first master rank image 413 is then compared with a third master rank image 413, the first master rank image 413 is then compared with a fourth master rank image 413, and so on. As a result, a comparison for each permutation of all master rank images 413, and a score may be recorded for each individual permutation among the group of master rank images 413. A similar comparison may be performed to obtain a score for a comparison of each permutation of the master suit images 415.

Of course, the scores for comparisons of different master images 413, 415 would be dissimilar and the resulting score would be relatively dissimilar. However, the score resulting from a comparison of the A rank and the J rank may be more similar to each other than the score resulting from a comparison of the A rank and the 5 rank. In fact, each rank may have a different rank that, when compared, yields a closest secondary match relative to its comparison with the other ranks. For example, for some decks, the following table may represent the next best match for various ranks. The score represented in Table 1 below is a percentage of pixel matching as described in further detail below.

TABLE 1

| Rank | Next Best Match Rank | Score (%) |
| --- | --- | --- |
| A | J | 20 |
| 2 | 4 | 20 |
| 3 | 5 | 15 |
| 4 | J | 17 |
| 5 | 6 | 9 |
| 6 | 5 | 12 |
| 7 | 4 | 19 |
| 8 | 6 | 17 |
| 9 | J | 20 |
| 10 | Q | 18 |
| J | 4 | 17 |
| Q | 4 | 17 |
| K | J | 19 |

The "Next Best Match Rank" shown in Table 1 is to be understood as an example for one style of card deck. Similarly, the scores shown in Table 1 may be approximates. Of course, as decks may vary from one design to the next, the next best match and the score may also differ from one deck to the next. In addition, the analysis regarding the secondary comparisons of master images 413, 415 may also consider the expected matches beyond the next best match. In other words, the accuracy may be improved if the third best match, the fourth best match, etc. may be considered.

In some embodiments, a specific master image 413, 415 may be used as a baseline master image to determine the links for the other master images. For example, the blob analysis may be used to identify a 10 rank by searching for the unique characteristics of the 10 rank as discussed above. The master rank image 413 for the 10 rank may then be used to compare with the unknown master rank images 413. In other words, the 10 rank is compared with an unknown master rank image 413 to obtain a first score, the 10 rank is compared with another unknown master rank images 413 to obtain a second score, and so on. Each rank may have a score that is different with respect to a comparison with the 10 rank. These different scores may correspond to a rank based on the expected relative match to the 10 rank. The highest score resulting from using the 10 rank as a baseline master rank image 413 may be linked to the Queen rank (the closest next best match in this example). Once the Queen rank has been identified, its master rank image 413 may be compared to the other master rank images 413, from which the four rank may be identified as the highest score that resulted from the comparisons with the Queen rank. Analyzing these secondary relationships in view of expected secondary relationships may result in the various master images 413, 415 being linked to the correct ranks and suits.

Other ranks may be used as the baseline master rank image 413. In some embodiments, the deck may be required to be only partially sorted, such as requiring the technician to have a specific card as the first card read from the deck. For example, the Queen of Hearts may be required to be the first card read from the deck. The master images 413, 415 for the Queen rank and the Hearts suit may then be used as the baseline master rank image 413 similar to the process described above for using the 10 rank.

In other embodiments, secondary analysis may be used to determine the identity of the suit for the master suit image 415, such as analyzing the curvature of the suit shapes or from comparisons of the other master suit images 415 to determine the identity from secondary relationships of non-matching master images. Such secondary analysis may be beneficial for situations when the deck may not be sorted in any particular order. Such secondary analysis may also be performed for other reasons, such as to verify the order of a sorted deck (e.g., the system may still require a sorted deck, but these secondary relationships may provide a way to alert the operator that the deck was not sorted properly), verify a correct deck (e.g., 52 unique cards exist), and verify quality of the total scan (e.g., identify dirty cards). For example, even in the situation of having a pre-sorted deck, secondary verification may be desired to determine whether the tuning process was correct. One example may include comparing master images 413, 415 with each other to determine secondary relationships. For example, such secondary relationships may identify incorrect relationships because a card that was out of order. Another secondary verification for a pre-sorted deck may be a simple check to see if the 10 ranks are in the correct location rather than verifying each and every card. Another secondary verification may be to display the master image and what the card recognition system determined the identification to be. The operator may be allowed to select whether the identification is correct and to make any changes if incorrect.

Once the master images 413, 415 have been created and properly linked with the correct ranks and suits, the card processing system 400 may be said to be "calibrated" or "tuned" as to the particular deck type.

In some embodiments, only a selected portion of the raw images 417 may be fed back from the memory device 418 into the card recognition processor 414 for generating the master images 413, 415. In some embodiments, only one image for each rank from one of the suits may be used to generate the master rank images 413. For example, the Ace of Diamonds may be used to obtain the master image linked with the Ace rank, while the other Ace ranks (e.g., Ace of Spades, Ace of Hearts, Ace of Clubs) may be ignored. The master rank images 413 for the other ranks may be generated in a similar manner. While generating the master images 413, 415 for the ranks, certain card images may be selected to generate the master suit image 415 for each suit as well.

In other embodiments, each raw image 417 may be used to obtain a master image 413, 415 for each rank and suit. As a result, a plurality of master images 413, 415 may be generated for each rank and suit. For example, four separate master rank images 413 may be created for the Ace rank (i.e., one Ace image from a card for each suit). The main control system 412 may then analyze each of the master rank images 413 for that rank to determine which of the master rank images 413 is desired to be used as the ultimate master rank image 413 during the card recognition mode. In other words, the main control system 412 may choose what it considers "the best" image from among a plurality of images to select the master image 413, 415 for a particular rank or suit. The best image may be determined by comparing against each of the other master images 413, 415 to obtain a score that is most dissimilar to the other master images 413, 415 of a different type so that the separation between master images 413, 415 is the greatest. For example, each of the master rank images 413 from a single rank (e.g., four different Ace images) may be compared to the master rank images 413 of the other ranks (e.g., 2-10, J, Q, K). The Ace image (from among all Ace images) that provides the most dissimilar score when compared with the images from the other ranks may be Ace image selected for the master rank image 413 for the Ace rank. Other factors or determinations may be used for, or contribute to, the determination of which master image 413, 415 is to be used as the master image 413, 415 for a particular rank or suit.

In some environments, the main control system 412 may employ OCR techniques to recognize the identity of the correct rank or suit of the each master image 413, 415 from contours identified in the master images 413, 415 to be linked with the correct rank and the suit of the master image 413, 415.

Figure 9A:
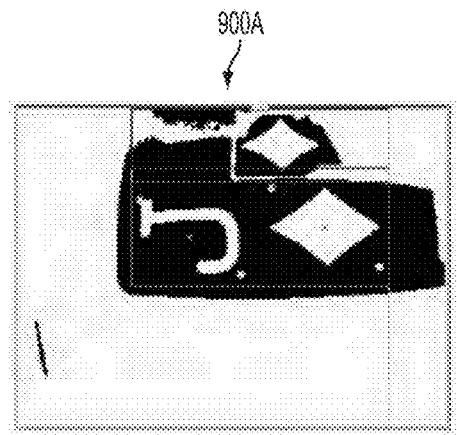
FIGS. 9A through 9C are a series of card images that illustrate a method for generating master images by finding and filling contours according to another embodiment of the disclosure.
Figure 9B:
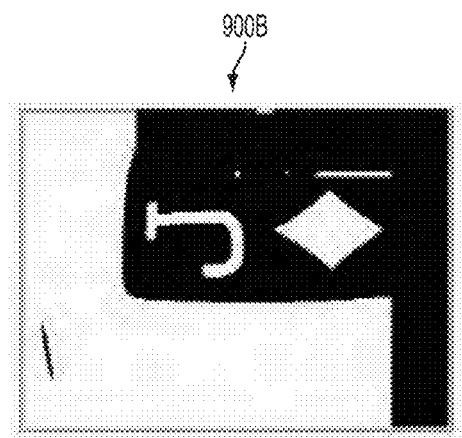
Figure 9C:
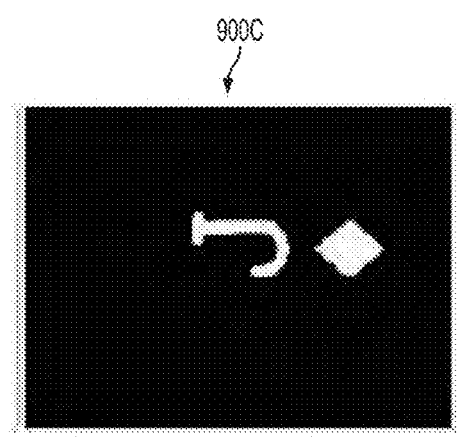

For example, FIGS. 9A, 9B, and 9C are a series of card images 900A, 900B, and 900C that illustrate a method for generating master images by finding and filling contours according to another embodiment of the disclosure. A contour is a line that identifies an edge of a white area within the card image that is not connected to any other white area within the card image.

As discussed above, the grayscale image from a raw image 417 may be converted to a black and white image. In some embodiments (e.g., as is shown in FIGS. 8A-8C) the card area may be white and the ranks and suits may be black. In some embodiments, these white and black regions may be inverted, as is the case for the images in FIGS. 9A-9C, 10A and 10B. Referring again to FIG. 9A, contours may be identified by an image processing analysis program (e.g., OpenCV), such that the white area from the Jack rank and the diamond suit stands out from the black area for the card background. Other white space is filled, which may occur in stages, as shown in FIGS. 9B and 9C. The resulting image that includes both the rank and the suit depicted in white has the remainder of the image depicted in black, which may provide further contrast and improve subsequent analysis on the master rank images and master suit images that are generated.

Figure 10:
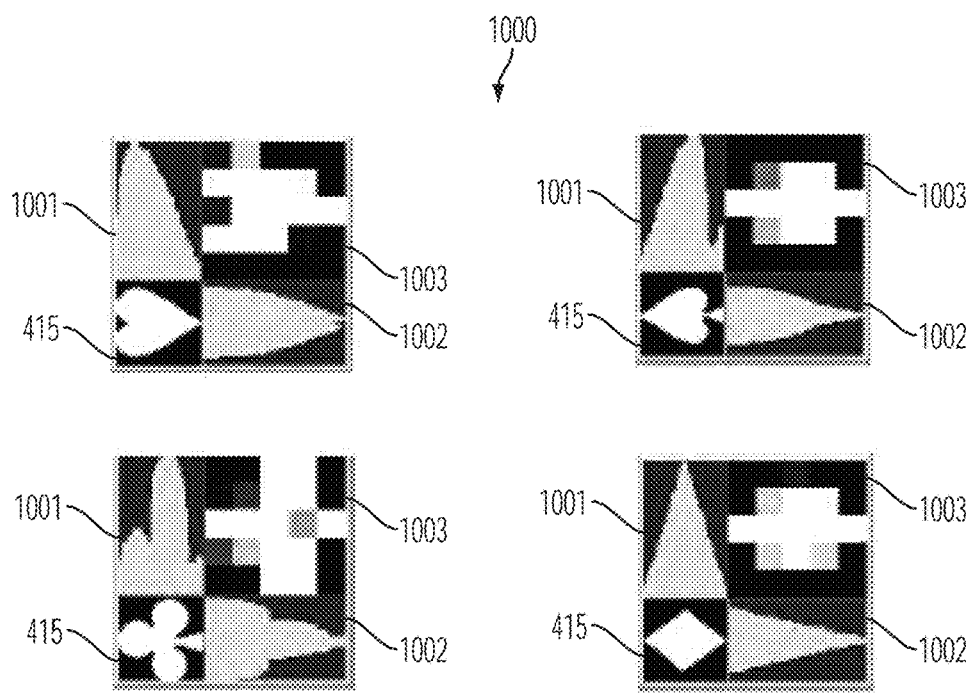
FIGS. 10 and 11 show histograms that may result from an OCR analysis of the master suit images and the master rank images generated by the contour analysis illustrated in FIGS. 9A through 9C.
Figure 11:
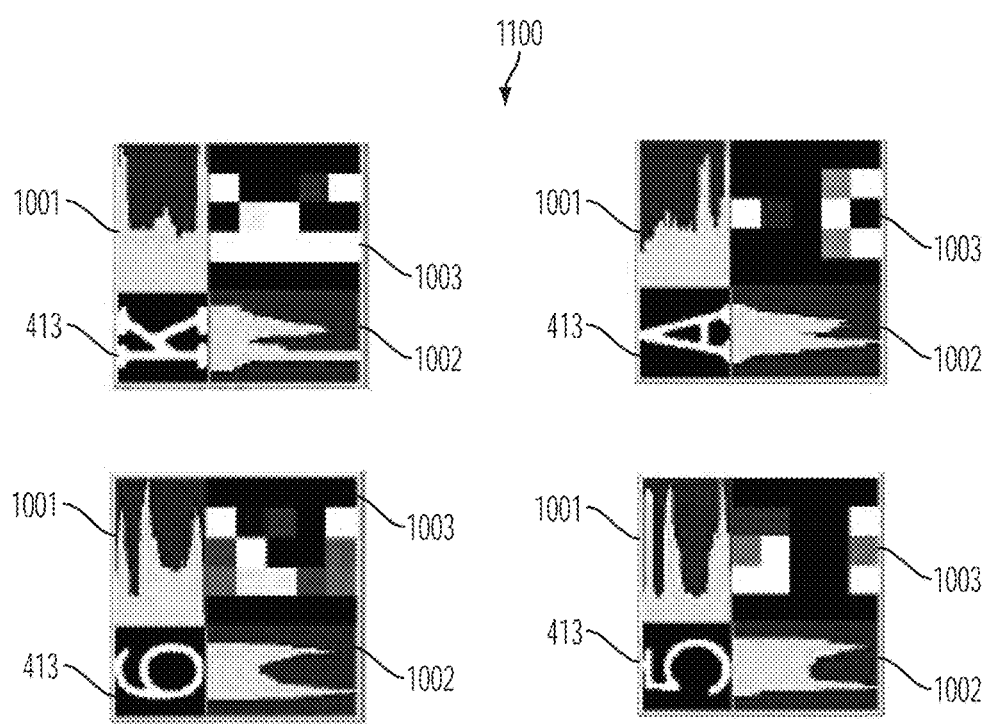

FIGS. 10 and 11 show histogram groups 1000, 1100 that may result from an OCR analysis of the master suit images and the master rank images generated by the contour analysis illustrated in FIGS. 9A-9C. OCR may be employed during the tuning mode, particularly for determining the rank and the suit of the unknown master images when the cards are not sorted and are not read in any particular order that is expected by the main control system 412. OCR may employ an artificial neural network machine-learning algorithm for analyzing the contours of the master images 415, 415.

The image in the lower left corner of each of the histogram groups 1000, 1100 is the master image 413, 415 that is unknown and to be determined. An image 1001 in the upper left corner of each of the histogram groups 1000, 1100 is a sum (a numerical count) of the white pixels along each column of the master image 413, 415 (i.e., a vertical histogram). In other words, the white pixels in the first column of pixels of the master image 413, 415 may be counted, with the sum being represented by the number of pixels in the light region of the first column of the image 1001. The corresponding dark region of the first column of the image 1001 may represent the sum of black pixels in the first column of pixels of the master image 413, 415.

An image 1002 in the lower right corner of each of the histogram groups 1000, 1100 is a sum of the white pixels along each row of the master image 413, 415 (i.e., a horizontal histogram). In other words, the white pixels in the first row of pixels of the master image 413, 415 may be counted, with the sum being represented by the number of pixels in the light region of the first column of the image 1002. The corresponding dark region of the first row of the image 1002 may represent the sum of black pixels in the first row of pixels of the master image 413, 415.

An image 1003 in the upper right corner of each of the histogram groups 1000, 1100 is a low resolution image (e.g., 5×5 pixels) of the master image 413, 415. The images 1001, 1002, 1003 may be compared with previous OCR results of other normalized rank and suit images for one or more deck types to determine the correct rank or suit of the master images 413, 415.

Card Recognition Mode Operation

Figure 12:
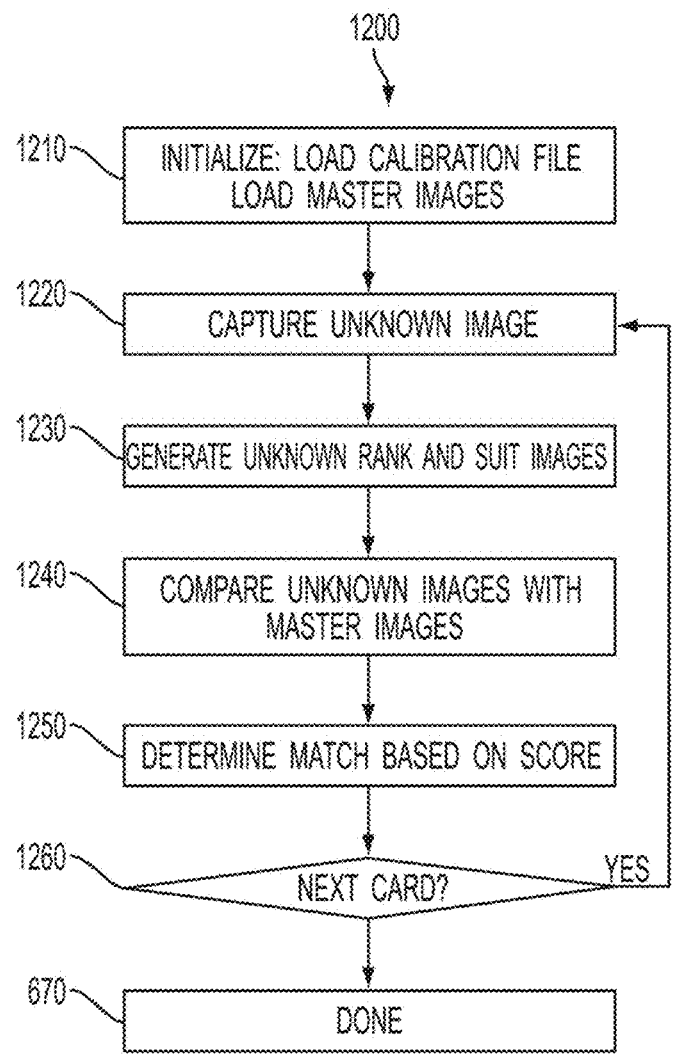
FIG. 12 is a flowchart illustrating a method for determining the identity of unknown images according to an embodiment of the present disclosure.

FIG. 12 is a flowchart 1200 illustrating a method for determining the identity of unknown images according to an embodiment of the present disclosure. The method of FIG. 12 is described with reference to the card processing system 400 of FIG. 4 and the raw image 417 of FIG. 5. The card recognition mode may be employed to operate the card processing system 400 that has been tuned to a deck of cards to recognize the identity of unknown cards as the cards pass through the card handling device. Using the calibration file 433, the card recognition processor 414 (or, alternatively, the processor 430 of the main control system 412) may process the unknown images 411 to be compared with the master images 413, 415 for determining a match.

At operation 1210, the card recognition processor 414 may be initialized by loading the calibration file 433 and the master images 413, 415 into the card recognition processor 414 from the appropriate deck library 434 for the deck type being used. The operator (e.g., dealer) may select the appropriate deck type (corresponding to the deck name file 435) from an interface of the card handling device. Loading the calibration file 433 may include loading the actual file itself, or loading at least some of the information contained therein.

At operation 1220, an unknown image 411 may be captured. For example, the dealer may place the deck into the card handling device for shuffling, for dealing, etc. Each time a card is moved past the card present sensor 420, the imaging device 416 may capture an unknown image 411 of the card responsive to the trigger signal from the card present sensor 420. Unknown images 411 may be captured during game play to verify hands, at the beginning of game play to verify a deck, etc.

At operation 1230, the unknown image 411 may be converted from a raw image to generate unknown rank and suit images. Using the parameters (e.g., the region of interest 504, rank area 508, suit area 510, etc.) from the calibration file 433, the card recognition processor 414 may generate an unknown rank image and an unknown suit image from the unknown image 411. Generating an unknown rank image and an unknown suit image may mean generating separate files from the unknown image, but also embodiments in which boundaries for the rank and suit areas are simply defined within the unknown image 411 so that any further comparison is limited to within the defined boundaries. Because the parameters in the calibration file 433 were also used to generate the master images 413, 415, the unknown rank image and the master rank images 413 may be the same size (i.e., dimensions), and the unknown suit image and the master suit images 415 may be the same size. When the unknown image 411 is captured, the card recognition processor 414 may also convert the unknown image 411 from a grayscale image to a black and white image.

At operation 1240, the unknown image 411 (e.g., the unknown rank and suit images) may be compared to the master images 413, 415. The comparison may be based on comparing pixel to pixel of each file to generate a correlation score. The score may be represented as a number of pixels, a percentage of pixels, or other suitable form. In another embodiment, each master image may be scanned across a larger unknown image 411 to determine a plurality of scores that may be used to determine if a match exists. In some embodiments, contours may be determined and analyzed using an OCR method.

The card recognition processor 414 may compare the unknown image 411 against the set of master images 413, 415 to determine the identity of the card. For example, the card recognition processor 414 may compare the unknown rank image (e.g., a separate image or a defined boundary around the rank) against each of the thirteen master images for the ranks (2-10, J, Q, K, A). The card recognition processor 414 may also compare the unknown suit image (e.g., a separate image or a defined boundary around the suit) against each of the four master images for the suits (Diamond, Heart, Spade, Club). Based on the results of these comparisons, the card recognition processor 414 may determine the identity of the card by selecting the symbols with the highest degree of correlation. The card recognition processor 414 may perform a plurality of processes that at least partially overlap in time. As a result, the unknown image 411 may be compared with a plurality of different master images 413, 415 at the same time.

In one embodiment, the comparison may include comparing the unknown image 411 and the master images 413, 415 pixels by pixel across each row of each image array. For example, the card recognition processor 414 may perform an inverted XOR operation of the corresponding pixels of the unknown image 411 and one of the master images 413, 415. In another embodiment, the comparison may include comparing cross-correlation values of matrices from the master image 413, 415 and the unknown image 411. Such a cross-correlation function may, however, require a larger amount of computational resources than embodiments that include a more simple summation.

At operation 1250, a match is determined based on the score. For example, the result of the inverted XOR operation may be summed to obtain a score (e.g., a numeric sum). For example, a black pixel (1) compared with a black pixel (1) may add to the score, a white pixel (0) compared with a white pixel (0) may add to the score, while a black pixel (1) compared with a white pixel (0) may not add to the score. A larger score may indicate a greater number of matching pixels. The score may be represented as a raw number of matching pixels or as a percentage of the total number of pixels of the images. For example, a score of 100% may be a perfect pixel to pixel match of the unknown image and a master image. Of course, a perfect match may not be reasonable to expect, and a match may still be found for a score having a percentage less than 100%. As a result, a minimum threshold may be set for what the card processing system 400 may consider a match. In some embodiments, the inverted XOR operation may be implemented as another logic operation. In some embodiments, like pixels may be added and dissimilar pixels may be not counted, while in other embodiments, dissimilar pixels may be added and then subtracted from the total number of pixels to determine the score. In addition, some embodiments may include counting the number of pixels that do not match and using the lowest score below some threshold for non-matching pixels.

The card processing system 400 may generate either a valid card ID (if a match is determined) or an indication of an error (if a match is not determined). For example, the card recognition processor 414 may return a score resulting from the comparison of the unknown image 411 with each master image 413, 415. To obtain a "match," the score may be required to be above a minimum error threshold. In some situations, the scores for more than one master image may be above the minimum error threshold. The highest score, however, will be selected as the valid card ID. In other words, the master image 413, 415 used in the comparison that resulted the highest score may be selected as the card ID (assuming the score is above a minimum error threshold). A deck may also be flagged as being invalid if a pre-determined (e.g., 6) number of errors (e.g., misread cards) occur during card recognition. In some embodiments, the score may be based on the dissimilar pixels. Thus, a match would occur for the lowest score of dissimilarity (0% for a perfect match) above a maximum error threshold rather than being based on the score of similar pixels.

In some embodiments, the card handling device may display an image of the card acquired by the imaging device 416 on a display device of the card handling device. Such an image displayed on the display device may be viewed by the operator for verification that the valid card ID is the correct determination, or as a way to see an image of the card that produced an error indication.

At operation 1260, it is determined if another card is present to determine its identity. If so, the unknown image 411 for the new card is captured and the process continues.

Figure 13A:
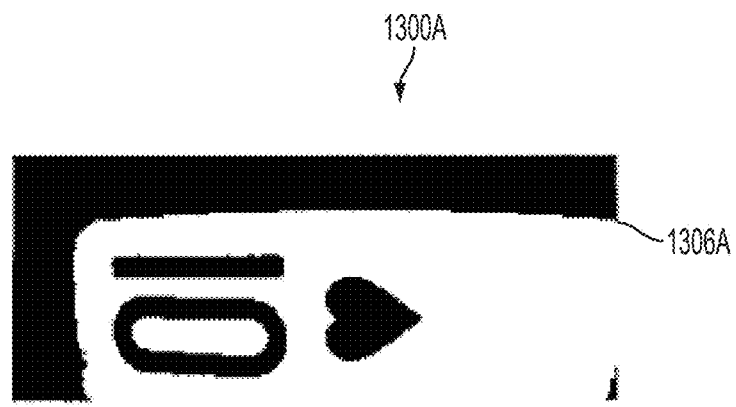
FIGS. 13A, 13B, and 13C show a processed image of a card, in which the imaging device had experienced dust build-up on the lens.
Figure 13B:
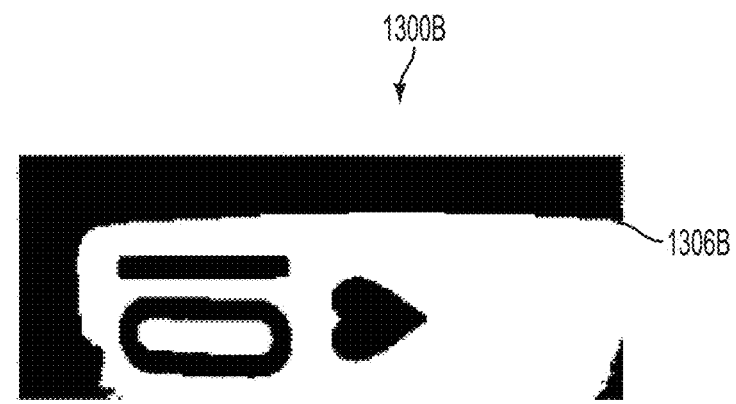
Figure 13C:
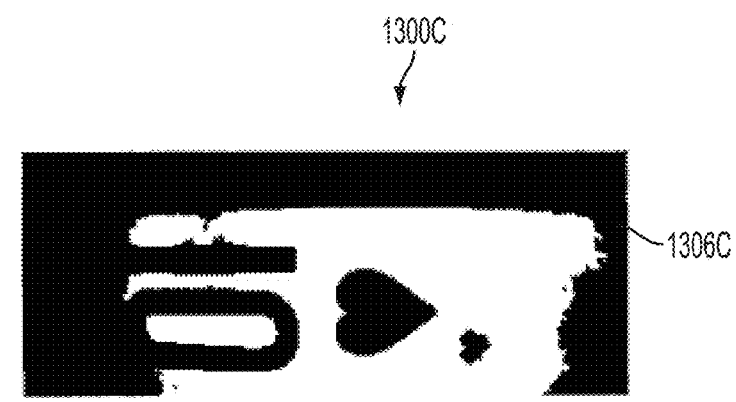

FIGS. 13A, 13B, and 13C show a processed image 1300A, 1300B, 1300C of a card 1306A, 1306B, 1306C, in which the imaging device 416 (FIG. 4) had experienced dust build-up on the lens. Dust may accumulate on the lens with use of the card handling device. For example, FIG. 13A is an example of dust build-up after a first number cycles, FIG. 13B is an example of dust build-up after a greater number cycles, and FIG. 13C is an example of dust build-up after many additional cycles.

When the imaging device 416 accumulates dust, the raw image 417 may become a different shade of gray in terms of the grayscale image. The white area may become a little more gray and the black area may become a little less black. As discussed above, each pixel in a grayscale image has a value between white and black. When converting a grayscale image to a black and white image, a threshold value may be used as the cutoff point between black and white. As a result, the white area of the processed black and white image may become smaller as the camera accumulates dust.

The card recognition processor 414 (FIG. 4) may be configured to correct for dust build-up. In one embodiment, rather than setting a fixed threshold used to convert a grayscale image to a black and white image, the threshold value may be dynamically changed over time to compensate for dust build-up. As an example, the threshold may change to have different levels over time. The threshold may be used to convert the grayscale image to a black and white image during the calibration mode. The threshold may be set to a first level during calibration mode, and to a second level during card recognition mode. As an example, the dynamic changes (from the first level to the second level) may be performed to compensate for changes in lighting conditions. It is also contemplated that the dynamic changes may be based on other conditions. In some embodiments, the number of cycles may be counted and the threshold may dynamically change with the number of cycles. In some embodiments, one or more data filters may be employed to further improve the processed image during conversion from grayscale to a black and white image.

Figure 14A:
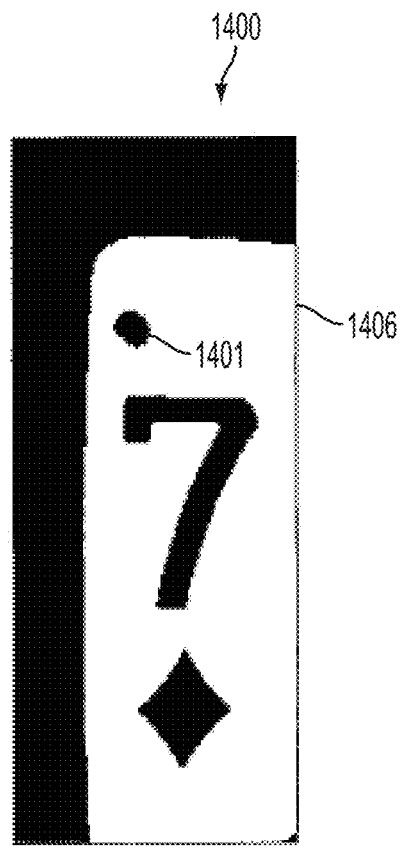
FIGS. 14A and 14B illustrate a problem of incorrectly splitting an image that may arise during card recognition mode.
Figure 14B:
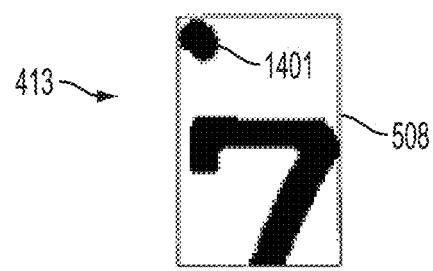

FIGS. 14A and 14B illustrate a problem of incorrectly splitting an image that may arise during calibration mode and/or card recognition mode. In particular, incorrectly splitting an image may often occur when the imaging device 416 (FIG. 4) is not clean or if the actual card itself has a mark. As a result, a blemish 1401 may appear on an image 1400 that is used to generate master images 413, 415 (in calibration mode) or the unknown images 411 (in card recognition mode) for a card 1406; however, it may be more likely for a card to have a blemish 1401 during card recognition mode (because of the repeated use of the card over time).

The blemish 1401 may be mistaken for either the rank or suit, often because the card recognition processor 414 may first look for the split between the rank and suit as a starting point in the analysis. As shown in FIG. 14A, the card recognition processor 414 may mistake a space between the blemish 1401 and the rank as the split point. As a result, the card recognition processor 414 may generate the localized image as the master rank image 413 during the calibration mode (or as the unknown rank image during the card recognition mode) based on the either the rank area 508 in the calibration file. The localized image, however, does not include the proper portion of the image 900 that includes the entire rank.

In some embodiments, the card recognition processor 414 may not create the unknown images 411 based on finding a split between the rank and suit symbols. Rather, during the card recognition mode, the card recognition processor 414 may compare the master images 413, 415 to the entire unknown image 411 rather than first generating a smaller localized image of just the rank or the suit. In other words, the entire field of view (or a portion thereof) that includes both the rank and the suit for the unknown image may be used for comparison with the master images 413, 415. As a result the unknown image 411 may be larger than the master images 413, 415. In such an embodiment, the card recognition processor 414 may perform a plurality of comparisons of each master image 413, 415 and the unknown image 411 by scanning the master image 413, 415 across the unknown in an overlapping manner. For example, the master image 413, 415 may begin this comparison in the top left corner of the unknown image 411 and scan across pixel by pixel to the top right corner. The master image 413, 415 may then be moved down a row of pixels moving along the pixels of that row, and so on. If at some point during this scanning, a score results in a match, the card may be identified.

Figure 15A:
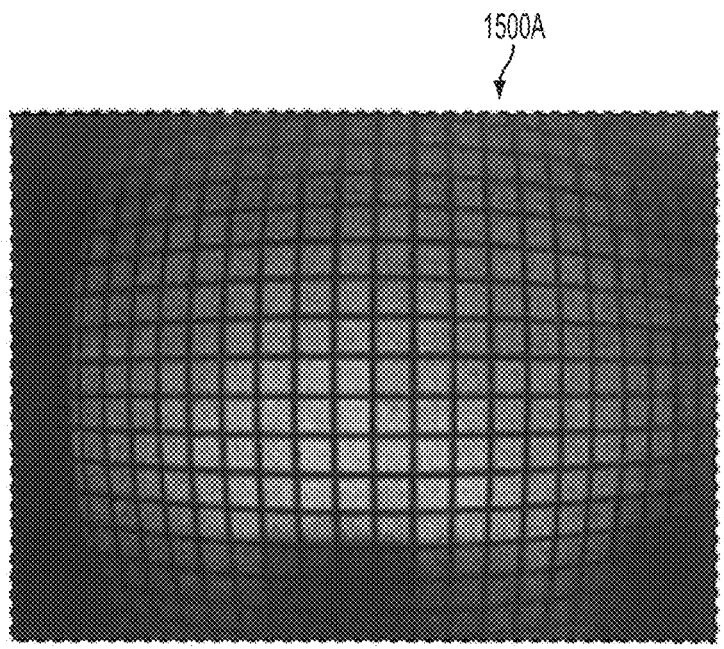
FIGS. 15A and 15B illustrate an issue that may arise when capturing an image using uneven illumination.
Figure 15B:
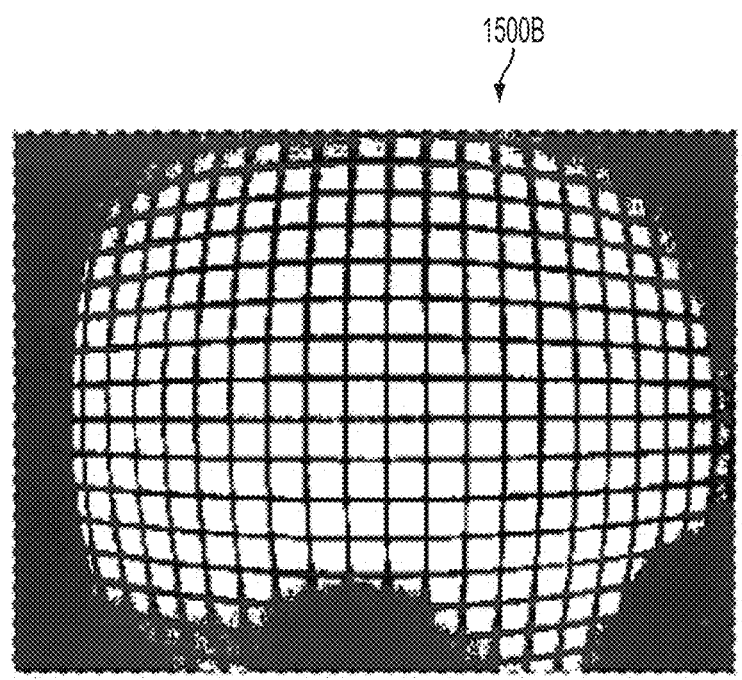

FIGS. 15A and 15B illustrate an issue that may arise when capturing an image using uneven illumination and fisheye distortion. FIG. 15A is a raw image 1500A using a grid for illustration. FIG. 15B is a processed image 1500B showing the grid after conversion from grayscale to black and white. As shown in FIGS. 15A and 15B, uneven lighting may cause some portions of the raw image 1500A to appear dark when they are actually white. As a result, recognition may not be as accurate due to a lower score when comparing images, or for more serious problems such as incorrect splitting (FIGS. 14A and 14B).

Uneven illumination may be corrected in a similar manner to the correction for dust build-up on the imaging device 416 (FIG. 4). For example, the card recognition processor 414 may be configured to dynamically change the threshold value used in the conversion from the grayscale image to the black and white image. The dynamic change may be responsive to a number of cycles of the imaging device 416, a light sensor detecting illumination changes, or other changes in the environment. In some embodiments, one or more data filters may be employed to further improve the processed image 1500B during conversion from grayscale to a black and white image.

Figure 16A:
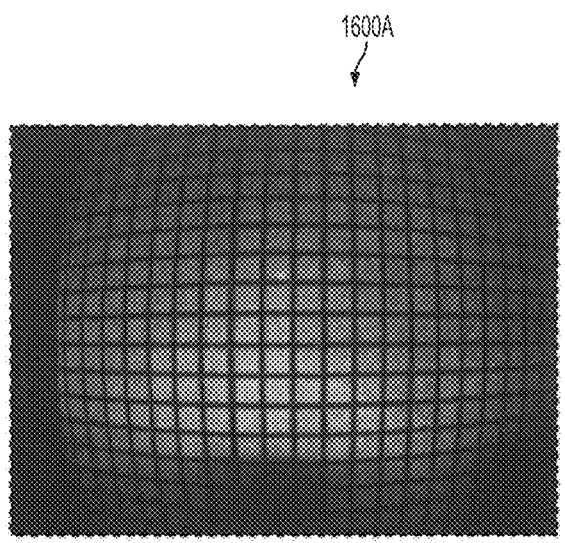
FIGS. 16A, 16B, and 16C are raw images from the imaging device of a card handling device showing fish eye distortion caused by the imaging device.
Figure 16B:
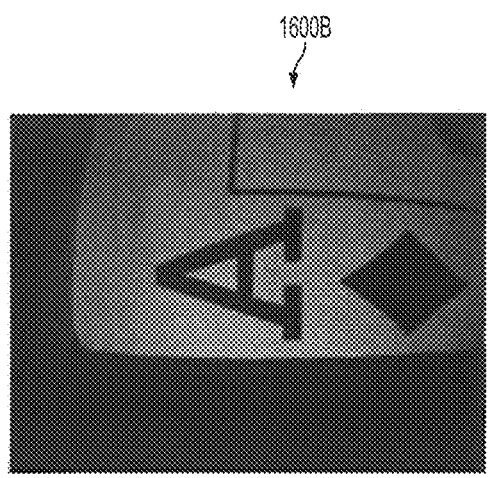
Figure 16C:
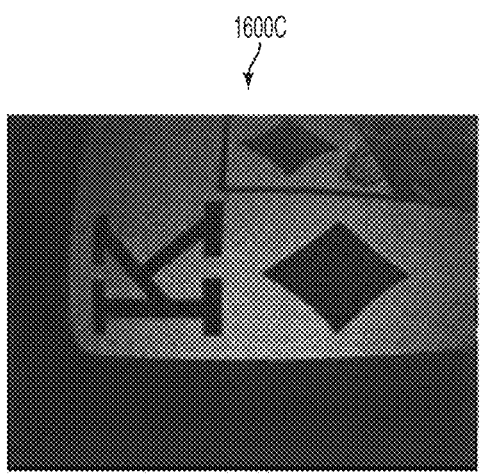

FIGS. 16A, 16B, and 16C are raw images 1600A, 1600B, 1600C from the imaging device 416 (FIG. 4) of a card handling device showing fish eye distortion caused by the imaging device 416. In some embodiments, short distances between the lens and the card caused by very small spaces within the card handling device and proximity of the imaging device 416 to the card may require a fisheye lens to be used with the imaging device 416. The fisheye lens may provide a wide field of view for the imaging device 416 that is sufficient to view the rank and suit for different types of cards. For example, some decks may have relatively large ranks and suits that take up a large area of the corner of the card. In addition, the location of the rank and suit may vary from one deck to another.

The fisheye lens may introduce fisheye distortion in the raw images 1600A, 1600B, 1600C taken by the imaging device 416. For example, FIG. 11A shows a raw image 1600A of a grid in which the squares of the grid are equal sizes. However, as shown in FIG. 16A, the fisheye distortion causes the squares of the grid to appear to be different sizes throughout the raw image 1600A. Near the center of the raw image 1600A, the fisheye distortion may not be as pronounced; however, near the edges and corners of the raw image 1600A, the fisheye distortion becomes more pronounced.

FIGS. 16B and 16C are raw images 1600B, 1600C taken with the imaging device 416 with a lens having fisheye distortion. When comparing the diamond suits in FIGS. 16B and 16C, it can be seen that the shapes of the diamond suits vary because of the different placement of the diamond suits within the field of view of the imaging device 416. For example, the diamond suit in FIG. 11B is smaller than the diamond suit in FIG. 11C because it is located further from the center of the field of view. In addition, the Ace (A) rank in FIG. 11B is mostly centered within the field of view. The King (K) rank in FIG. 16C, however, is off-center and is smaller near the top of the rank compared with the bottom of the rank. As a result, the more distortion experienced by the ranks and suits in an image, the greater the effect the distortion may have for the score from the comparison with the master images 413, 415 for the ranks and suits when determining the card ID. In some situations, fisheye distortion has caused a misidentification of the card ID (e.g., the suit is identified as a spade when the suit was really a diamond).

The card processing system 400 (FIG. 4) may be configured to correct for such fisheye distortion. In other words, the fisheye distortion may be reduced, such as by stretching the distorted image. In some embodiments, the image pixels may be translated from the raw image 1600A, 1600B, 1600C to a corrected raw image according to a correction table (i.e., look-up table). In some embodiments, the image pixels may be mathematically translated from the raw image to a corrected raw image.

Figure 17A:
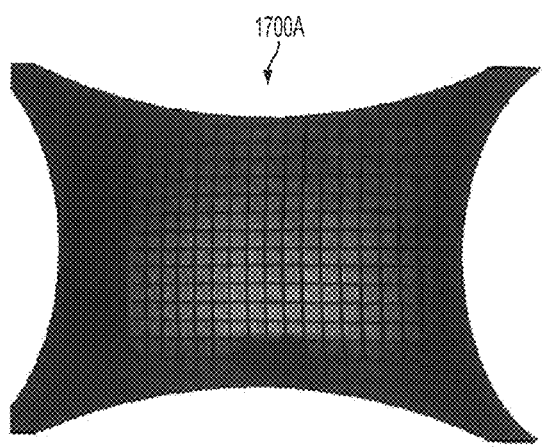
FIGS. 17A, 17B, and 17C are images for which the fisheye distortion has been reduced through mathematical stretching of the distorted image.
Figures 17B, 17C:
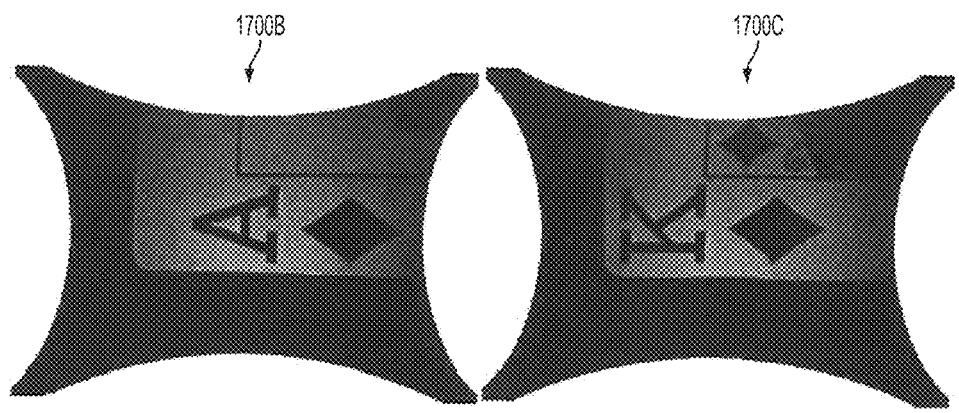

FIGS. 17A, 17B, and 17C are images 1700A, 1700B, 1700C for which the fisheye distortion has been reduced through mathematical stretching of the distorted image. As shown in FIG. 17A, the grid (which was distorted in FIG. 16A) has squares that are now substantially the same size. In FIG. 17B, the diamond suit (which was distorted in FIG. 16B) is now substantially symmetrical even though the diamond suit is off-center and proximate the edge of the image. In FIG. 17C, each of the King rank (K) and the diamond suit (which were distorted in FIG. 16C) are no longer distorted.

Additional embodiments include:

Embodiment 1

A method of automatically generating a calibration file for a card handling device, the method comprising: capturing a raw image from at least a portion of a card passing through a card handling device; and using a processor, automatically generating a calibration file stored in memory of a main control system linked with the card handling device, wherein automatically generating the calibration file comprises: identifying at least one parameter associated with a rank area around a rank of the at least a portion of the card; identifying at least one parameter associated with a suit area around a suit of the at least a portion of the card; and storing the at least one parameter associated with the rank area and the at least one parameter associated with the suit area in the calibration file.

Embodiment 2

The method of Embodiment 1, wherein automatically generating the calibration file comprises identifying a location and at least one parameter associated with a region of interest that is relatively larger than the rank area and the suit area, the method further comprising storing the location and the at least one parameter associated with the region of interest in the calibration file.

Embodiment 3

The method of Embodiment 1 or Embodiment 2, wherein capturing a raw image includes capturing a plurality of raw images from a plurality of different cards passing through the card handling device.

Embodiment 4

The method of Embodiment 3, wherein identifying at least one parameter associated with the rank area includes: identifying a at least one parameter associated with a plurality of rank areas from the plurality of different cards; and selecting the at least one parameter associated with the rank area to include a rank width parameter having a number of pixels representative of a width that is a widest dimension from the plurality of rank areas, and to include a rank depth parameter having a number of pixels representative of a depth that is a longest dimension from the plurality of rank areas.

Embodiment 5

The method of Embodiment 3, wherein identifying at least one parameter associated with the suit area includes: identifying at least one parameter associated with a plurality of suit areas from the plurality of different cards; and selecting at least one parameter associated with the rank area to include a suit width parameter having a number of pixels representative of a width that is a widest dimension from the plurality of suit areas, and to include a suit depth parameter having a number of pixels representative of a depth that is a longest dimension from the plurality of suit areas.

Embodiment 6

The method of any of Embodiments 1 through 5, further comprising storing the calibration file in a file system of an operating system running on the processor.

Embodiment 7

A method of automatically generating one or more deck libraries for one or more decks of cards, the method comprising: using a processor to automatically generate a first calibration file without user input in identifying at least one parameter associated with a rank area and at least one parameter associated with a suit area for a first deck type of cards, the calibration file including the parameters associated with the rank area and the suit area; storing the first calibration file in a first deck library for the first deck type; using the processor to automatically generate a plurality of master images for the cards of the first deck type using the parameters from the calibration file; and storing the plurality of master images for the cards of the first deck type in the first deck library.

Embodiment 8

The method of Embodiment 7, further comprising: using the processor to automatically generate a second calibration file for a second deck type of cards; storing the second calibration file in a second deck library for the second deck type; using the processor to automatically generate a second plurality of master images for the cards of the second deck type using the parameters from the second calibration file; and storing the second plurality of master images for the cards of the second deck type in the deck library.

Embodiment 9

The method of Embodiment 7 or Embodiment 8, further comprising linking each master image of the plurality of master images with an appropriate rank or suit.

Embodiment 10

The method of Embodiment 9, wherein linking each master image of the plurality of master images includes linking each master image according to an expected order that the cards were read into a card handling device.

Embodiment 11

The method of Embodiment 9, wherein linking each master image of the plurality of master images includes linking each master image from a deck that is unsorted.

Embodiment 12

The method of Embodiment 11, wherein linking each master image of the plurality of master images includes performing optical character recognition to each master image.

Embodiment 13

The method of Embodiment 11, wherein linking each master image of the plurality of master images includes comparing each master image of the plurality of master images with a set of images from a plurality of different deck types.

Embodiment 14

The method of Embodiment 11, wherein linking each master image of the plurality of master images includes comparing a normalized version of each master image of the plurality of master images with a set of normalized images from a plurality of different deck types.

Embodiment 15

The method of Embodiment 14, wherein comparing a normalized version of each master image of the plurality of master images with a set of normalized images from a plurality of different deck types includes performing a pixel by pixel comparison.

Embodiment 16

The method of Embodiment 15, wherein performing a pixel by pixel comparison further includes comparing a middle pixel with at least one additional neighboring pixel.

Embodiment 17

The method of any of Embodiments 7 through 16, wherein identifying at least one parameter associated with a rank area and at least one parameter associated with a suit area for a first deck type of cards includes performing a blob analysis to locate a rank and a suit for a card of the first deck type within a region of interest.

Embodiment 18

The method of Embodiment 17, wherein performing a blob analysis includes first locating a 10 rank to determine a width for the at least one parameter associated with the rank area.

Embodiment 19

A card processing apparatus, comprising: a memory device; an imaging device operably coupled with the memory device, such that raw images from the imaging device are stored in the memory device; and a main control system coupled with the imaging device, wherein the main control system is configured to run an operating system having a file directory system configured to store a plurality of deck libraries for a plurality of different deck types, wherein the main control system is configured to receive the raw images from the memory device, automatically generate a calibration file having parameters related to a rank area and a suit area for a deck type.

Embodiment 20

The card processing apparatus of Embodiment 19, including a card shuffler housing the memory device, the imaging device, and the main control system.

Embodiment 21

The card processing apparatus of Embodiment 19 or Embodiment 21, wherein the main control system is further configured to automatically generate a plurality of master images from the raw images according to the parameters of the calibration file.

Embodiment 22

The card processing apparatus of Embodiment 21, further comprising card recognition processor configured to load the plurality master images and the calibration file from the main control system, and compare an unknown image from the imaging device with the plurality of master images.

Embodiment 23

The card processing apparatus of Embodiment 22 wherein the card recognition processor is configured to compare the unknown image with the plurality of master images by comparing the unknown image with each master image pixel by pixel and sum the result of the comparing.

Embodiment 24

The card processing apparatus of Embodiment 22, wherein the card recognition processor includes a field-programmable gate array.

Embodiment 25

The card processing apparatus of any of Embodiments 21 through 24, wherein the main control system is configured to link the plurality of master images from an unsorted deck of cards with an appropriate rank and suit.

Embodiment 26

The card processing apparatus of Embodiment 25, wherein the main control system is configured to link the plurality of master images from an unsorted deck of cards with an appropriate rank and suit by: generating a normalized version of each master image of the plurality of master images; and comparing the normalized version of each master image of the plurality of master images with a plurality of normalized images corresponding to a plurality of different deck types.

While certain illustrative embodiments have been described in connection with the figures, those of ordinary skill in the art will recognize and appreciate that embodiments of the disclosure are not limited to those embodiments explicitly shown and described herein. Rather, many additions, deletions, and modifications to the embodiments described herein may be made without departing from the scope of embodiments of the disclosure as hereinafter claimed, including legal equivalents. In addition, features from one embodiment may be combined with features of another embodiment while still being encompassed within the scope of the disclosure as contemplated by the inventor.

What is claimed is:

1. A method of automatically generating a calibration file for a card handling device, the method comprising:
    capturing, with an imaging device, a raw image from at least a portion of a card passing from a card input to a card output of the card handling device; and
    automatically generating and storing a calibration file during a calibration mode without user input, the calibration file being associable with the card handling device and a deck of cards that includes the card such that the card handling device is trained for the associated deck during a subsequent card recognition mode, wherein automatically generating the calibration file includes:
        identifying at least one parameter associated with a rank area of the at least a portion of the card;
        identifying at least one parameter associated with a suit area of the at least a portion of the card; and
        storing the at least one parameter associated with the rank area and the at least one parameter associated with the suit area in the calibration file.

2. The method of claim 1, wherein automatically generating and storing the calibration file comprises identifying a location and at least one parameter associated with a region of interest that is relatively larger than the rank area and the suit area, the method further comprising storing the location and the at least one parameter associated with the region of interest in the calibration file.

3. The method of claim 1, wherein automatically generating and storing the calibration file include using a processor associated with the card handling device.

4. The method of claim 3, wherein storing the calibration file includes storing the calibration file in a file system of an operating system running on the processor incorporated within the card handling device.

5. The method of claim 1, wherein capturing the raw image includes capturing a plurality of raw images from a plurality of different cards passing through the card handling device.

6. The method of claim 5, wherein:
identifying the at least one parameter associated with the rank area includes:
identifying at least one parameter associated with a plurality of rank areas from the plurality of different cards; and
selecting the at least one parameter associated with the rank area to include a rank width parameter having a number of pixels representative of a width that is a widest dimension from the plurality of rank areas, and to include a rank depth parameter having a number of pixels representative of a depth that is a longest dimension from the plurality of rank areas; and
identifying the at least one parameter associated with the suit area includes:
identifying at least one parameter associated with a plurality of suit areas from the plurality of different cards; and
selecting at least one parameter associated with the rank area to include a suit width parameter having a number of pixels representative of a width that is a widest dimension from the plurality of suit areas, and to include a suit depth parameter having a number of pixels representative of a depth that is a longest dimension from the plurality of suit areas.

7. A method of automatically generating a deck library for tuning a card handling device to recognize cards from a deck of cards, the method comprising:
using an imaging device of a card handling device to capture raw images of playing cards passing from a card input to a card output;
using a processor to automatically generate, without user input, a first calibration file for identifying at least one parameter associated with a rank area and at least one parameter associated with a suit area from the raw images for a first deck of cards, the calibration file including the parameters associated with the rank area and the suit area;
storing, in memory, the first calibration file in a first deck library for the first deck;
using the processor to automatically generate a plurality of master images for the cards of the first deck using the parameters from the calibration file; and
storing, in memory, the plurality of master images for the cards of the first deck in the first deck library such that the card handling device is trained to the first deck for use in a subsequent card recognition mode of the card handling device.

8. The method of claim 7, further comprising:
using the processor to automatically generate a second calibration file for a second deck of cards;
storing, in memory, the second calibration file in a second deck library for the second deck;
using the processor to automatically generate a second plurality of master images for the cards of the second deck using the parameters from the second calibration file; and
storing, in memory, the second plurality of master images for the cards of the second deck in the deck library such that the card handling device is trained to the second deck for use in a subsequent card recognition mode of the card handling device.

9. The method of claim 7, wherein the processor and memory are incorporated within the card handling device.

10. The method of claim 7, wherein automatically generating the plurality of master images includes receiving and cropping the raw images according to the parameters of the first calibration file to generate at least one master image for each rank and each suit of the first deck.

11. The method of claim 7, further comprising linking each master image of the plurality of master images according to an expected order by the processor as the cards were read into a card handling device.

12. The method of claim 7, further comprising linking each master image of the plurality of master images according to an order that is previously unknown by the processor as the cards were read into the card handling device.

13. The method of claim 11, wherein linking each master image of the plurality of master images includes performing at least one of an optical character recognition or a blob analysis on each master image.

14. The method of claim 7, further comprising linking each master image of the plurality of master images for the processor to assign an identity to each master image by comparing each master image of the plurality of master images with a set of images from a plurality of different decks.

15. The method of claim 7, further comprising linking each master image of the plurality of master images for the processor to assign an identity to each master image by comparing a normalized version of each master image of the plurality of master images with a set of normalized images from a plurality of different decks.

16. A card processing system, comprising:
a card input;
a card output;
a memory device;
an imaging device operably coupled with the memory device, the imaging device configured to capture raw images of playing cards passing from the card input to the card output for storage of the raw images in the memory device; and
a control system coupled with the imaging device, wherein the control system is configured to:
run an operating system having a file directory system configured to store a plurality of deck libraries for a plurality of different deck types;
receive the raw images from the memory device; and
automatically generate a calibration file having parameters related to a rank area and a suit area for each deck type without user input during a calibration mode.

17. The card processing system of claim 16, including a card shuffler having a common housing for each of the memory device, the imaging device, and the control system.

18. The card processing system of claim 16, wherein the control system is further configured to automatically generate a plurality of master images from the raw images according to the parameters of the calibration file.

19. The card processing system of claim 18, wherein the control system is configured to link the plurality of master images from an unsorted deck of cards with an appropriate rank and suit during the calibration mode for the control system to identify which rank and which suit corresponds to each master image.

20. The card processing system of claim 19, wherein the control system is configured to link the plurality of master images from an unsorted deck of cards with an appropriate rank and suit by:
generating a normalized version of each master image of the plurality of master images; and comparing the normalized version of each master image of the plurality of master images with a plurality of normalized images corresponding to a plurality of different deck types.

* * * * *